US011606490B2

(12) United States Patent
Allen

(10) Patent No.: US 11,606,490 B2
(45) Date of Patent: Mar. 14, 2023

(54) TAMPERPROOF CAMERA

(71) Applicant: HomeTeam CA LLC, Riverside, CA (US)

(72) Inventor: Jonis D Allen, Riverside, CA (US)

(73) Assignee: HomeTeam CA LLC, Riverside, CA (US)

( * ) Notice: Subject to any disclaimer, the term of this patent is extended or adjusted under 35 U.S.C. 154(b) by 0 days.

(21) Appl. No.: 17/510,350

(22) Filed: Oct. 25, 2021

(65) Prior Publication Data

US 2022/0132018 A1 Apr. 28, 2022

Related U.S. Application Data

(60) Provisional application No. 63/105,832, filed on Oct. 26, 2020.

(51) Int. Cl.

| | |
|---|---|
| ***H04N 5/232*** | (2006.01) |
| ***H04N 7/18*** | (2006.01) |
| ***H04N 5/225*** | (2006.01) |
| ***H04N 5/265*** | (2006.01) |
| ***G03B 17/56*** | (2021.01) |
| ***G03B 17/02*** | (2021.01) |
| ***G07C 9/00*** | (2020.01) |
| ***H04W 88/02*** | (2009.01) |
| ***H04W 12/03*** | (2021.01) |

(Continued)

(52) U.S. Cl.

CPC ......... *H04N 5/23203* (2013.01); *G01S 19/13* (2013.01); *G03B 17/02* (2013.01); *G03B 17/561* (2013.01); *G07C 9/00309* (2013.01); *H04N 5/2251* (2013.01); *H04N 5/23241* (2013.01); *H04N 5/23299* (2018.08); *H04N 5/265* (2013.01); *H04N 7/181* (2013.01); *H04N 7/188* (2013.01); *H04W 12/03* (2021.01); *H04W 12/06* (2013.01); *G07C 2009/00412* (2013.01); *H04W 88/02* (2013.01)

(58) Field of Classification Search

CPC ............. H04N 5/23203; H04N 5/2251; H04N 5/23241; H04N 5/23299; H04N 5/265; H04N 7/181; H04N 7/188; H04N 5/2252; H04N 5/2254; H04N 5/2256; H04N 5/232; H04N 5/23238; H04N 7/186; G01S 19/13; G03B 17/02; G03B 17/561; G03B 2206/00; G03B 2217/007; G07C 9/00309; G07C 2009/00412; H04W 12/03; H04W 12/06; H04W 88/02; H04W 12/63

See application file for complete search history.

(56) References Cited

U.S. PATENT DOCUMENTS

| | | | |
|---|---|---|---|
| 8,725,206 | B2 | 5/2014 | Ladouceur |
| 10,498,935 | B2 | 12/2019 | Gartrell et al. |

(Continued)

*Primary Examiner* — Jared Walker

(74) *Attorney, Agent, or Firm* — Makoui Law, PC; Ali Makoui

(57) ABSTRACT

A tamperproof video camera includes a video lens, an antenna; a wireless, transceiver, a processor, a battery compartment comprising a door, and an electronic lock. The processor receives signals through the wireless transceiver to lock or unlock the battery compartment's door. In response, the processor sends signals to the electronic lock to lock or unlock the battery compartment's door. The electronic lock is configured to lock or unlock the battery compartment's door in response to receiving the signals from the processor.

20 Claims, 37 Drawing Sheets

(51) Int. Cl.
*H04W 12/06* (2021.01)
*G01S 19/13* (2010.01)

(56) References Cited

U.S. PATENT DOCUMENTS

| | | | | |
|---|---|---|---|---|
| 10,542,222 | B2 | 1/2020 | Arnold | |
| 10,698,298 | B2 | 6/2020 | Wroblewski et al. | |
| 2013/0262871 | A1 | 10/2013 | Barrus et al. | |
| 2015/0249235 | A1* | 9/2015 | Kawashima | H04N 5/2252 429/100 |
| 2019/0268550 | A1* | 8/2019 | Arnold | A42B 3/30 |
| 2019/0327449 | A1 | 10/2019 | Fu et al. | |
| 2019/0349512 | A1 | 11/2019 | Bentley et al. | |
| 2020/0252544 | A1 | 8/2020 | Ito et al. | |

* cited by examiner

TAMPERPROOF CAMERA

CLAIM OF BENEFIT TO PRIOR APPLICATIONS

This application claims the benefit of U.S. Provisional Patent Application Ser. No. 63/105,832, filed on Oct. 26, 2020. The contents of U.S. Provisional Patent Application 63/105,832 are hereby incorporated by reference.

BACKGROUND

Body-worn cameras, also referred to as body cameras or wearable cameras, are wearable audio and video recording devices. Body-worn cameras are used for different purposes such as sports action, law enforcement, military, firefighting, healthcare, journalism, filmmaking, construction, etc.

A body-worn camera typically includes a wide angle lens, memory for storing a recorded video, and a battery compartment to hold one or more batteries. In addition, a body-worn camera may include an on/off switch and a display screen for displaying the recorded videos. Some body-worn cameras may include wireless transmitters, for example, to transmit live video captured by the camera to external devices.

BRIEF DESCRIPTION OF THE DRAWINGS

The various embodiments of the present tamperproof camera now will be discussed in detail with an emphasis on highlighting the advantageous features. These embodiments depict the novel and non-obvious tamperproof camera shown in the accompanying drawings, which are for illustrative purposes only. These drawings include the following figures, in which like numerals indicate like parts.

DETAILED DESCRIPTION

Figures 1A, 1B:
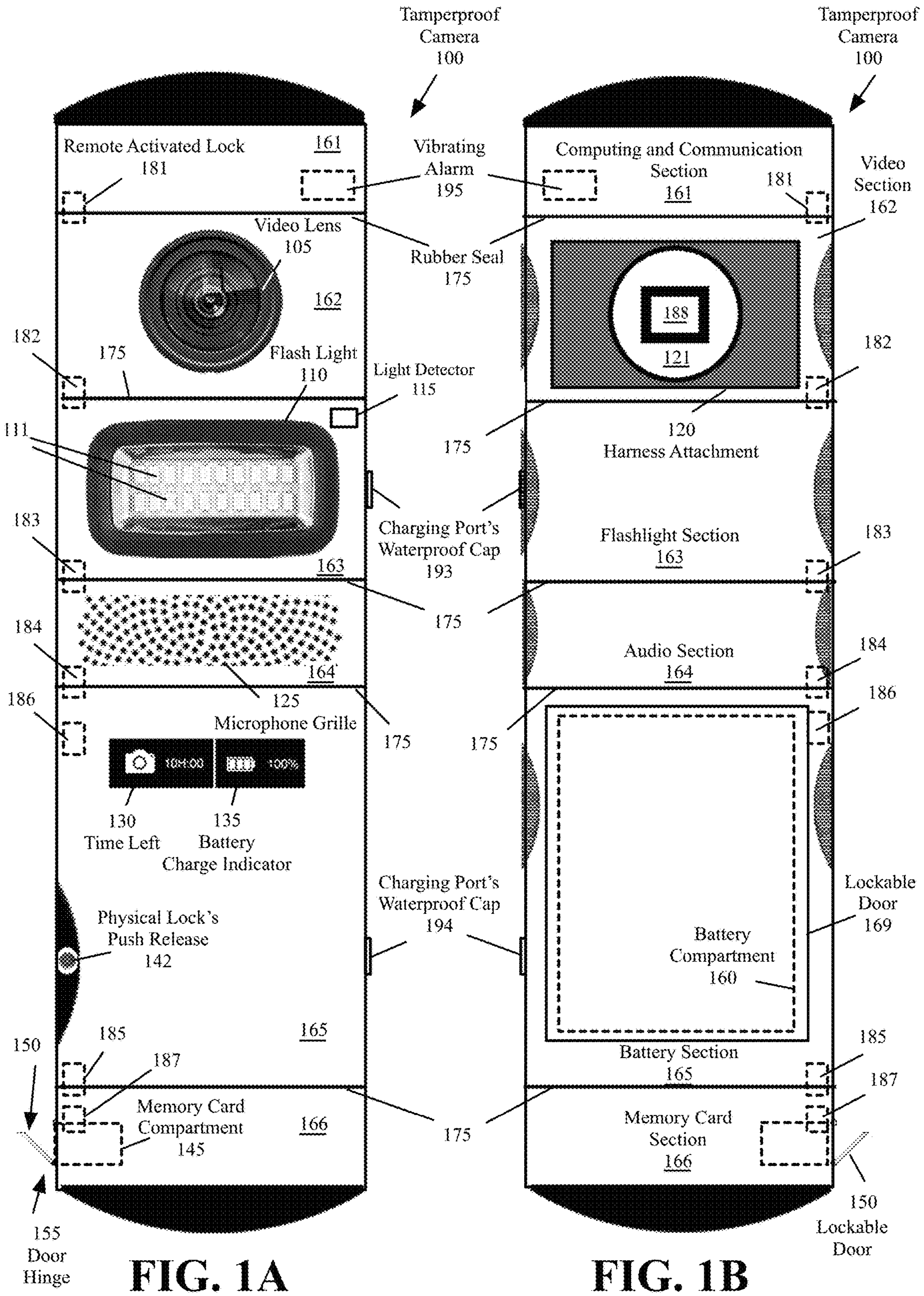
FIGS. 1A and 1B are, respectively, a schematic front elevation view and a schematic rear view of a tamperproof camera, according to various aspects of the present disclosure.

One aspect of the present embodiments includes the realization that the existing body-worn cameras are not tamperproof and the person wearing the camera may turn the camera off at will. For example, the cameras may include an on/off switch that may allow the person to turn the camera off. The cameras may include a battery compartment that may be opened and the batteries may be pulled out in order to stop the camera from recording. The cameras may include a memory card compartment that may be opened and the cameras' memory card may be pulled out to stop recording.

In many applications, it may be desirable to prevent the person wearing a camera to turn the camera off. As an example, when a cleaning or maintenance crew is sent to an assignment in a house or a place of business, it may be desirable to keep the body-worn cameras on in order for the supervisors and/or the clients to monitor the progress in the assignment site and/or to ensure security at the assignment site. It is also desirable for the supervisors and clients to remotely monitor and train the employees while ensuring security at the assignment site. As another example, the law enforcement personnel may forget or may not have enough time to turn their cameras on during sudden encounters. Some of the law enforcement cameras activate via the vehicle's door being opened, which may not be desirable for many applications. In any situation that a body-worn camera is used, it may be beneficial both to the person who is wearing the camera and to the third parties that camera may be turned on prior to an assignment and may not be turned off by the person wearing the camera during the assignment.

The present embodiments, as described in detail below, solve the above-mentioned problems by providing a tamperproof body-worn camera. The camera, in some embodiments, may include remote operated electronic locks and/or manually operated physical locks that may prevent turning the camera off, may prevent removing the batteries, and/or may prevent removing camera's memory cards.

The camera, in some embodiments, may provide wireless access to external devices. The camera, in some embodiments, may include an inertial measurement unit (IMU) and/or a global positioning system (GPS) receiver and may provide the camera's location, direction of movement, and/or orientation to one or more external electronic devices. When the camera reaches within a first geofence of an assignment site (e.g., a predetermined distance, a predetermined driving time, etc.), one or more client devices associated with the assignment site may receive an electronic alert and may be provided a link to track the location of the camera, as the camera approaches an assignment site.

The camera, in some embodiments, may be activated (either by a processor of the camera or by an external electronic device) to capture and transmit video when the camera is within a second geofence of the assignment site (e.g., within a predetermined distance of the assignment site). The client devices may be provided with a link to watch a livestream captured by the camera while the camera is in the assignment site. The video content recorded and transmitted and/or all messages exchanged with external devices, in some embodiments, may be encrypted to provide security and privacy. Once the camera leaves the second geofence (e.g., after the assignment is done or the crew are leaving for an authorized break), the camera may be automatically turned off and the livestreaming and/or providing the location updates to the client devices may be stopped.

Whenever a camera returns within a geofence of a previously completed assignment site and stays within the geofence for a predetermined time period, the camera may be turned on and a livestream may be provided to one or more external devices (e.g., to servers being used by supervisory staff). The camera, in some embodiments, may include speakers to allow communicating with the person wearing the camera and/or providing verbal or pre-recorded instructions for performing a particular task.

The remaining detailed description describes the present embodiments with reference to the drawings. In the drawings, reference numbers label elements of the present embodiments. These reference numbers are reproduced below in connection with the discussion of the corresponding drawing features.

I. Tamperproof Camera Architecture

Figure 1C:
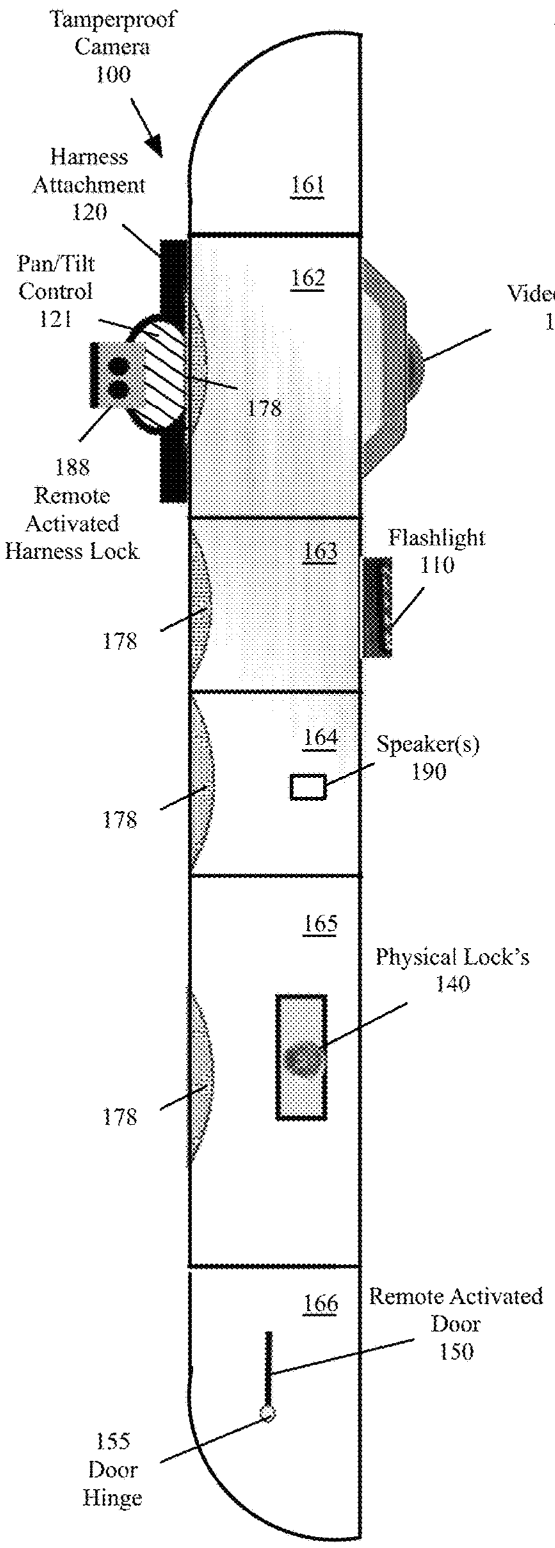
FIGS. 1C and 1D are schematic side elevation views of the tamperproof camera of FIGS. 1A and 1B, according to various aspects of the present disclosure.
Figure 1D:
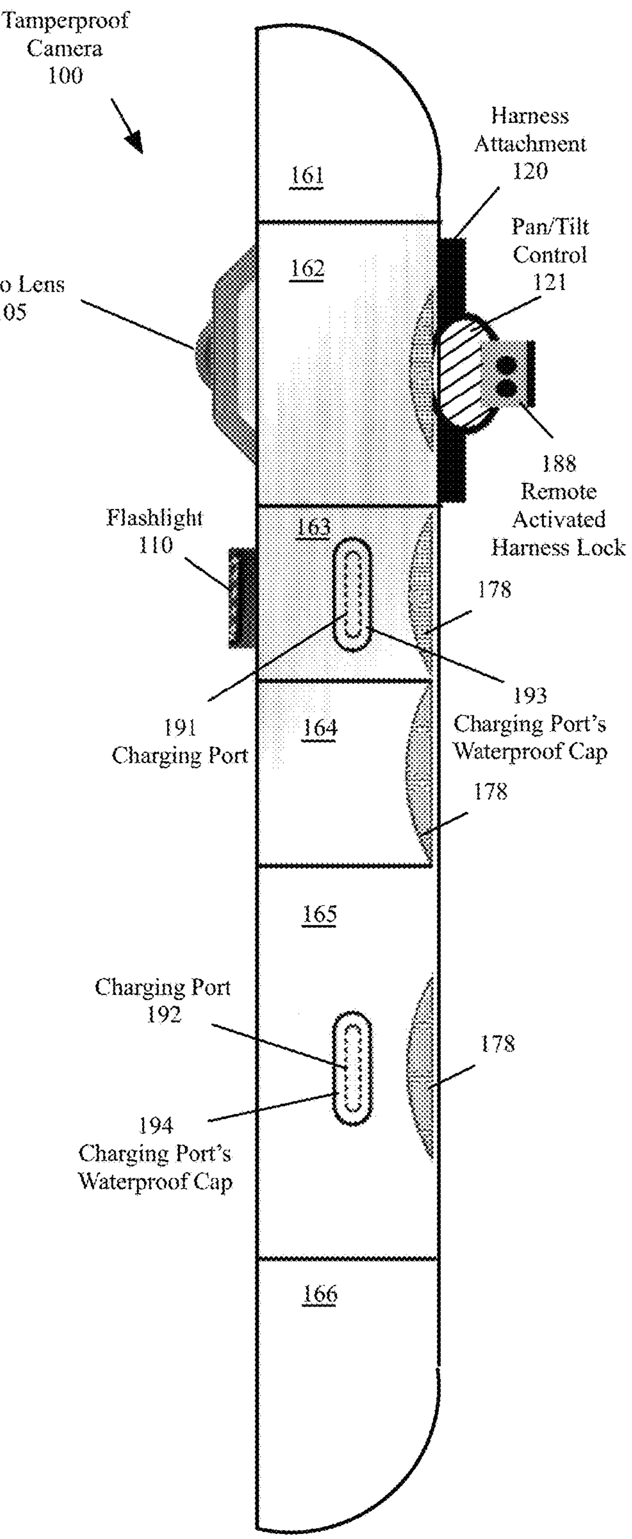

Some embodiments provide a tamperproof body-worn camera. FIGS. 1A and 1B are, respectively, a schematic front elevation view and a schematic rear view of a tamperproof camera, according to various aspects of the present disclosure. FIGS. 1C and 1D are schematic side elevation views of the tamperproof camera of FIGS. 1A and 1B, according to various aspects of the present disclosure.

With reference to FIGS. 1A-1D, the tamperproof camera 100 may include a video lens 105, a flashlight 110, a light detector 115, a harness attachment 120, a pan and tilt control 121, a microphone grille 125 covering one or more microphones (shown in FIGS. 6A-6B), a battery time left indicator 130, a battery charge indicator 135, a physical lock 140, a physical lock's push release 142, a memory card compartment 145, a memory card compartment door 150, a memory card compartment door hinge 155, a battery compartment 160, a battery compartment door 169, charging ports 191-192, charging ports' waterproof caps 193-194, one or more speakers 190, and/or a vibrating alarm 195. As described further below, some of the above-mentioned components may be optional in different embodiments.

Although the speaker(s) 190 are shown in FIG. 1C to be on the side of the camera 100, in other embodiments, the speaker(s) 190 may be on a different location, for example, and without limitations, under the grille 125. The speaker(s) 190, in some embodiments, may be waterproof. For example, the speaker(s) 190 may have plastic or mylar cones which may be impermeable. The speaker(s) 190 may have rubber surrounds, which may repel water. Therefore, even though water may reach the speaker(s) (e.g., through the grille when the speaker(s) are located behind the grille), the water may wash against the cones and the rubber surrounds and may slide off.

In the embodiment depicted in FIGS. 1A-1D, the camera 100 includes six detachable sections 161-166 that may be attached to and detached from each other. In other embodiments, the camera may include a different number of detachable sections than six. For example, in some embodiments the camera's body may include only one section. In other embodiments, the camera 100 may include more or less detachable sections than six, the position of the detachable sections in relationship to each other may be different, and/or the position of components in different sections may be different.

The sections shown in FIGS. 1A-1D include a computing and communication section 161, a video section 162, a flashlight section 163, an audio section 164, a battery section 165, and a memory card section 166. The camera's housing may include six attachable sections. Each section of the camera's housing may house one of the sections 161-166. The sections 161-166 may be separated from each other by rubber seals 175 to seal the sections after the sections are attached together. The camera 100 may also include several handgrips 178 to facilitate holding the camera 100 and/or the individual sections 161-166 when the sections are detached.

The tamperproof camera 100 may include one or more locks to limit access to different components of the camera and to prevent unauthorized personnel from turning off the camera, from removing the batteries, and/or from removing memory card(s). The locks may include remote activated electronic locks 181-185 to lock the detachable sections 161-166, a remote activated lock 186 to lock the battery compartment's door 169, a remote activated lock 187 to lock the memory compartment's door 150, a remote activated lock 188 to prevent the camera 100 from being separated from a harness, and/or one or more physical locks 140 to manually lock the camera.

The tamperproof camera 100, in some embodiments, may not include a physical on/off switch to turn the camera's power on or off. In these embodiments, the camera's power may only be turned on or off by an authorized external device. In other embodiments, such as the embodiment described below with reference to FIGS. 24 and 25A-25B, may include a physical button to turn the camera's power on. The power, in these embodiments, may only be turned off by an authorized external device.

With further reference to FIGS. 1A-1D, the video lens 105 may be a wide angle and/or zoom lens that is configured to capture videos. The videos, in some embodiments, may be stored on one or more memory cards. As described below, the camera 100, in some embodiments, may encrypt and send the captured videos to one or more external electronic devices, for example, for live monitoring of the video by remote supervisor personnel, livestreaming to client devices of persons associated with an assignment site, etc. The camera 100, in some embodiments, may encrypt and upload the captured videos through one or more networks into cloud storage.

The light detector 115 may include one or more sensors for measuring the ambient light. The flashlight 110 may include one or more light sources 111. The light source(s) 111 may be, for example, and without limitations, light emitting diodes (LEDs). The harness attachment 120 may be configured to attach the camera to a harness worn by a person who is using the camera as a body-worn camera. As described below, the harness attachment, in some embodiments, may include a remote controlled lock 188.

The microphone grille 125 may be used to cover one or more microphones of the camera 100 that may record sound during video recording. In order to save battery life and/or to provide security, the camera 100, in some embodiments, may not include a monitoring screen to show the videos captured by the camera. The camera 100, in some embodiments, may include an indicator 130 to show the approximate recording time left. The approximate recording time left may be calculated by the processor of the camera based on the remaining battery charge and/or the amount of battery charge needed for the current tasks performed by the camera (e.g., recording video, standing by, using the flashlight 110, etc.). The camera 100, in some embodiments, may include an indicator 135 to show the percent of the battery's remaining charge. The indicators 130 and 135, in some embodiments, may be shown on one small display. The indicators 130 and 135, in some embodiments, may be shown on two separate small displays. Some embodiments may not include one or both indicators 130 and 135.

The camera 100, in some embodiments, may include a memory card compartment 145 to include one or more memory modules, such as, for example, and without limitations, non-volatile memory cards. A memory card or memory cartridge is an electronic data storage device. Memory cards are typically made of flash memory. The memory card compartment 145 may include a lockable door 150 and a door hinge 155 around which the door 150 may rotate.

The camera 100, in some embodiments, may include a battery compartment 160 to hold one or more rechargeable batteries (not shown). Some embodiments may include one rechargeable battery. Other embodiments may include several rechargeable batteries. For simplicity, the terms battery and batteries are used interchangeably.

The battery compartment 160 may include a lockable door 169. The memory compartment door 150 and/or the battery compartment door 169, may be configured to be locked remotely by one or more electronic devices and/or by one or more physical locks 140. The physical lock 140 may be locked and unlocked by a special made key. The key may be used, for example, by supervisory personnel to lock the camera before the camera is dispatched to the filed for an assignment. In the depicted embodiment, once the key is used to unlock the physical lock 140, the push release 142 may be used to unlock the camera. Some embodiments may include a lockable stripe (not shown) that may connect the sections 161-166 together. Once the sections 161-166 are attached together and the stripe is locked by a physical lock, the sections may no longer be separated without unlocking the stripe.

Some embodiments may include only one remotely lockable door to cover both the battery compartment and the memory card compartment. For example, and without limitations, both battery compartment and the memory card compartments may be on the same section or the camera may have a unitary housing. In these embodiments, one remotely controlled electronic lock may be used to lock and unlock the door for the battery and memory card compartments. In addition to, or in lieu of, remotely controlled electronic lock, some embodiments may use one physical lock to lock and unlock the door for the battery and memory card compartments.

In addition to the battery compartment 160, the camera 100 may include one or more battery compartments, for example, and without limitations, the camera 100 may include a battery compartment (not shown) in the flashlight section 163 to include one or more batteries. The camera 100, in some embodiments, may be configured such that the battery (or batteries) in the flashlight section 163 may only be used to provide power to the flashlight 110. The camera 100, in some embodiments, may be configured to continue operating if the batteries in the flashlight section 163 are removed. For example, removing the batteries in the flashlight section 163, in some embodiments, may cause only the flashlight 110 not to operate. In other embodiments, the flashlight 100 may also continue to operate, for example, by receiving power from the batteries in the battery compartment 160. The battery compartment in the flashlight section 163 may, therefore, not be locked in some embodiments.

The camera 100 may include one or more charging ports 191-192 to charge the battery/batteries. The charging ports 191-192, in some embodiments, may be covered by waterproof caps 193-194, respectively. Further details of different components of the camera 100 are provided below.

Figure 2:
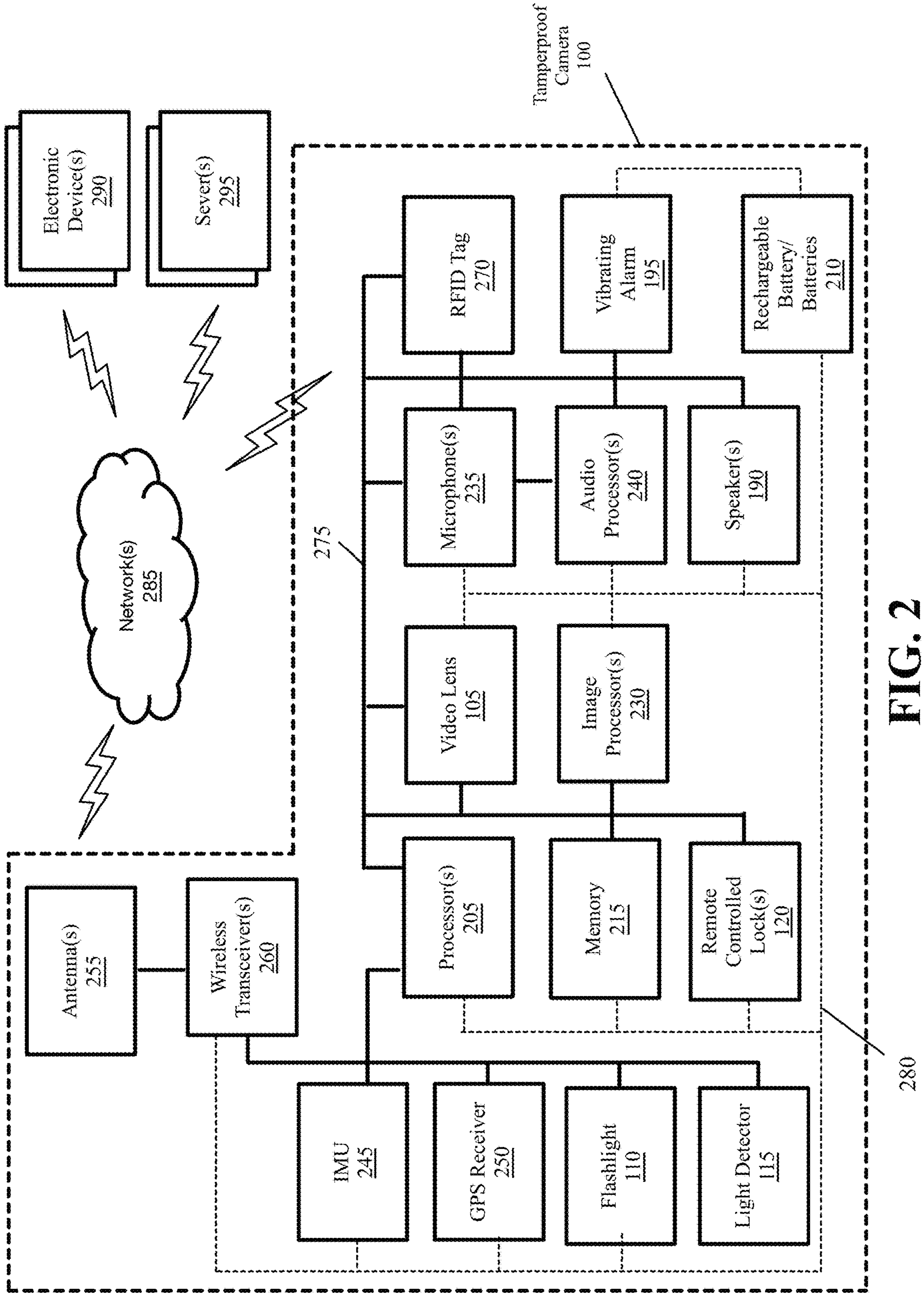
FIG. 2 is a functional block diagram illustrating different components of an example embodiment of a tamperproof camera, according to various aspects of the present disclosure.

FIG. 2 is a functional block diagram illustrating different components of an example embodiment of a tamperproof camera, according to various aspects of the present disclosure. With reference to FIG. 2, the tamperproof camera 100, may include the video lens 105, the flashlight 110, the light detector 115, the remote controlled locks 120, the speaker(s) 190, and/or the vibrating alarm 195, which were shown in FIGS. 1A-12D. The tamperproof camera 100 may further include one or more processors 205, one or more rechargeable batteries 210, one or more memory units 215, one or more image processors 230, one or more microphones 235, one or more audio processors 240, an IMU 245, a GPS receiver 250, one or more antennas 255, one or more wireless transceiver(s) 260, and/or a radio frequency identification (RFID) tag 270.

The wireless transceiver(s) 260 and the antenna(s) 255 may be used to communicate with one or more external electronic devices 290 and/or more or more servers 295 through one or more networks 285. The wireless transceiver(s) 260, may be, for example, and without limitations, cellular transceiver(s), Wi-Fi transceiver(s), and/or Bluetooth transceiver(s), etc. The electronic devices 290 may be the mobile devices associated with the wearers of the camera and/or electronic devices at remote locations.

The processor(s) 205 may control different operations of the camera, for example, and without limitations, locking and unlocking of the battery compartment, locking and unlocking of the memory compartment, locking and unlocking of the camera's attachable and detachable sections 161-166 (FIGS. 1A-1D) of the camera, communicating with external electronic devices, and/or controlling the operations of, or communicating with, different components of the camera 100.

The memory 215 may include, for example, and without limitations, non-volatile solid state memory (e.g., the memory 315 of FIGS. 3A-3B) that may be used by the processor(s) 205, the audio processor(s) 240, and/or the image processor(s) 230 to store and retrieve machine readable instructions and/or data. The memory 215 may include, for example, and without limitations, flash memory stored in the memory card compartment 145 to store and retrieve audio and video captured by the microphone(s) 235 and the video lens 215, video processed by the image processor(s) 230, and/or audio processed by the audio processor(s) 240.

Different components of the camera 100 shown in FIG. 2 may be communicatively coupled to each other through direct wire connections, through one or more busses, through wireless links, etc. The camera 100, in the depicted embodiment, may include one or more busses 275 to communicatively couple the camera components. For example, the bus(s) 275 may be used by the processor(s) 205 to communicate with and/or to control the other components of the camera 100. The bus(es) 275, in some embodiments, may be used by other components of the camera 100 to communicate with each other.

The camera 100 may include one or more rechargeable batteries 210. The batteries 210 may provide power to other components of the camera 100 through one or more wires 280. The RFID tag 270, as described below with reference to FIG. 23, may be used to turn on the camera's power in some embodiments. The camera 100, in some embodiments, may include one or more image processor(s) 230 that may process the images captured by the video lens. The processing may include, for example, and without limitations, noise reduction, image sharpening, demosaicing, etc. The image processor(s) 230 may also perform compressing, encrypting, etc. Some embodiments may not include the image processor(s) 230 and may use the processor(s) 205 for image processing. In some embodiments, the compressing, encrypting, etc., may be performed by the processor(s) 205 instead of the image processor(s) 230.

The camera 100 may include one or more microphones 235 that may record sound, which may be added to the video recorded by the video lens 105. The microphone(s) may be covered by the grille 125 (FIG. 1A).

The camera 100, in some embodiments, may include one or more speaker(s) 190. The speaker(s) may be used by remote operators to communication with the person wearing the camera 100 and/or to provide verbal instructions for performing different tasks. The speaker(s) and the microphone(s) may be used by the wearer to ask questions about different aspects of the assignment. For example, the camera 100, the electronic device(s) 290, and/or the server(s) 295 may include one or more libraries describing different aspects of an assignment (e.g., how to remove a tough stain during a cleaning assignment, how to wire an electrical fixture during a maintenance assignment, etc.).

The wearer of the camera may ask questions through the microphone(s) 235. An artificial intelligent module (in the camera 100, in the electronic device(s) 290, and/or in the server(s) 295) may find answer to the questions, and a voice synthesizer on the camera may provide the answer back to the wearer through the speaker(s) 190. The audio processor(s) 240 may process the audio signals, for example, and without limitations, to digitize sound waveforms, to control noise, to synthesize audio, etc. Some embodiments may provide a momentary switch (not shown) that may be pressed by the person wearing the camera in order to activate different features of the camera (e.g., access to the libraries) and/or to send status to external devices. The person may press the switch once, may press the switch several times in quick succession, may press and hold the momentary button one or more times in order to activate different features and/or send different status messages.

The camera 100 may include an IMU 245. The IMU 245 may include one or more sensors, such as, an accelerometer (e.g., a three-dimensional (3D) accelerometer), a magnetometer (e.g., a 3D magnetometer), and/or a gyroscope (e.g., a 3D gyroscope). The IMU's sensor(s) may measure one or more parameters that may allow the processor(s) 205 to determine the acceleration, the velocity, the orientation, and/or the location of the camera 100.

The IMU 245, in some of the present embodiments, may include one or more micro electro-mechanical system (MEMS) sensors and may be a single chip. In other embodiments, the accelerometer, the magnetometer, and/or the gyroscope may be in different chips (e.g., different MEMS chips) instead of a single chip.

The camera 100 may include a GPS receiver 250 that may be used to receive the location of the camera, for example, from one or more GPS satellites. As described below with reference to FIG. 30, the GPS receiver 250 and/or the IMU 245 may be used to determine the location of the camera 100, which may be used to alert the clients of the start of an assignment, to provide the location of the camera 100 for display on remote devices, to start and stop recording video, etc.

The camera 100 may include a vibrating alarm 195, which may be used to vibrate to take the attention of the wearer of the camera when an action has to be taken. The vibrating alarm 195, in some embodiments, may include a small electric motor, on the axis of which a metal cylinder is mounted. The axis of the engine may not coincide with the axis of the metal cylinder, which allows the metal cylinder to vibrate during rotation.

FIGS. 3A-8B illustrate the location of the components of FIG. 2 in different sections of a camera, such as the camera 100 of FIGS. 1A-1D. It should be noted that other embodiments may include a different number of sections and/or the components shown in a section may be located in another section in different embodiments.

Figure 3A:
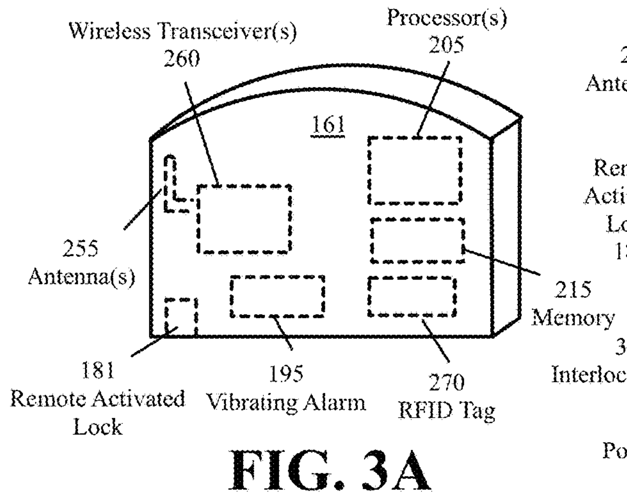
FIG. 3A is a top front perspective view and FIG. 3B is a bottom front perspective of an example embodiment of the computing and communication section of a tamperproof camera, according to various aspects of the present disclosure.
Figure 3B:
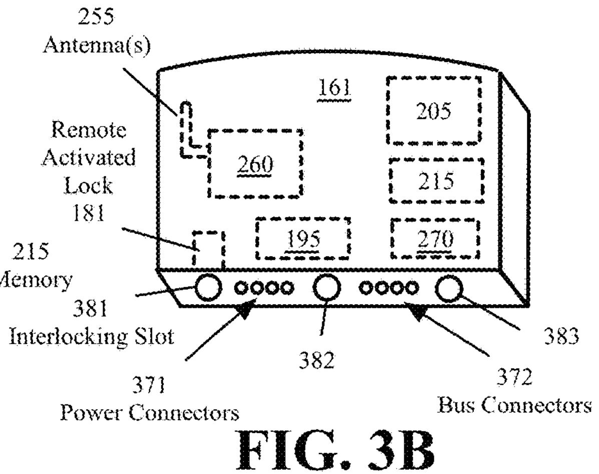

FIG. 3A is a top front perspective view and FIG. 3B is a bottom front perspective of an example embodiment of the computing and communication section of a tamperproof camera, according to various aspects of the present disclosure. With reference to FIGS. 3A-3B, the computing and communication section 161 may include the processor(s) 205, the memory 215, the RFID tag 270, the antenna(s) 255, the wireless transceiver(s) 260, and/or the vibrating alarm 195.

Figure 4A:
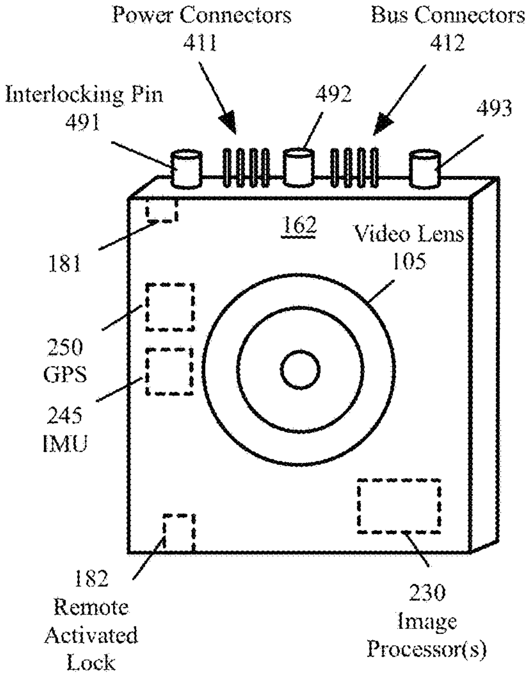
FIG. 4A is a top front perspective view and FIG. 4B is a bottom front perspective of an example embodiment of the video section of a tamperproof camera, according to various aspects of the present disclosure.
Figure 4B:
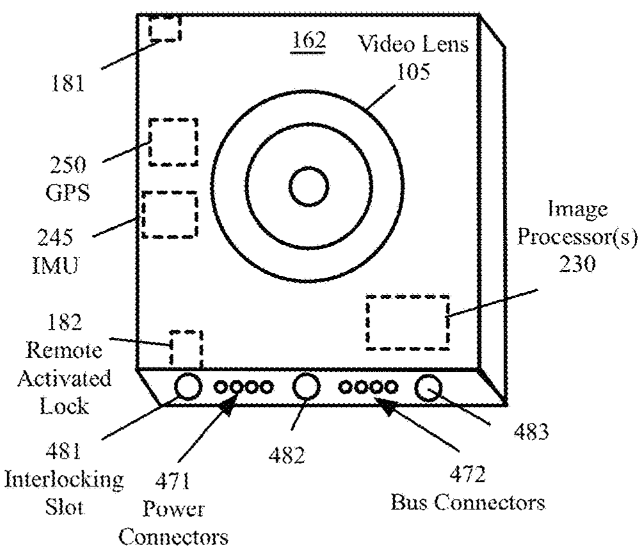

FIG. 4A is a top front perspective view and FIG. 4B is a bottom front perspective of an example embodiment of the video section of a tamperproof camera, according to various aspects of the present disclosure. With reference to FIGS. 4A-4B, the video section 162 may include the video lens 105, the image processor(s) 230, the IMU 245, and/or the GPS receiver 250.

The computing and communication section 161 of FIGS. 3A-3B and the video section 162 of FIGS. 4A-4B, in some embodiments, may be attached to and detached from each other. The interlocking pins 491-493 of the video section 162 may snugly fit into the interlocking slots 381-383 of the computing and communication section 161. The remote activated lock 181 between the sections 161 and 162 may be remotely controlled to allow or prevent the two sections to be separated from each other. Several different remote activated locks that may be used in different embodiments are described below with reference to FIGS. 10-11.

The power connectors 411 of the video section 162 may snugly fit into the power connectors 371 of the computing and communication section 161 in order to provide power lines (e.g., the power lines 280 of FIG. 2) throughout the camera 100. The bus connectors 412 of the video section 162 may snugly fit into the bus connectors 372 of the computing and communication section 161 in order to provide control and data lines of the bus (e.g., the bus 275 of FIG. 2) throughout the camera 100.

Figure 5A:
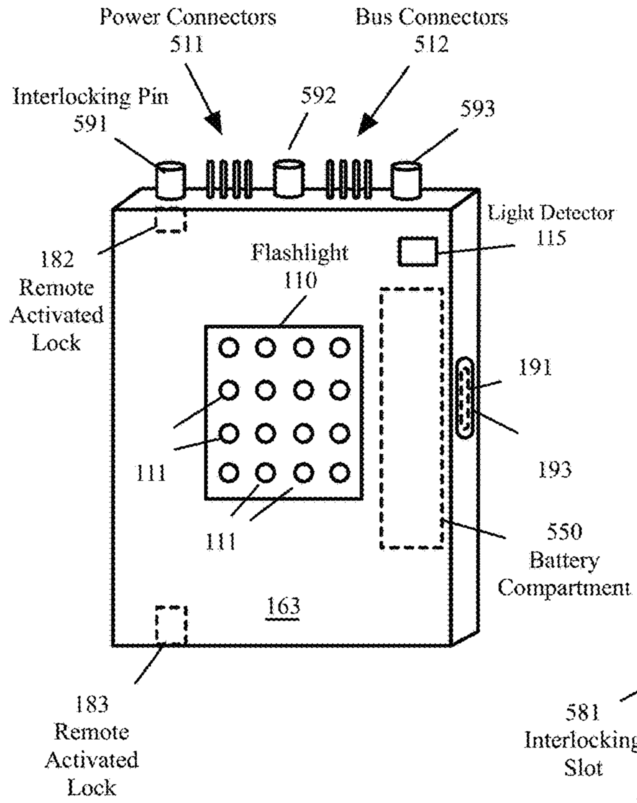
FIG. 5A is a top front perspective view and FIG. 5B is a bottom front perspective of an example embodiment of the flashlight section of a tamperproof camera, according to various aspects of the present disclosure.
Figure 5B:
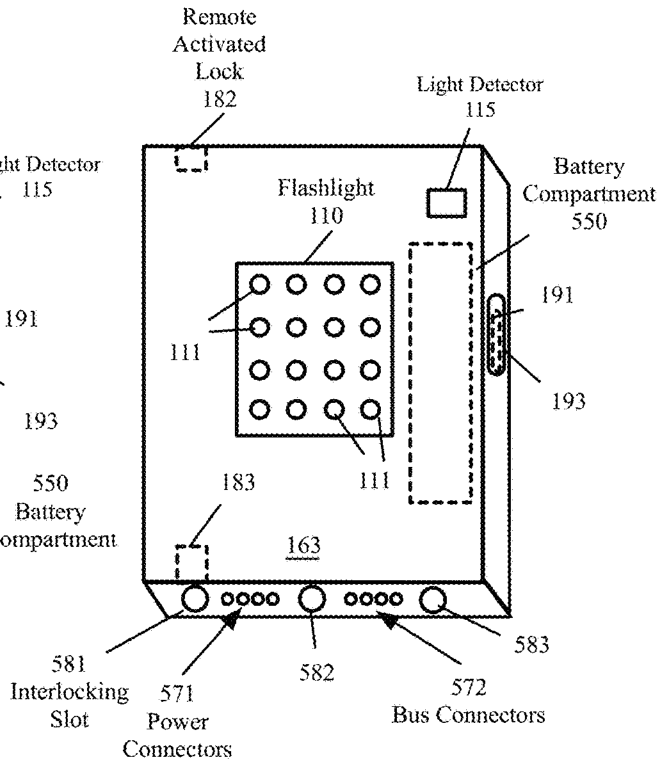

FIG. 5A is a top front perspective view and FIG. 5B is a bottom front perspective of an example embodiment of the flashlight section of a tamperproof camera, according to various aspects of the present disclosure. With reference to FIGS. 5A-5B, the flashlight section 163 may include the flashlight 110, the light source(s) 111, the light detector 115, the battery compartment 550, the charging port 191, and/or the charging port's waterproof cap 193. As described above, the camera may be configured such that even if the batteries are removed from the battery compartment 550, the camera may continue to operate using the batteries in the battery compartment 160 (FIG. 1B).

Figure 6A:
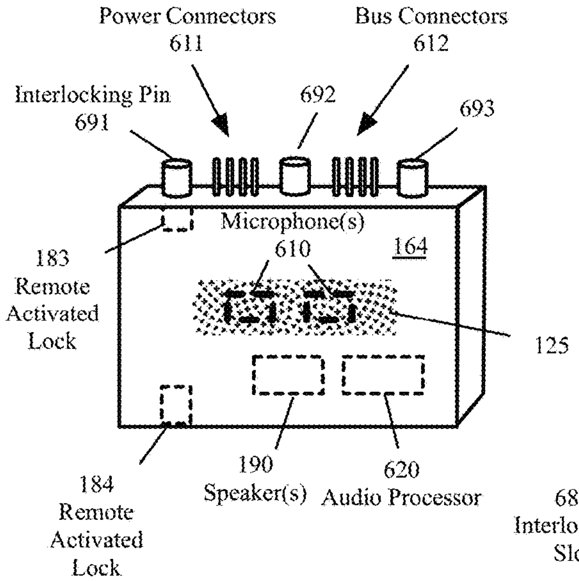
FIG. 6A is a top front perspective view and FIG. 6B is a bottom front perspective of an example embodiment of the audio section of a tamperproof camera, according to various aspects of the present disclosure.
Figure 6B:
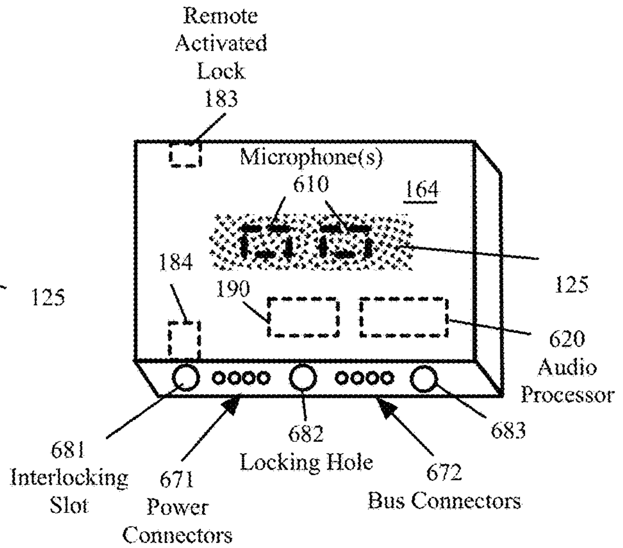

FIG. 6A is a top front perspective view and FIG. 6B is a bottom front perspective of an example embodiment of the audio section of a tamperproof camera, according to various aspects of the present disclosure. With reference to FIGS. 6A-6B, the audio section 164 may include one or more microphones 610, the grille 125, the audio processor(s) 240, and/or one or more speaker(s) 190.

The flashlight section 163 of FIGS. 5A-5B and the video section 162 of the FIGS. 4A-4B may be attached to and detached using the interlocking pins 591-593 and the interlocking slots 481-483. The remote activated lock 182 between the sections 162 and 163 may be remotely controlled to allow or prevent the two sections to be separated from each other.

The flashlight section 163 of FIGS. 5A-5B and the audio section 164 of the 6A-6B may be attached to and detached using the interlocking pins 691-693 and the interlocking slots 581-583. The remote activated lock 183 between the sections 163 and 164 may be remotely controlled to allow or prevent the two sections to be separated from each other.

The power connectors 511 of the flashlight section 163 may snugly fit into the power connectors 471 of the video section 162, and the power connectors 611 of the audio section 164 may snugly fit into the power connectors 571 of the flashlight section 163 in order to provide power lines (e.g., the power lines 280 of FIG. 2) throughout the camera 100. The bus connectors 512 of the flashlight section 163 may snugly fit into the bus connectors 472 of the video section 162, and bus connectors 612 of the audio section 164 may snugly fit into the bus connectors 572 of the flashlight section 163 in order to provide control and data lines of the bus (e.g., the bus 275 of FIG. 2) throughout the camera 100.

Figure 7A:
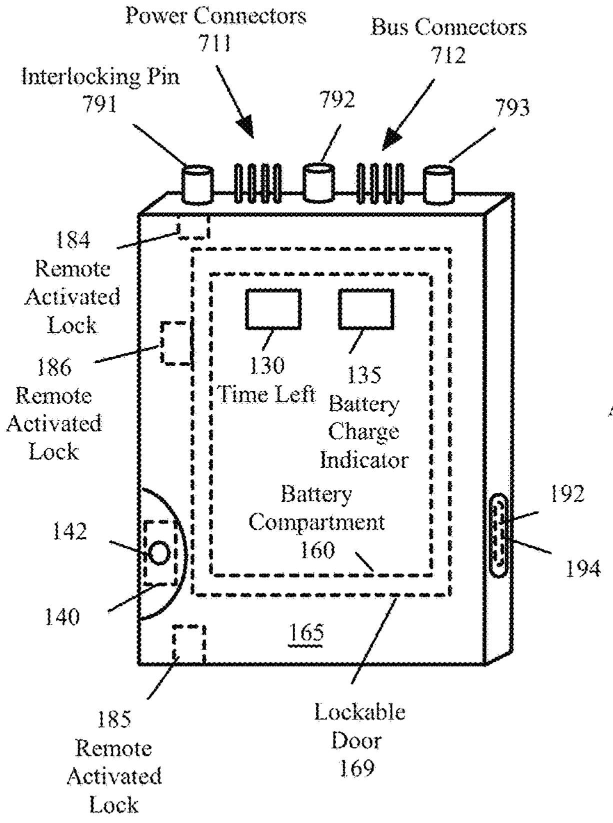
FIG. 7A is a top front perspective view and FIG. 7B is a bottom front perspective of an example embodiment of the battery section of a tamperproof camera, according to various aspects of the present disclosure.
Figure 7B:
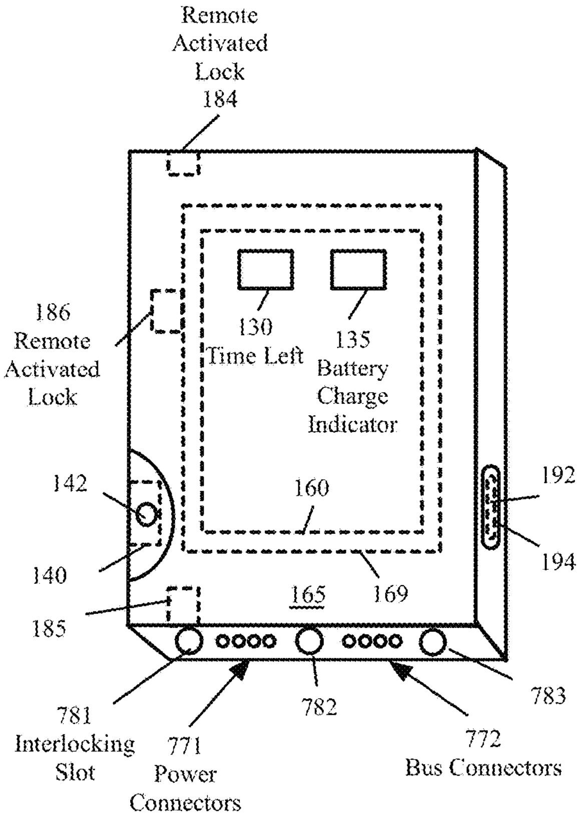

FIG. 7A is a top front perspective view and FIG. 7B is a bottom front perspective of an example embodiment of a battery section of the tamperproof camera, according to various aspects of the present disclosure. With reference to FIGS. 7A-7B, the battery section 165 may include the battery compartment 160, the battery compartment's lockable door 169, the time left indicator 130, the battery charge indicator 135, the charging port 192, the charging port's waterproof cap 194, the physical lock 140, and/or the physical lock's push release 142.

Figure 8A:
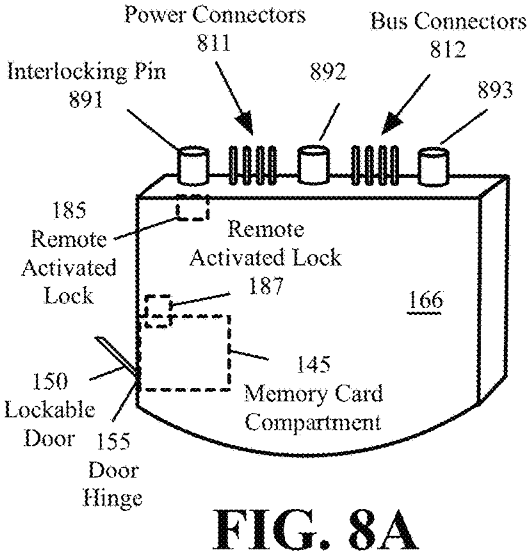
FIG. 8A is a top front perspective view and FIG. 8B is a bottom front perspective of an example embodiment of the memory card section of a tamperproof camera, according to various aspects of the present disclosure.
Figure 8B:
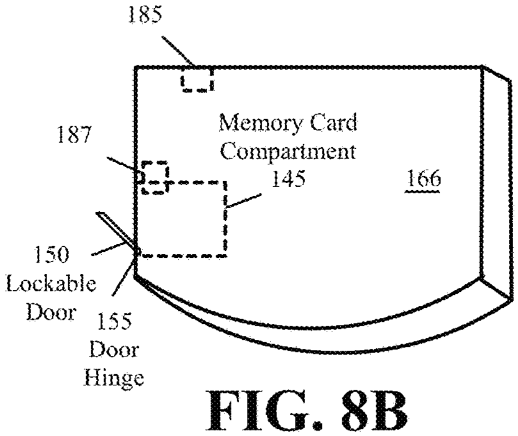

FIG. 8A is a top front perspective view and FIG. 8B is a bottom front perspective of an example embodiment of a memory card section of the tamperproof camera, according to various aspects of the present disclosure. With reference to FIGS. 8A-8B, the memory card section 166 may include the memory card compartment 145, the memory card compartment's door 150, and/or the door hinge 155.

The battery section 165 of FIGS. 7A-7B and the audio section 164 of the 6A-6B may be attached to and detached using the interlocking pins 791-793 and the interlocking slots 681-683. The remote activated lock 184 between the sections 164 and 165 may be remotely controlled to allow or prevent the two sections to be separated from each other.

The memory card section 166 of FIGS. 8A-8B and the battery section 165 of FIGS. 7A-7B may be attached to and detached using the interlocking pins 891-893 and the interlocking slots 781-783. The remote activated lock 185 between the sections 165 and 166 may be remotely controlled to allow or prevent the two sections to be separated from each other.

The power connectors 711 of the battery section 165 may snugly fit into the power connectors 671 of the audio section 164, and the power connectors 811 of the memory card section 166 may snugly fit into the power connectors 771 of the battery section 165 in order to provide power lines (e.g., the power lines 280 of FIG. 2) throughout the camera 100. The bus connectors 712 of the battery section 165 may snugly fit into the bus connectors 672 of the audio section 164, and bus connectors 812 of the memory card section 166 may snugly fit into the bus connectors 772 of the battery section 165 in order to provide control and data lines of the bus (e.g., the bus 275 of FIG. 2) throughout the camera 100.

Figures 9A, 9B:
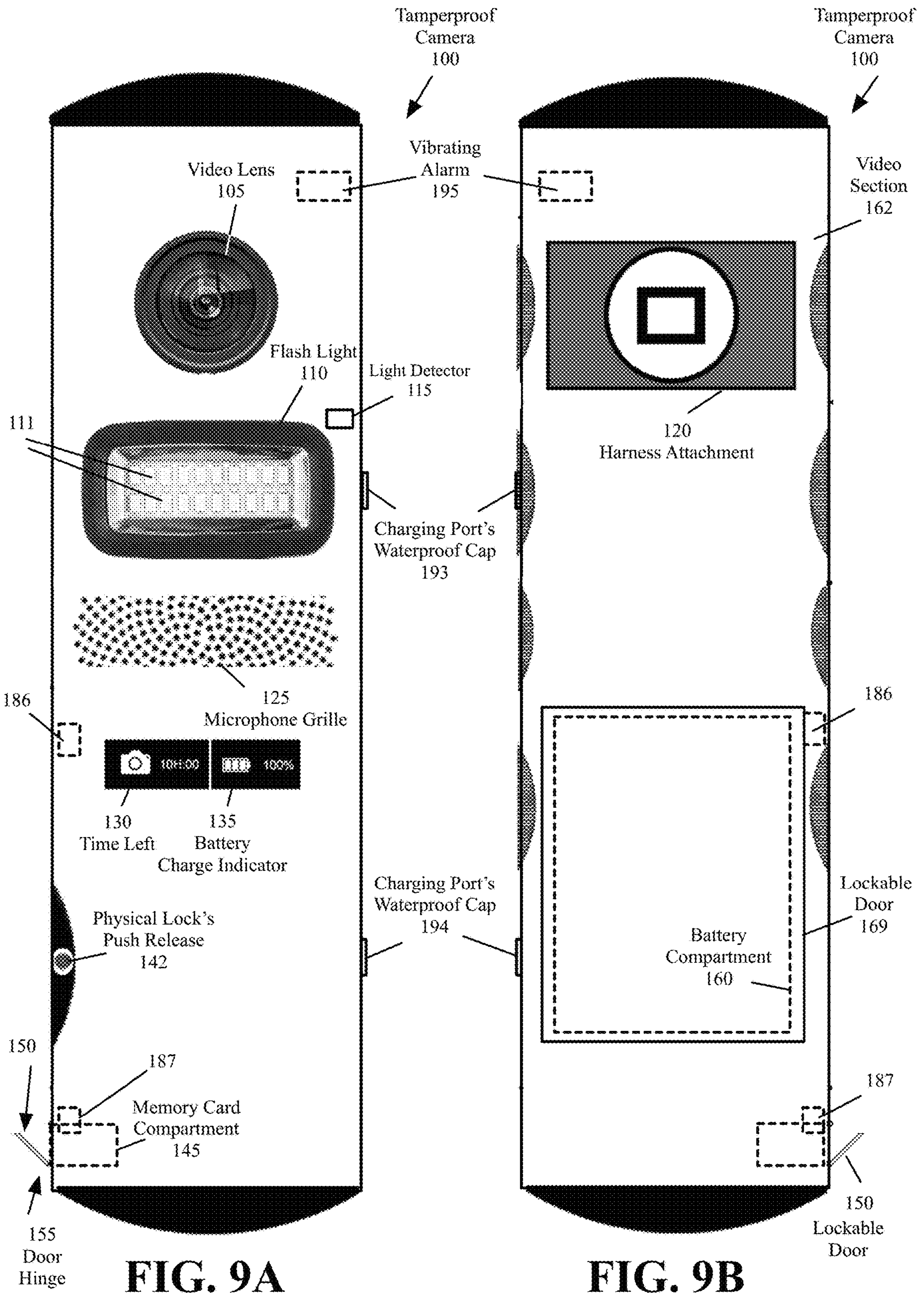
FIGS. 9A and 9B are, respectively, a schematic front elevation view and a schematic rear view of a tamperproof camera with a unitary housing, according to various aspects of the present disclosure.
Figure 9C:
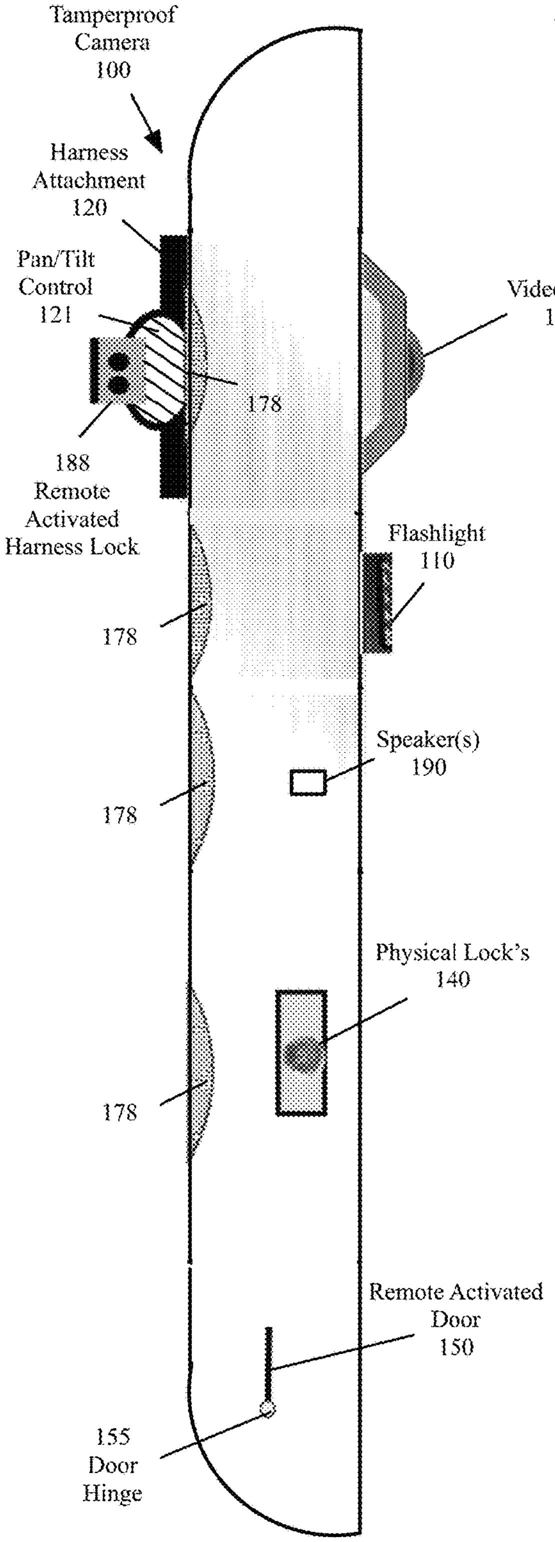
FIGS. 9C and 9D are schematic side elevation views of the tamperproof camera of FIGS. 9A and 9B, according to various aspects of the present disclosure.
Figure 9D:
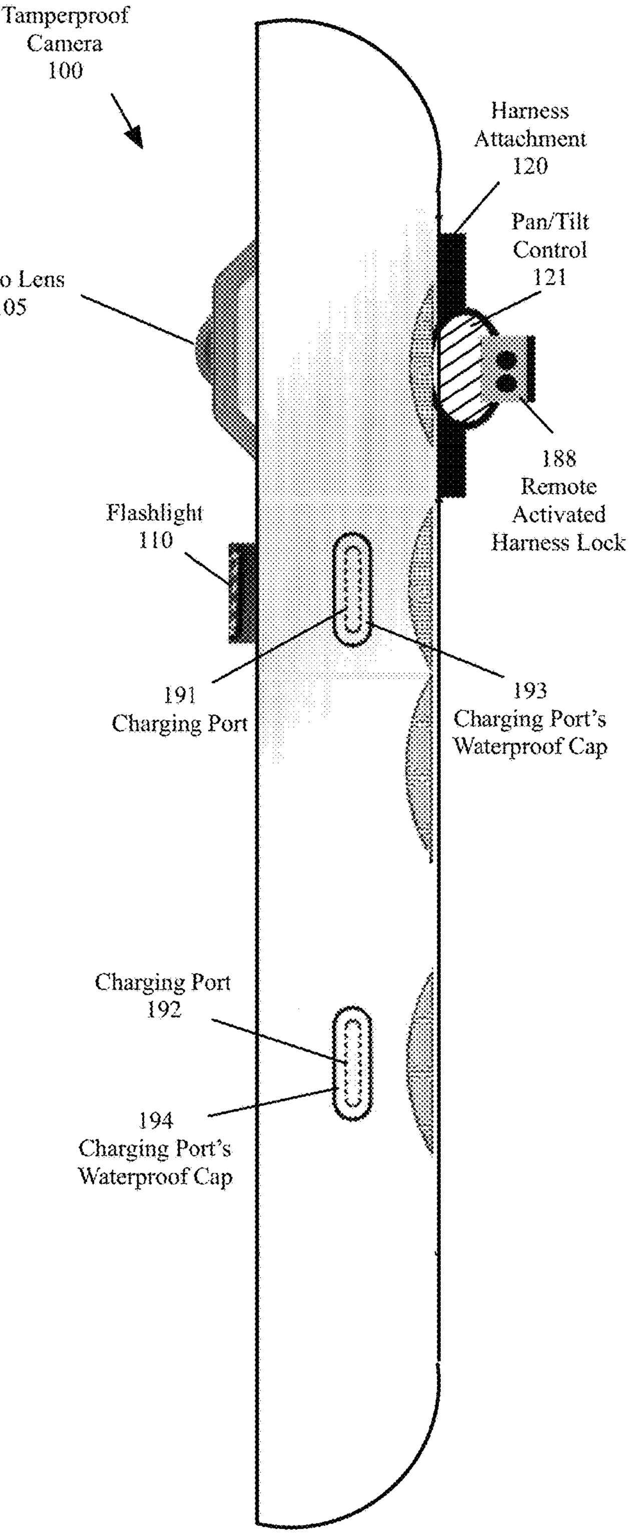

The tamperproof camera 100, in some embodiments, may not include separate attachable/detachable sections 161-166, described above. In some embodiments, the tamperproof camera's body may include a single, unitary housing. FIGS. 9A and 9B are, respectively, a schematic front elevation view and a schematic rear view of a tamperproof camera with a unitary housing, according to various aspects of the present disclosure. FIGS. 9C and 9D are schematic side elevation views of the tamperproof camera of FIGS. 9A and 9B, according to various aspects of the present disclosure.

With reference to FIGS. 9A-9D, the camera 100 may not include the separate sections 161-166, the rubber seals 175, and the remote activated locks 181-185 of the camera 100 of FIGS. 1A-1D. Other components of the camera 100 of FIGS. 9A-9D may be similar to the components of the camera 100 described above with reference to FIGS. 1A-8B. It should be noted that the features of the tamperproof camera that are described with reference to a camera that includes multiple attachable and detachable sections, may also be included in a camera with a unitary housing. For example, and without limitations, the pan and tilt control of FIGS. 18A-18D, the power switch 2410 of FIG. 24, etc., may be implemented on the tamperproof camera of FIGS. 9A-9D.

Figure 10:
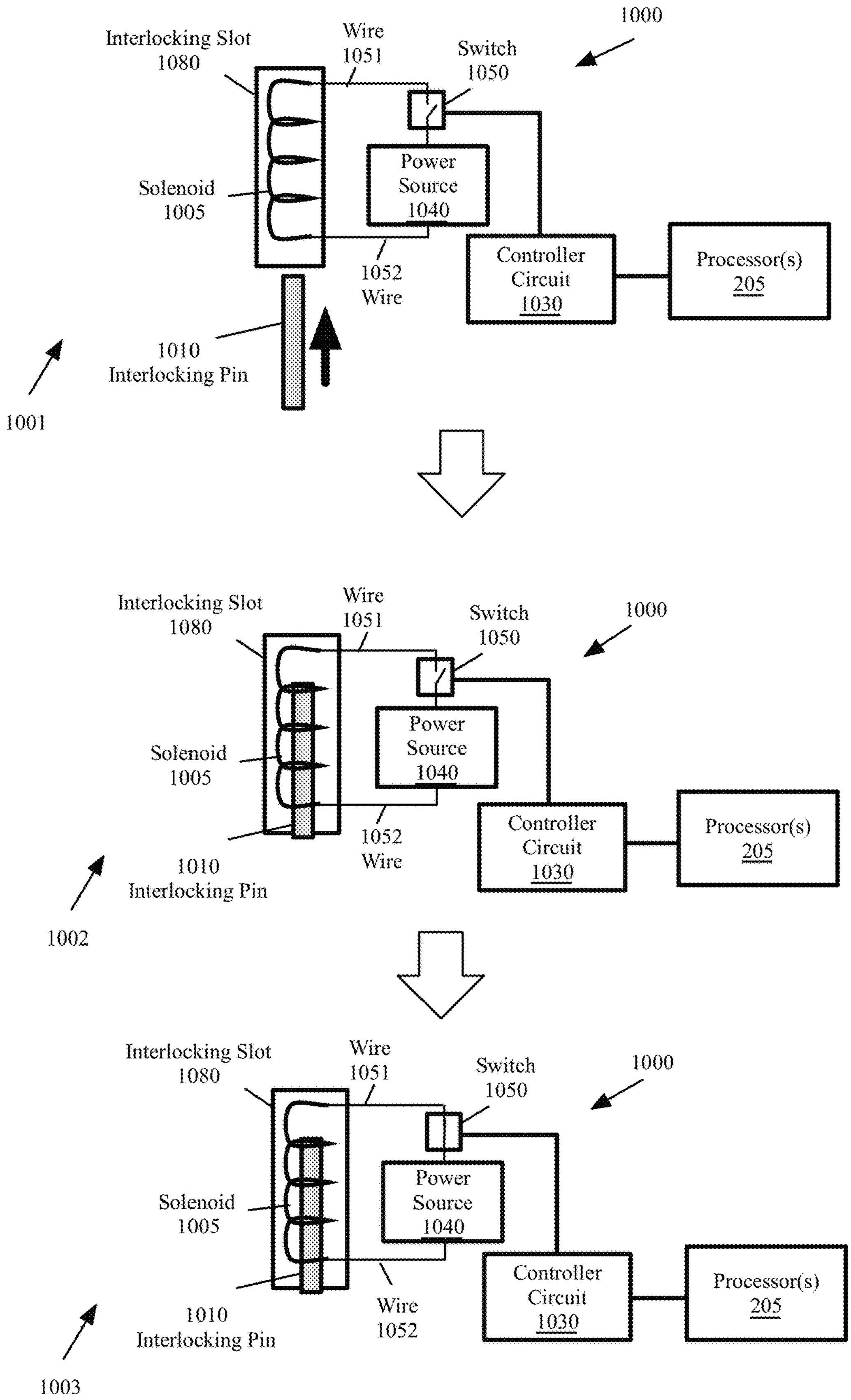
FIG. 10 is a functional diagram illustrating an embodiment of a remote activated lock, according to various aspects of the present disclosure.

Different embodiments may use different types of remote activated locks. Several nonlimiting examples of the remote activated locks used by different embodiments are described below with reference to FIGS. 10-11. FIG. 10 is a functional diagram illustrating an embodiment of a remote activated lock, according to various aspects of the present disclosure. With reference to FIG. 10, the remote activated lock 1000 may include a solenoid 1005, a controller circuit 1030, a power source 1040, and a switch 1050. The remote activated lock 1000 of FIG. 10 may be any remote activated locks 181-188 of FIGS. 1A-1D and 3A-7B. The interlocking pin 1010 may be any interlocking pin 491, 591, 691, 791, and/or 891 shown in FIGS. 4A, 5A, 6A, 7A, and 8A, respectively. The interlocking slot 1080 may be any interlocking slot 381, 481, 581, 681, and/or 781 shown in FIGS. 3B, 4B, 5B, 6B, and 7B, respectively.

The solenoid 1005 may be an electromagnetically inductive coil and may function as a transducer that converts energy into linear motion. The interlocking pin 1010 may be made of a metallic material. The switch 1050 may operate as a relay. The power source 1040 may be the camera's batteries.

FIG. 10, as shown, includes three operational stages 1001-1003. In stage 1001, the switch 1050 is open and the interlocking pin 1010 is out of the interlocking slot 1080. In stage 1002, the interlocking pin 1010 is manually placed (e.g., by a person) into the interlocking slot 1080. Since the switch 1050 is still open, the solenoid 1005 may not generate a magnetic field. In this stage, the interlocking pin 1010 may be easily removed from the interlocking slot 1080.

In stage 1003, the processor(s) 205 of the tamperproof camera may receive a signal, for example, and without limitations, from an external device through the antenna(s) 255 (FIG. 2) and the transceiver(s) 260 to lock the remote activated lock 1000.

The processor(s) 205 may send one or more signals to the controller circuit 1030 to close the switch 1040. In response, the controller circuit 1030 may close the switch 1050. After the switch 1050 is closed, power from the power source 1040 may go through the wires 1051-1052 and the solenoid 1005. The solenoid 1005 may be configured to generate a magnetic field that is strong enough to hold the interlocking pin 1010 in place and does not allow the interlocking pin 1010 to be pulled out of the interlocking slot 1080.

The processor(s) 205 may subsequently receive a signal, for example, and without limitations, from an external device through the antenna(s) 255 (FIG. 2) and the transceiver(s) 260 to unlock the remote activated lock 1000. In response, the processor(s) 205 may send one or more signals to the controller circuit 1030 to open the switch 1040. In response, the controller circuit 1030 may open the switch 1050. After the switch 1050 is opened, power from the power source 1040 may not go through the wires 1051-1052 and the solenoid 1005 may no longer generate a magnetic field that is strong enough to keep the interlocking pin 1010 in place. The interlocking pin 1010 may then be manually removed from the inside of the interlocking slot 1080.

Figure 11:
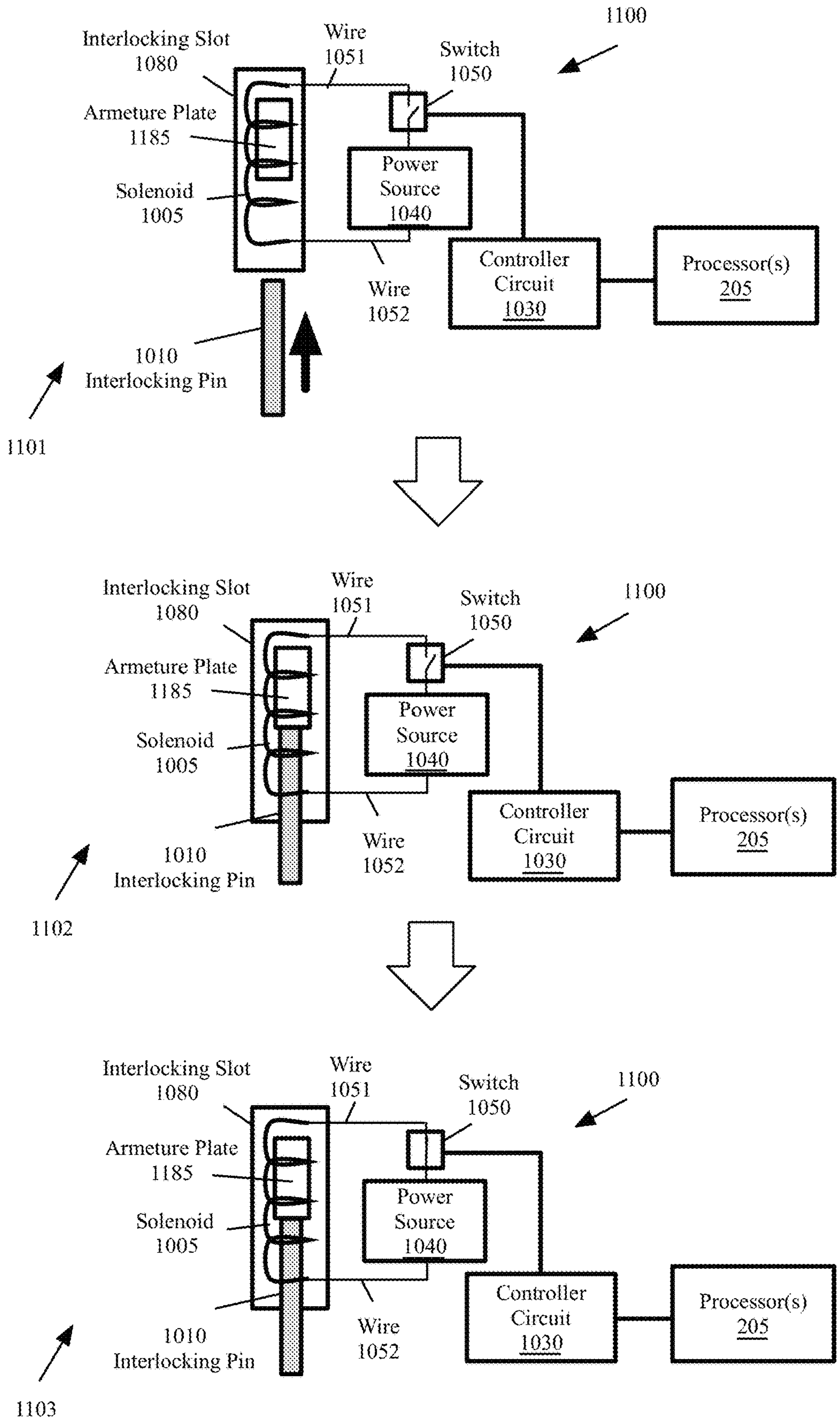
FIG. 11 is a functional diagram illustrating an embodiment of a remote activated lock with an armature, according to various aspects of the present disclosure.

FIG. 11 is a functional diagram illustrating an embodiment of a remote activated lock with an armature, according to various aspects of the present disclosure. The remote activated lock 1100 of FIG. 11 may be any remote activated locks 181-188 of FIGS. 1A-1D and 3A-7B. With reference to FIG. 11, the remote activated lock 1100 may include a solenoid 1005, a controller circuit 1030, a power source 1040, and a switch 1050, which may be similar to the corresponding components of FIG. 10. The interlocking pin 1010 and the interlocking slot 1080 may be similar to the corresponding components of FIG. 10.

The remote activated lock 1100 may include the armature plate 1185. When the switch 1050 is closed and an electric current passes through the wires 1051-1052 and the solenoid 1005, a magnetic field may be generated by the solenoid 1005 that may make the armature 1185 a magnet.

FIG. 11, as shown, includes three operational stages 1101-1103. In stage 1101, the switch 1050 is open and the interlocking pin 1010 is out of the interlocking slot 1080. In stage 1102, the interlocking pin 1010 is manually placed (e.g., by a person) into the interlocking slot 1080. Since the switch 1050 is still open, the solenoid 1005 may not generate a magnetic field and the armature plate 1185 may not act as a magnet. In this stage, the interlocking pin 1010 may be easily removed from the interlocking slot 1080.

In stage 1103, the processor(s) 205 of the tamperproof camera may receive one or more signals, for example, and without limitations, from an external device through the antenna(s) 255 (FIG. 2) and the transceiver(s) 260 to lock the remote activated lock 1100.

The processor(s) 205 may send one or more signals to the controller circuit 1030 to close the switch 1050. In response, the controller circuit 1030 may close the switch 1050. After the switch 1050 is closed, power from the power source 1040 may go through the wires 1051-1052 and the solenoid 1005. The solenoid 1005 may generate a magnetic field and may make the armature plate 1185 a magnet. The solenoid 1005 and the armature plate 1185 be configured such that the armature's magnet is strong enough to hold the interlocking pin 1010 in place and does not allow the interlocking pin 1010 to be pulled out of the interlocking slot 1080.

The processor(s) 205 may subsequently receive one or more signals, for example, and without limitations, from an external device through the antenna(s) 255 (FIG. 2) and the transceiver(s) 260 to unlock the remote activated lock 1100. In response, the processor(s) 205 may send one or more signals to the controller circuit 1030 to open the switch 1050. In response, the controller circuit 1030 may open the switch 1050. After the switch 1050 is opened, power from the power source 1040 may not go through the wires 1051-1052 and the solenoid 1005. The solenoid 1005 may no longer generate a magnetic field that is strong enough to make the armature plate 1185 a magnet and keep the interlocking pin 1010 in place. The interlocking pin 1010 may then be manually removed from the inside of the interlocking slot 1080.

With reference to FIGS. 10-11, a similar mechanism may be used to lock and unlock the remote activated lock 186 of FIG. 7A-7B and the remote activated lock 187 of FIG. 8A-8B. For example, either the battery compartment's door 169 may include an interlocking pin and the camera's body may include an interlocking slot, or the battery compartment's door 169 may include an interlocking slot and the camera's body may include an interlocking pin. A remote activated lock, such as, for example, and without limitations, the remote activated lock 1000 of FIG. 10 or the remote activated lock 1100 of FIG. 11 may be used to lock and unlock the battery compartment's door 169, as described above with reference to FIGS. 10 and 11, respectively.

As another example, either the memory card compartment's door 150 may include an interlocking pin and the camera's body may include an interlocking slot, or the memory card compartment's door 150 may include an interlocking slot and the camera's body may include an interlocking pin. A remote activated lock, such as, for example, and without limitations, the remote activated lock 1000 of FIG. 10 or the remote activated lock 1100 of FIG. 11 may be used to lock and unlock the memory card compartment's door 150, as described above with reference to FIGS. 10 and 11, respectively.

With reference to FIGS. 1B-1D, the harness attachment 120 may be used to connect the tamperproof camera 100 to a body-worn harness. In some embodiments, the harness attachment 120 may be locked to, and unlocked from, the harness by a remote activated lock to prevent the camera 100 to be separated from the harness during an assignment. The harness attachment 120, in some embodiments, may be remotely controlled to pan and/or tilt the camera 100.

Figure 12:
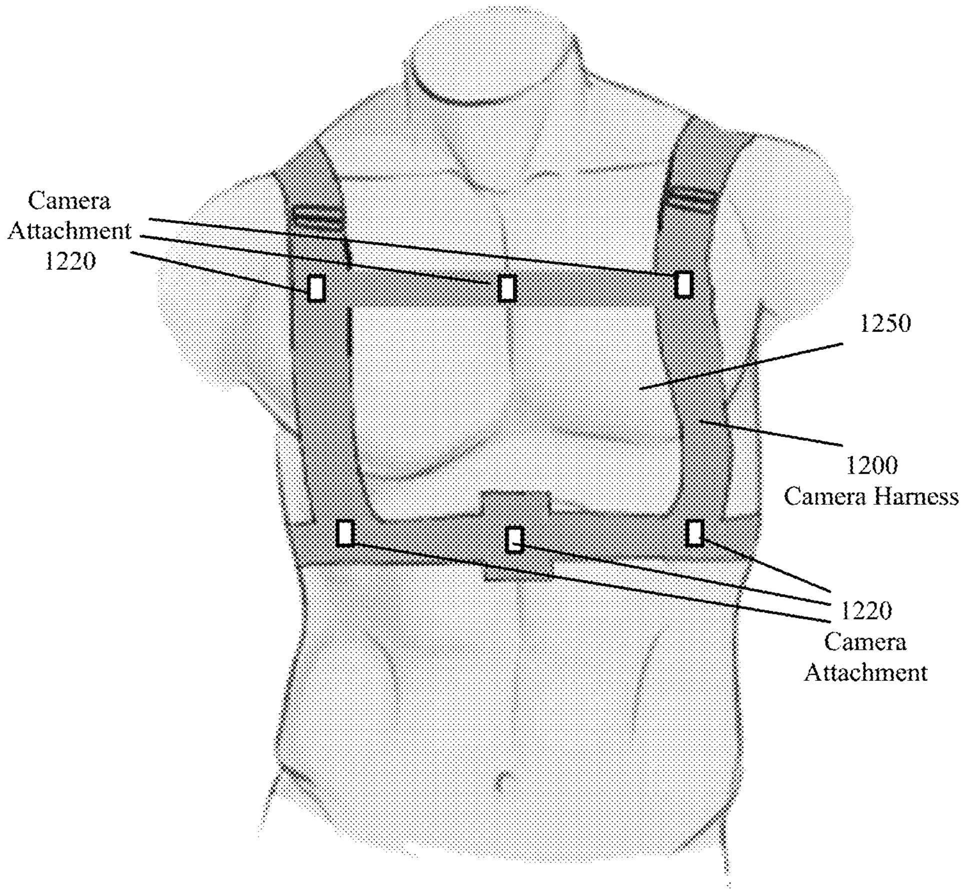
FIG. 12 is a front perspective view of a camera harness, according to various aspects of the present disclosure.

FIG. 12 is a front perspective view of a camera harness, according to various aspects of the present disclosure. With reference to FIG. 12, the camera harness 1200 may be worn on the upper torso of a person 1250. The harness 1200 may include one or more camera attachments 1220. Although six camera attachments 1220 are shown in FIG. 12, other embodiments may include fewer, or more, than six camera attachments 1220. Providing more than one camera attachment 1220 provides the technical advantage of allowing the person 1250 to attach the camera to different locations on the harness 1200, for example, and without limitations, depending on the type of the assignment, the person's height, and/or personal preferences.

Figure 13A:
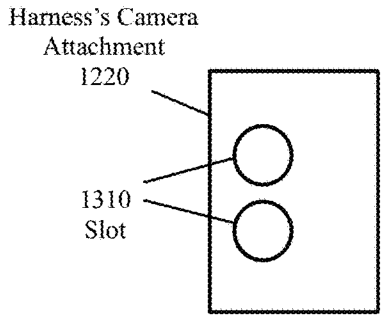
FIG. 13A is a side elevation view and FIG. 13B is a front elevation view of a harness's camera attachment, according to various aspects of the present disclosure.
Figure 13B:
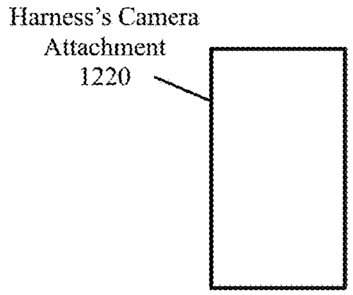

FIG. 13A is a side elevation view and FIG. 13B is a front elevation view of a harness's camera attachment 1220, according to various aspects of the present disclosure. With reference to FIGS. 13A-13B, the harness's camera attachment 1220 may be any one of the camera attachments 1220 of FIG. 12. The camera attachment 1220 may include one or more slots (or openings) 1310 that may be configured to receive corresponding spring loaded pins of a camera's harness attachment.

Figure 14A:
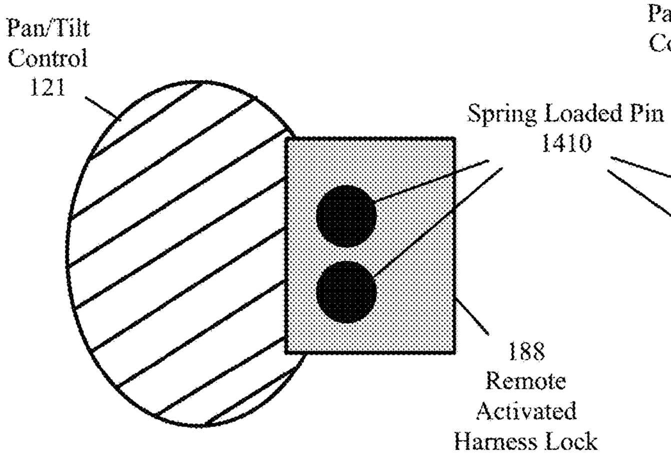
FIG. 14A is a side elevation view and FIG. 14B is a front elevation view of a tilt and pan control and a remote activated harness lock of a camera, according to various aspects of the present disclosure.
Figure 14B:
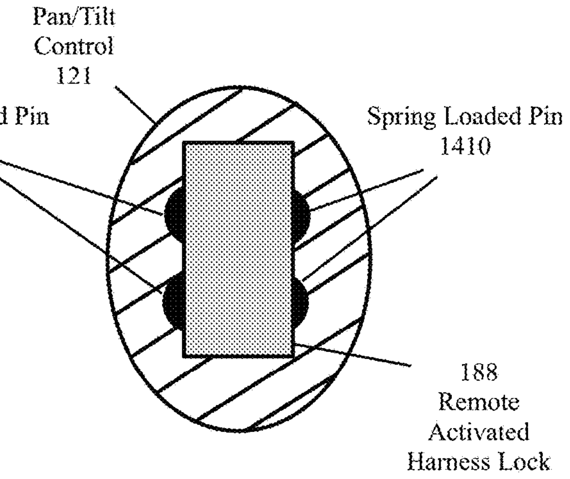

FIG. 14A is a side elevation view and FIG. 14B is a front elevation view of a tilt and pan control and a remote activated harness lock of a camera, according to various aspects of the present disclosure. With reference to FIGS. 14A-14B, the tilt and pan control 121 and the remote activated harness lock 188 may be similar to the corresponding components of FIGS. 1A-1D.

The remote activated harness lock 188 may include one or more spring loaded pins 1410 that may be configured to engage inside the corresponding slots 1310 (FIG. 13) of a harness's camera attachment 1320. Once the remote activated harness lock 188 is pushed inside the harness's camera attachment, the spring loaded pins 1410 are pushed in until they engage and latch inside the corresponding slots 1310 of the harness's camera attachment.

The processor(s) 205 (FIG. 2) of the camera may be configured to receive one or more signals from authorized remote electronic devices to lock or unlock the remote activated harness lock 188. In response, the processor(s) 205 may send one or more signals to the remote activated harness lock 188 to lock or unlock the spring loaded pins 1410 from the corresponding slots 1310. Although FIGS. 14A-14B show two spring loaded pins 1410 on each side of the remote activated harness lock 188, other embodiments may include any number of one or more pins on the sides of the remote activated harness lock 188. Yet other embodiments may have one or more pins only on one side of the remote activated harness lock 188.

With further reference to FIGS. 14A-14B, processor(s) 205 of the camera may be configured to receive one or more signals from authorized remote electronic devices to pan and/or tilt the camera when the camera is attached to the harness. In response, the processor(s) 205 may send one or more signals to the pan and tilt control 121 to pan and/or tilt the camera.

Figure 15:
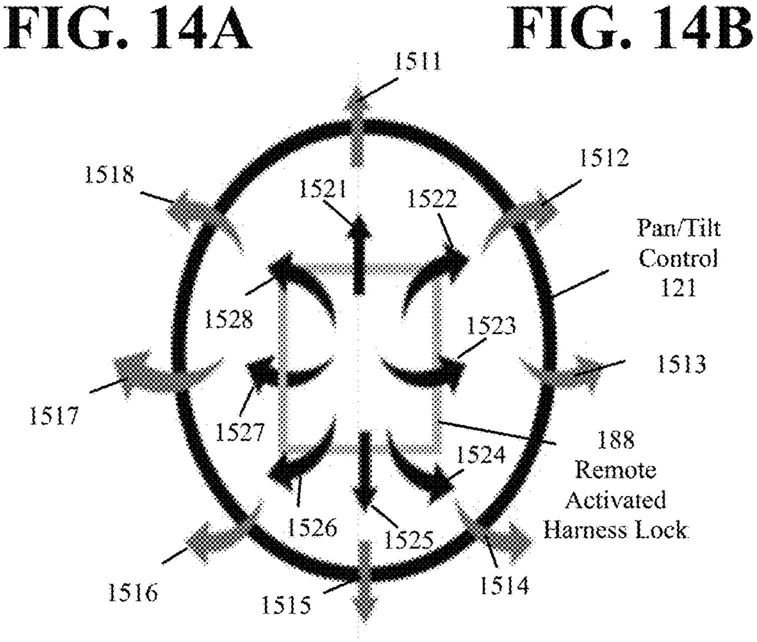
FIG. 15 is a functional diagram illustrating example pan and tilt movements of a camera while the camera is attached to a harness, according to various aspects of the present disclosure.

FIG. 15 is a functional diagram illustrating example pan and tilt movements of a camera while the camera is attached to a harness, according to various aspects of the present disclosure. With reference to FIG. 15, the pan and tilt control 121 may be configured to move the camera in several directions. In the example of FIG. 15, the camera may be paned and/or tilted by two movements in one of eight directions. The two movements are conceptually shown by two sets of arrows 1511-1518 and 1521-1528. Although only two movements and eight discrete directions are shown in FIG. 15, it should be noted that other embodiments may pan and tilt the camera with different number of movements than two and/or in different number of directions than eight.

Some embodiments may allow clients associated with an assignment to control the direction of the camera by remotely panning and tilting the camera. As described below, some embodiments provide an application that may be installed (e.g., after downloaded from the Internet) on the electronic devices of the clients. The clients may then get authenticated to view a user interface (UI) that may show livestreaming of the video captured by the camera while the camera is in their job assignment site. In some of these embodiments, the clients may be provided controls on the UI to pan and/or tilt the camera to view camera's video from different angles. In other embodiments, the camera may be remotely pan and/or tilted by remotely located administrative personnel.

Figure 16A:
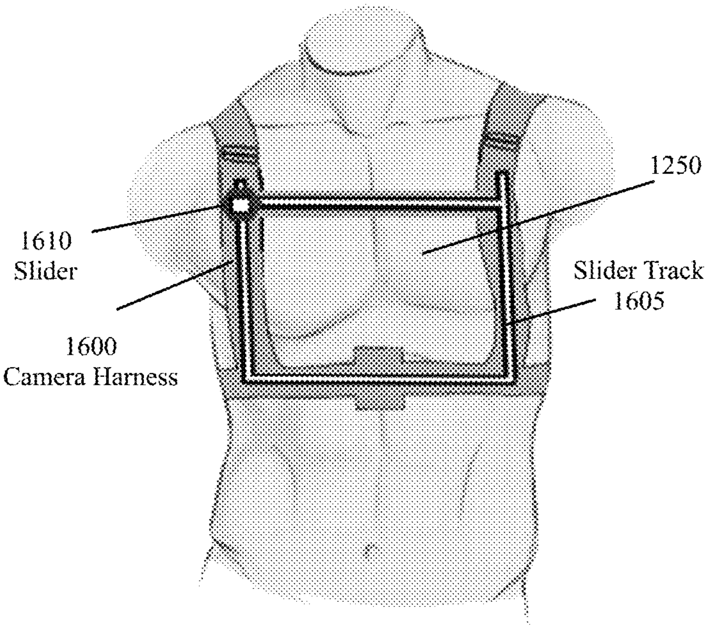
FIG. 16A is a front perspective view of a camera harness with a slider track, according to various aspects of the present disclosure.

The camera harness, in some embodiments, may provide a slider track to fine tune the position of the camera on the harness. FIG. 16A is a front perspective view of a camera harness with a slider track, according to various aspects of the present disclosure. With reference to FIG. 16A, the camera harness 1600 may be worn on the upper torso of a person 1250. The harness 1600 may include a slider track 1605 and a slider 1610 to allow the position of a camera that is attached to the slider 1610 to be changed along the track 1605.

Figure 16B:
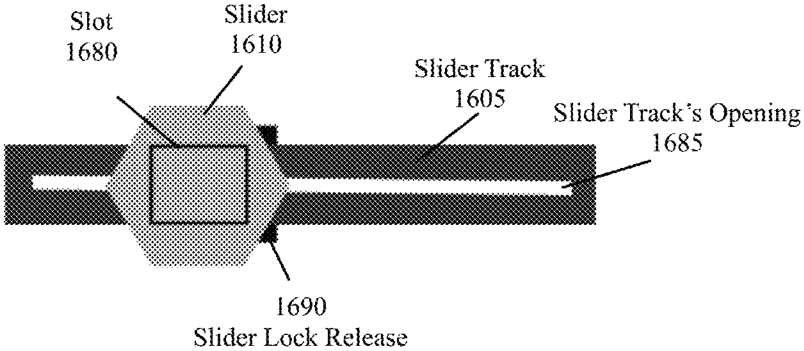
FIG. 16B is a front elevation view of a portion of a harness's slider track and a slider, according to various aspects of the present disclosure.

FIG. 16B is a front elevation view of a portion of a harness's slider track 1605 and a slider 1610, according to various aspects of the present disclosure. With reference to FIG. 16B, the slider 1610 may include a slot 1680 for inserting a remote activated harness lock of a camera. The slot 1680 and the remote activated harness lock (not shown) may be similar to the harness's camera attachment 1320 and the remote activated harness lock of FIGS. 14A-14B, respectively and may allow the camera to be remotely locked and unlocked and/or pan and tilted.

The slider 1610 may have a shape that facilitates grabbing and moving the slider through the opening 1685 along the slider track 1605 to adjust the position of a camera that is attached to the slider's slot 1680. In some embodiments, the slider 1610 may have a slider lock release 1690 to tighten to or loosen from the slider track 1605.

Figure 17A:
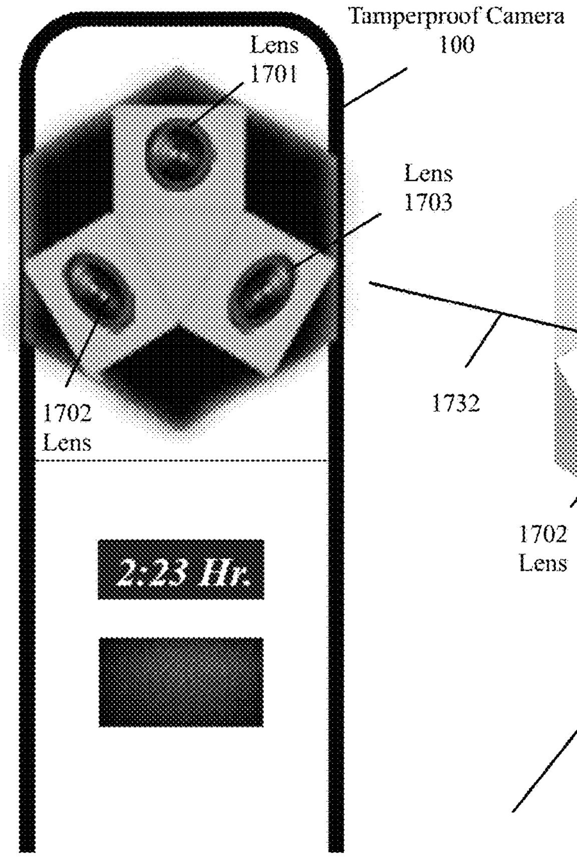
FIG. 17A is a front elevation view of a portion of a tamperproof camera that includes multiple lenses, according to various aspects of the present embodiments.
Figure 17B:
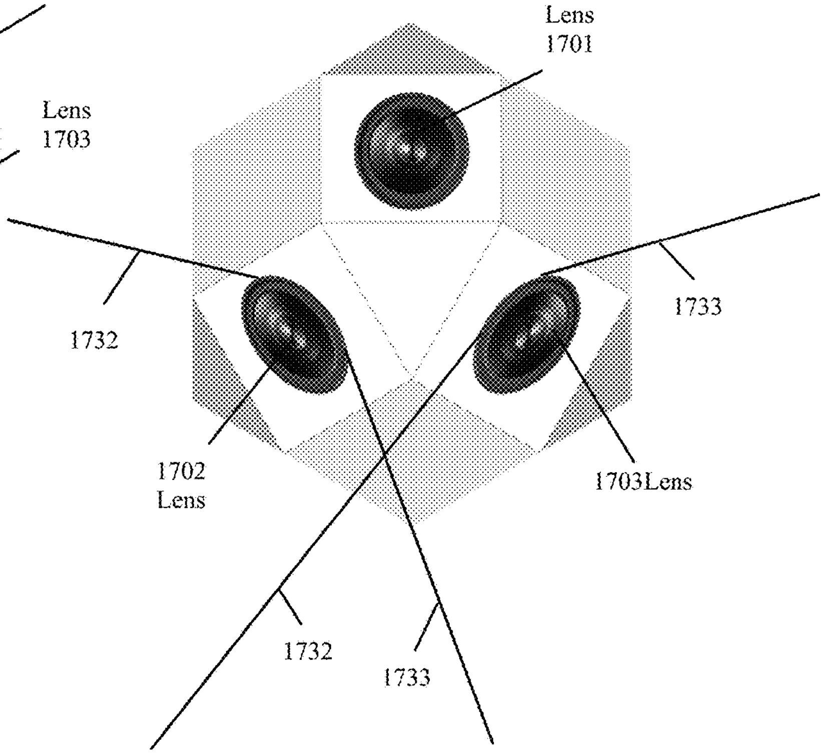
FIG. 17B is a close up view of the lenses of FIG. 17A, according to various aspects of the present embodiments.

The camera, in some embodiments, may include multiple lenses. The multiple lenses, in some embodiments, may eliminate the need to pan and tilt the camera to provide a wide angle view of a work assignment environment. FIG. 17A is a front elevation view of a portion of a tamperproof camera that includes multiple lenses, according to various aspects of the present embodiments. FIG. 17B is a close up view of the lenses of FIG. 17A, according to various aspects of the present embodiments. With reference to FIGS. 17A and 17B, the camera 100 may include a plurality of lenses 1701-1703 (in the example of FIG. 17A, three lenses are shown).

The lenses 1701-1703 may be arranged in a 3D arrangement (e.g., the face of the lenses 1701-1703 may not be in the same plane and the line of sight of the lenses 1701-1703 may not be parallel to each other. Each lens 1701-1703, in some embodiments, may be a wide angle lens. As shown by the angle of views 1732 and 1733 of the lenses 1702 and 1703, the lenses 1702 and 1703 may be used to capture video from the areas that are located at a lower position from the body of the camera.

The videos captured by the lenses 1701-1703 may then be combined to provide one video stream that may be displayed on the display of an electronic device. The user interface of the electronic device may provide tools to swipe the displayed video around and seamlessly gain different angles of the video footage. The combining of the videos, in some embodiments, may be dome by the processor(s) 205 (FIG. 2) of the camera. In other embodiments, the processor(s) 205 of the camera may encrypt the videos captured by the lenses 1701-1703 and transmit them, through the wireless transceiver(S) 260 to the server(s) 295 of FIG. 2 or the server(S) 1970 of FIG. 19. The server(s) 295 may decrypt and combine the videos. The server(s) 295 may then provide the video to one or more electronic devices such as, for example, and without limitations, the administrator device(s) 1980 (FIG. 19), the client devices 1901-1903, etc.

Figure 17C:
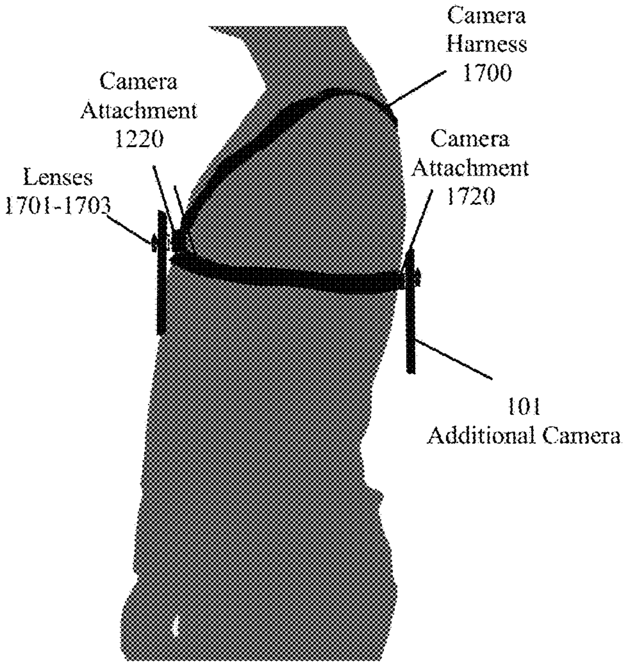
FIG. 17C is a perspective view of a camera harness that provides an additional camera attachment on the back of the wearer body, according to various aspects of the present embodiments.

FIG. 17C is a perspective view of a camera harness that provides an additional camera attachment on the back of the wearer body, according to various aspects of the present embodiments. The harness 1700 may include an additional camera attachment 1720 for attaching an additional camera 101 with one or more lenses. The video captured by the lens(es) of the additional camera 101 may also be combined with the video captured by the lenses 1701-1703 to provide a video stream with a 360 degree view of the work assignment environment. Other features of the harness 1700 may be similar to the harness 1200 of FIG. 12 or the harness 1600 of FIGS. 16A-16B. It should be noted that any of the cameras 100 described with reference to FIGS. 1A-1D, 9A-9D, 18A-18D, 24, and 36 may include multiple lenses and may provide combined videos as described with reference to the lenses 1701-1703 of FIGS. 17A and 17B.

The advantage of the multiple lens system of FIGS. 17A-17C and combining the videos captured by the lenses 1701-1703 over the pan and tilt option is that the pan and tilt feature only works if someone is actively monitoring the camera, which many clients may not want to do. The combined video provides with the similar general angles that is provided by panning and tilting a single camera.

Figure 18A:
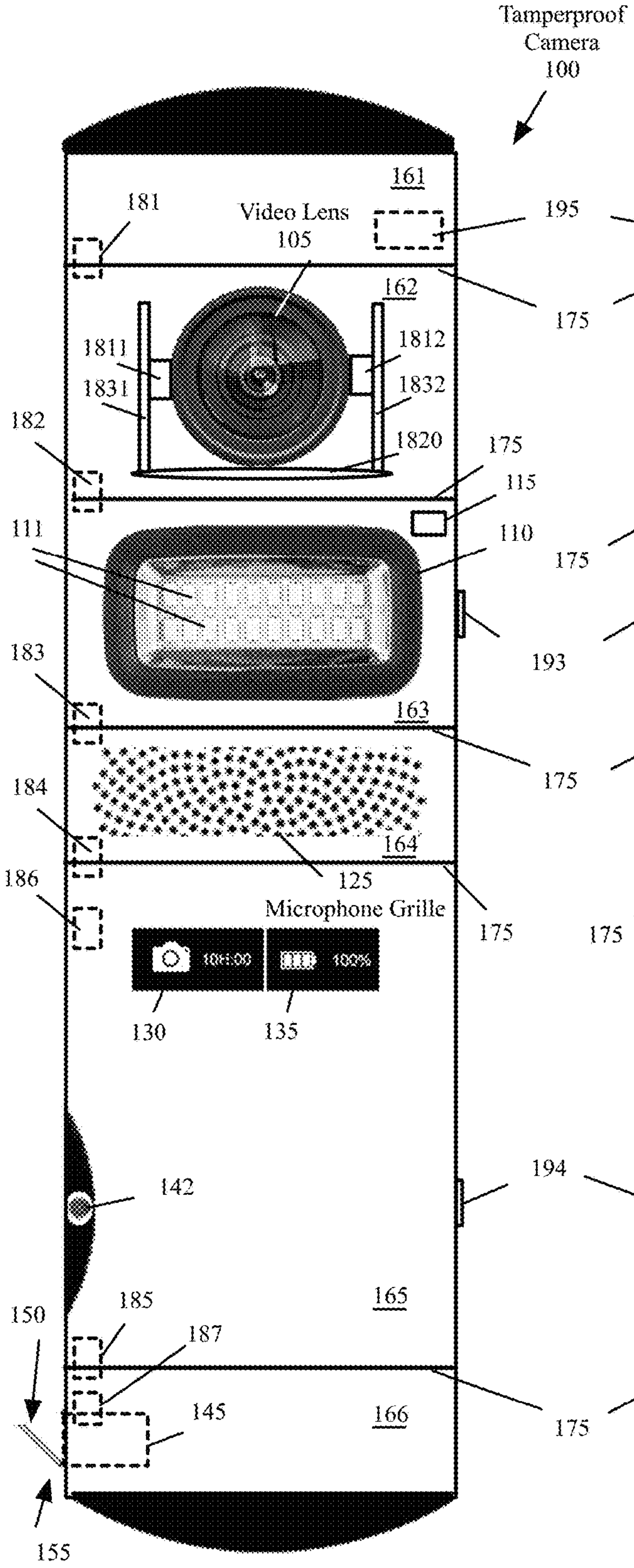
FIGS. 18A-18B are, respectively, a schematic front elevation view and a schematic rear view of a tamperproof camera with a pan and tilt control located on the camera, according to various aspects of the present disclosure.
Figure 18B:
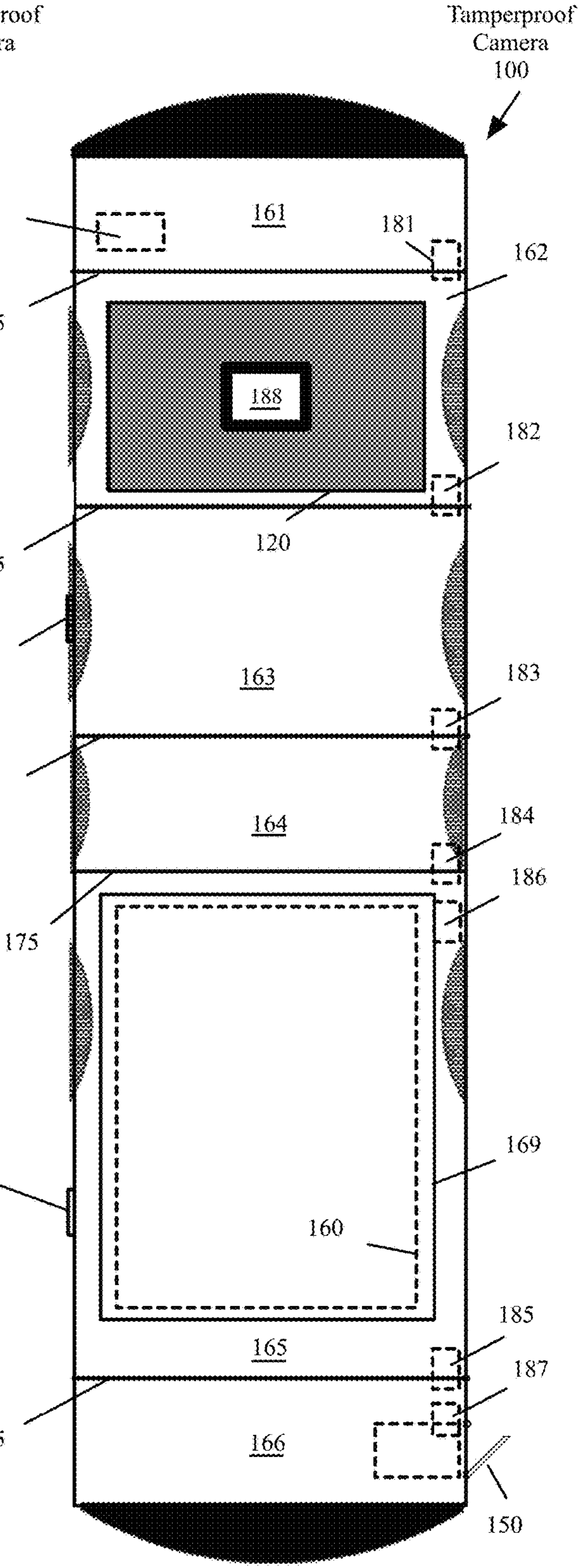
Figure 18C:
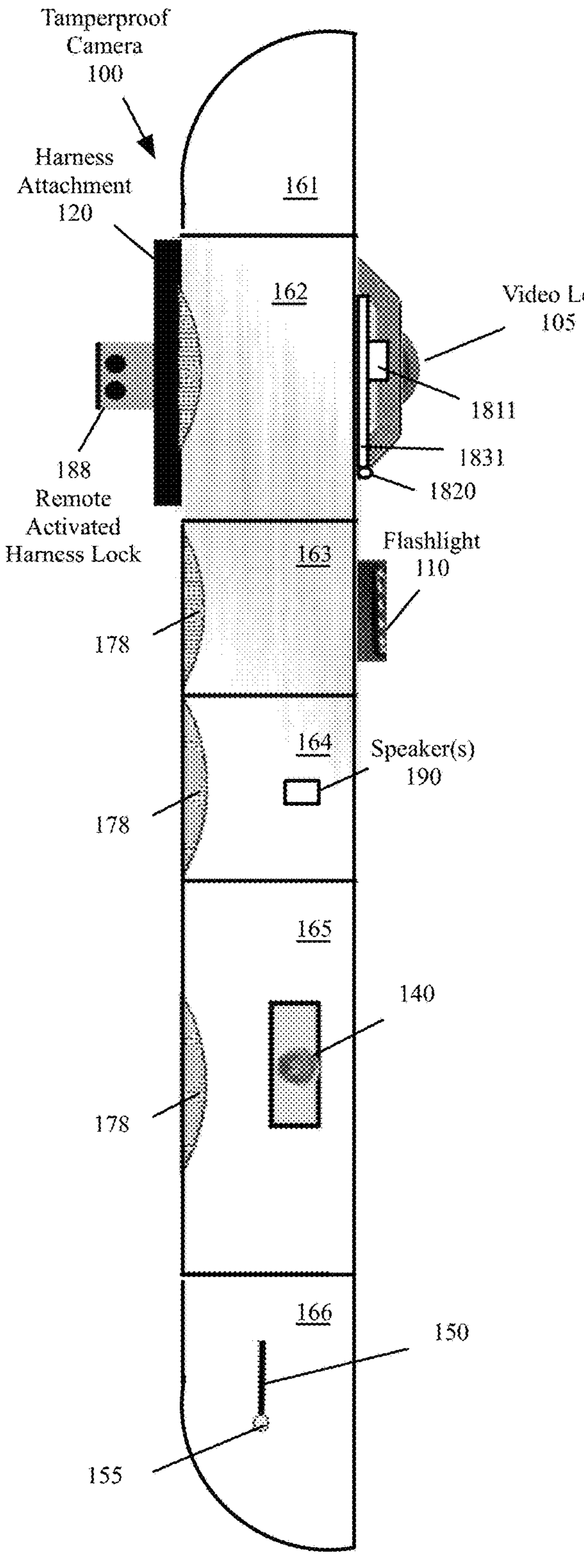
FIGS. 18C and 18D are schematic side elevation views of the tamperproof camera of FIGS. 18A and 18B, according to various aspects of the present disclosure.
Figure 18D:
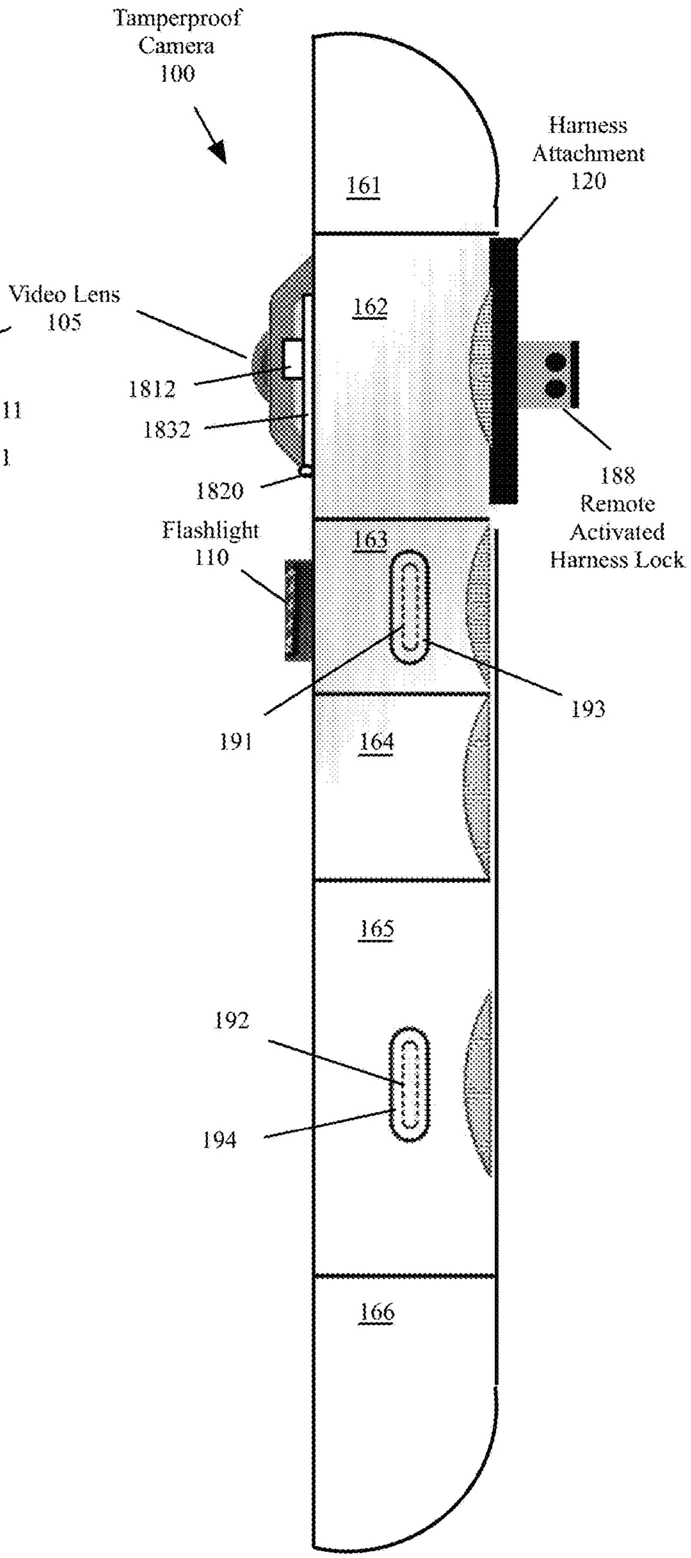

The embodiments of FIGS. 1A-1D provide a pan and tilt control 121 on the harness attachment 120. Some embodiments may provide a pan and tilt control on the camera's body. FIGS. 18A-18B are, respectively, a schematic front elevation view and a schematic rear view of a tamperproof camera with a pan and tilt control located on the camera, according to various aspects of the present disclosure. FIGS. 18C and 18D are schematic side elevation views of the tamperproof camera of FIGS. 18A and 18B, according to various aspects of the present disclosure.

With reference to FIGS. 18A-18D, the pan and tilt control may include the rotating components 1811-1812 (e.g., and without limitations, in the shape of cylinders), the spinning plate 1820 (e.g., and without limitations, in the shape of a disk), and the bars 1831-1832. The spinning plate 1820 may be configured to rotate side to side (to the left or right in the depicted orientation of FIG. 18A). The spinning plate 1820 may be configured to rotate up to a maximum degrees. For example, and without limitation, the spinning plate 1820 may be configured to rotate up to 30 degrees, 45 degrees, etc., to each side in order to pan the camera 100.

The rotating components 1811-1812 may be attached to the rods 1831-1832. The rotating components 1811-1812 may be configured to rotate the camera up and down up to a maximum degree in order to tilt the camera. 121

With further reference to FIGS. 18A-18D, processor(s) 205 (FIG. 2) of the camera may be configured to receive one or more signals from authorized remote electronic devices to pan and/or tilt the camera when the camera. In response, the processor(s) 205 may send one or more signals to the spinning plate 1820 and/or to the rotating components 1811-1812 to respectively pan or tilt the camera 100.

II. Tamperproof Camera Operation

Figure 19:
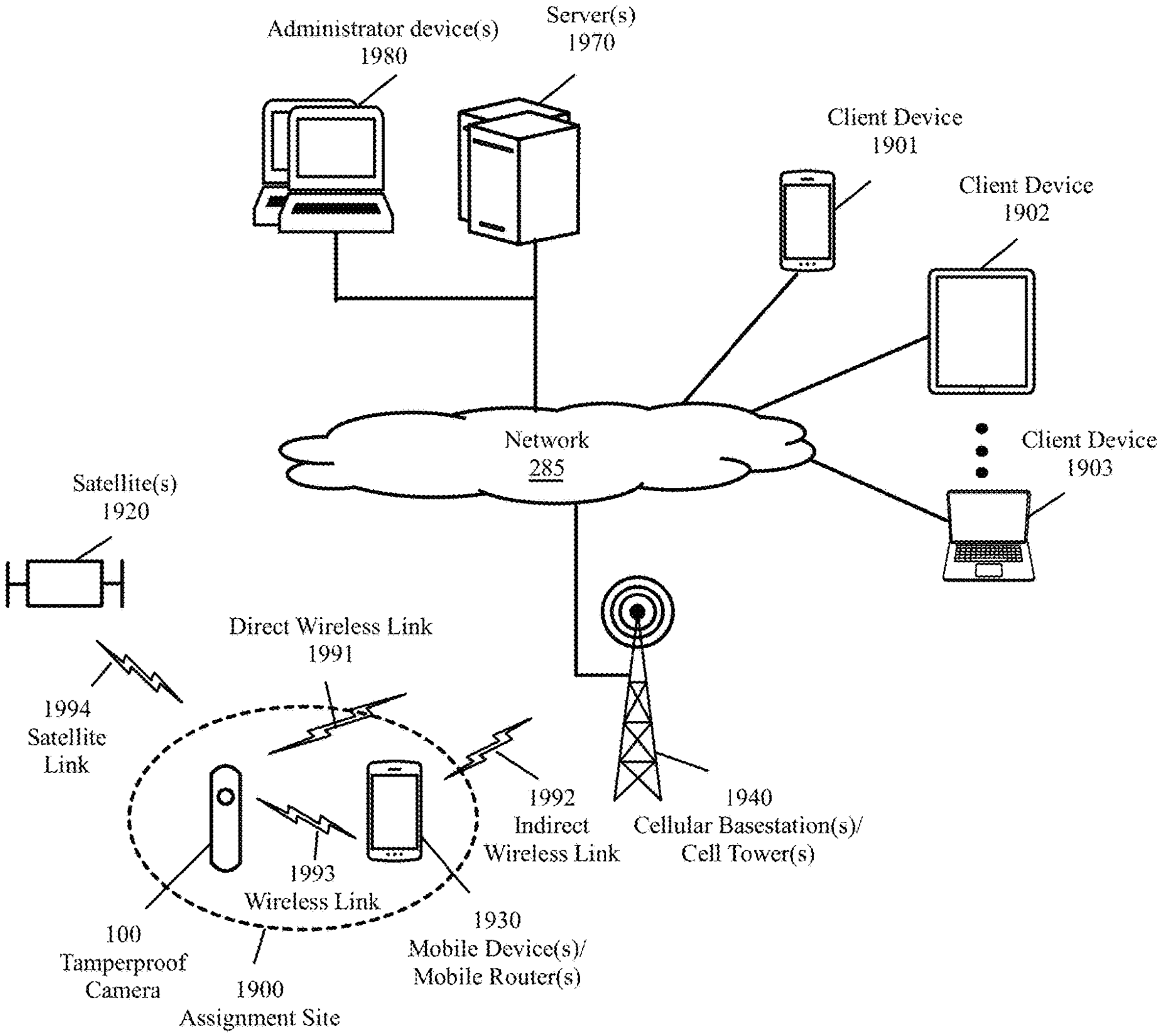
FIG. 19 is a functional block diagram illustrating an embodiment of a system for communication between, among others, a tamperproof camera, one or more mobile devices, one or more routers, one or more servers, one or more administrator devices, and/or one or more client devices, according to various aspects of the present disclosure.

FIG. 19 is a functional block diagram illustrating an embodiment of a system for communication between, among others, a tamperproof camera, one or more mobile devices, one or more routers, one or more servers, one or more administrator devices, and/or one or more client devices, according to various aspects of the present disclosure. With reference to FIG. 19, the tamperproof camera 100 of the present embodiments may communicate with one or more remote electronic devices, such as, for example, and without limitations, one or more servers 1970, one or more administrator devices 1980, one or more electronic devices (e.g., client devices) 1901-1903 through one or more networks 285.

The network(s) 285 may be any wireless network or any wired network, or a combination thereof, configured to operatively couple the devices of FIG. 19. For example, the network(s) 285 may include one or more of the following: a public switched telephone network (PSTN), the Internet, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, V.34, or V.34bis analog modem connection, a cable modem, an Asynchronous Transfer Mode (ATM) connection, a Fiber Distributed Data Interface (FDDI) and/or a Copper Distributed Data Interface (CDDI) connection.

With further reference to FIG. 19, the tamperproof camera 100, in some embodiments, may include a subscriber identity module (SIM) card and may communicate through a direct wireless link 1991 with one or more cellular base stations 1940. The tamperproof camera 100 may make a communication link 1993 with one or more mobile devices and/or one or more mobile routers 1930 and use a communication link 1992 provided by the mobile devices/mobile routers 1930 to communicate with the remote devices 1901-1903 and/or 1970-1980. The tamperproof camera 100 may include a satellite link 1994 to communicate with the remote devices 1901-1903 and/or 1970-1980 through one or more satellites 1920.

In some embodiments, the tamperproof camera 100 may directly communicate with the client devices 1901-1903 when the camera 100 is in (or in the vicinity of) a job assignment site associated with the client devices 1901-1903. For example, and without limitations, the tamperproof camera 100 may provide live video streams and/or location information to the client devices 1901-1903. The tamperproof camera 100 may receive pan and tilt commands from the client devices 1901-1903.

In other embodiments, the camera 100 may send the captured video and/or the location information to the server(s) 1970 and/or the administrative device(s) 1980, and the server(s) 1970 and/or the administrative device(s) 1980 may provide live streaming and/or location information to the client device 1901-1903. The server(s) 1970 may also receive pan and tilt commands from the client device 1901-1903 and may send the commands to the camera 100 through one or more of the links 1991-1994.

A. Encrypting Content and Securing Communication with External Devices

Some embodiments may provide end to end encrypting for signals sent and received by the tamperproof camera. The camera, in some embodiments, authenticates every external devices that sends signals to the camera. Encrypting the signals ensures that the privacy and security of the clients are maintained when a camera is capturing and sending live video from an assignment site. Authentication of external devices ensures that the camera may not be compromised by external electronic attacks.

Figure 20:
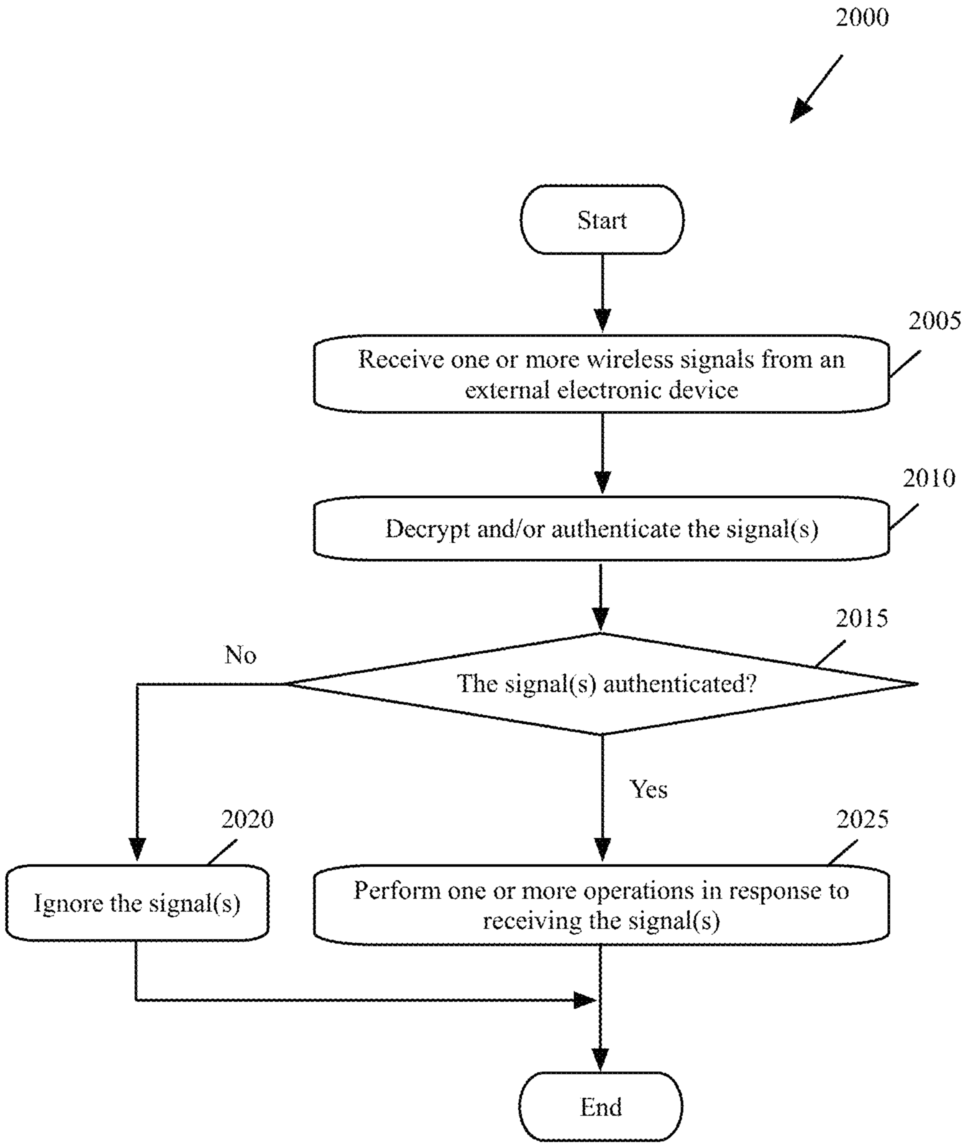
FIG. 20 is a flowchart illustrating an example process for decrypting signals received from, and authenticating, external devices by a tamperproof camera, according to various aspects of the present disclosure.

FIG. 20 is a flowchart illustrating an example process 2000 for decrypting signals received from, and authenticating, external devices, according to various aspects of the present disclosure. The process 2000, in some embodiments, may be performed by a processor 205 (FIG. 2) of the tamperproof camera 100.

With reference to FIG. 20, one or more wireless signals may be received (at block 2005) from an external electronic device. For example, the camera 100 of FIG. 19 may receive one or more signals from one of the electronic device 1901-1903, 1930, 1970, and 1980. Next, the signal(s) may be decrypted and/or authenticated (at block 2010). In some embodiments, the electronics devices and the tamperproof camera may use one or more encryption methods such as using a symmetric key, using public and private keys, using digital signatures, etc., to encrypt and decrypt the communicated video and audio content, messages, and/or data/control signals. In some embodiments, the electronics devices and the tamperproof camera may mutually authenticate each other, either periodically or at least once in order to communicate.

A determination may be made (at block 2015) whether the signal(s) are authenticated. If not, the signal(s) may be ignored (at block 2020). The process 2000 may then end. Otherwise, one or more operations in response to receiving the signal(s) may be performed (at block 2025). The process 2000 may then end.

B. Turning the Camera Power On or Off

In some embodiments, the tamperproof camera may be configured to prevent the power to be turned on or off by unauthorized personnel. In other embodiments, the tamperproof camera may be configured such that any person may turn the power on (e.g., by pressing a power button) but the power may only be turned off by authorized external devices.

In some embodiments, the processor(s) 205 (FIG. 2) of the camera 100 and a subset of communication interface of the camera, such as, for example, and without limitations, one or more wireless transceivers 260 may receive power as soon as the batteries are inserted in the battery compartment 160 (FIG. 1B). The processor(s) 205 may then receive one or more signals from authorized remote devices to turn the power to the rest of the camera on or off.

Figure 21:
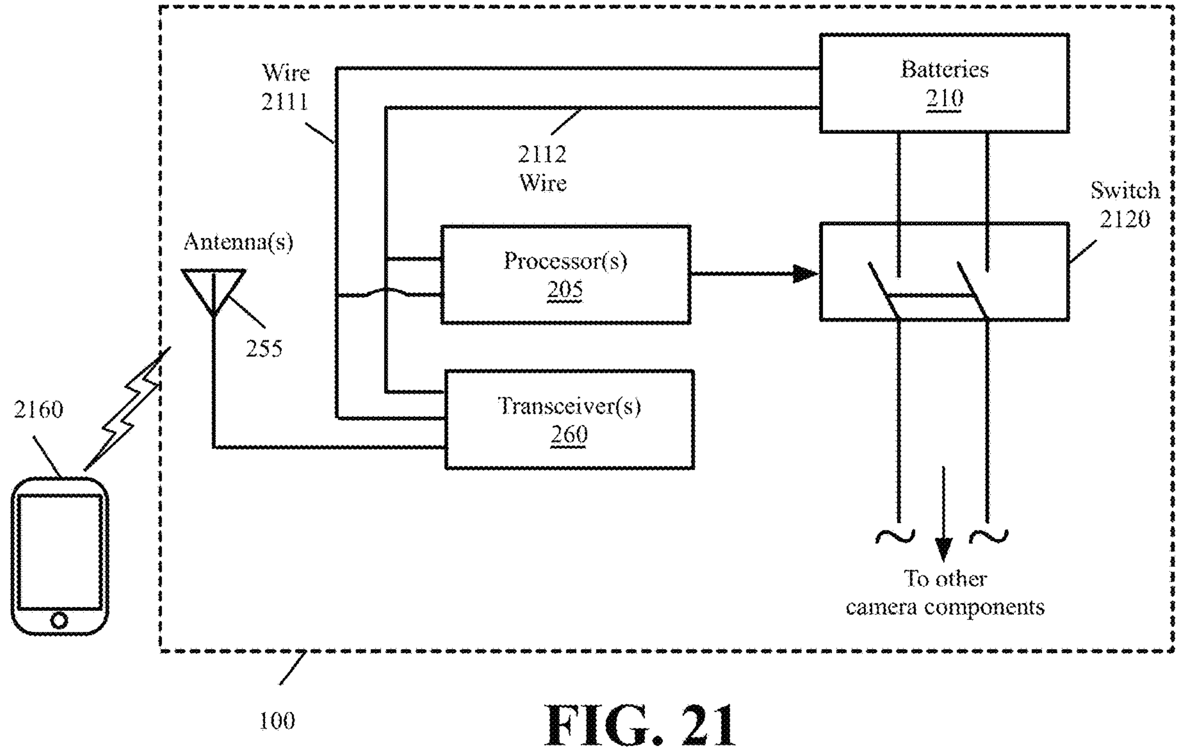
FIG. 21 is a functional block diagram illustrating an embodiment of a system where a processor of a tamperproof camera controls turning power on or off to one or more components of the camera, according to various aspects of the present disclosure.

FIG. 21 is a functional block diagram illustrating an embodiment of a system where a processor of a tamperproof camera controls turning power on or off to one or more components of a camera, according to various aspects of the present disclosure. The portion of the tamperproof camera 100 shown in FIG. 21 includes the processor(s) 205, the batteries 210, the antenna(s) 255, the transceiver(s) 260, and the switch 2120.

As shown, the processor(s) 205 and the transceiver(s) 260 may always receive power from the batteries 210. For example, after the batteries 210 are inserted in the battery compartment 160 (FIG. 1B) and as long as the batteries 210 have charge, the processor(s) 205 and at least one of the transceiver(s) 260 may receive power through the wires 2111-2112.

The processor(s) 205 may then receive one or more signals from an authorized external device 2160 to turn on the power to the other camera's components (not shown). In response, the processor(s) 205 may decrypt the signals, and after authenticating the electronic device 2160, may turn the power on or off. For example, the processor(s) 205 may send one or more signals to the switch 2120 to close, in order to turn the power to the other components on.

The switch 2120 may be a relay that controls transfer of power to the camera's other components (not shown). The processor(s) 205 may also receive one or more signals from an authorized external device 2160 to turn off the power to the other camera's components. In response, the processor(s) 205 may send one or more signals to the switch 2120 to open, in order to turn the power to the other components off.

Figure 22:
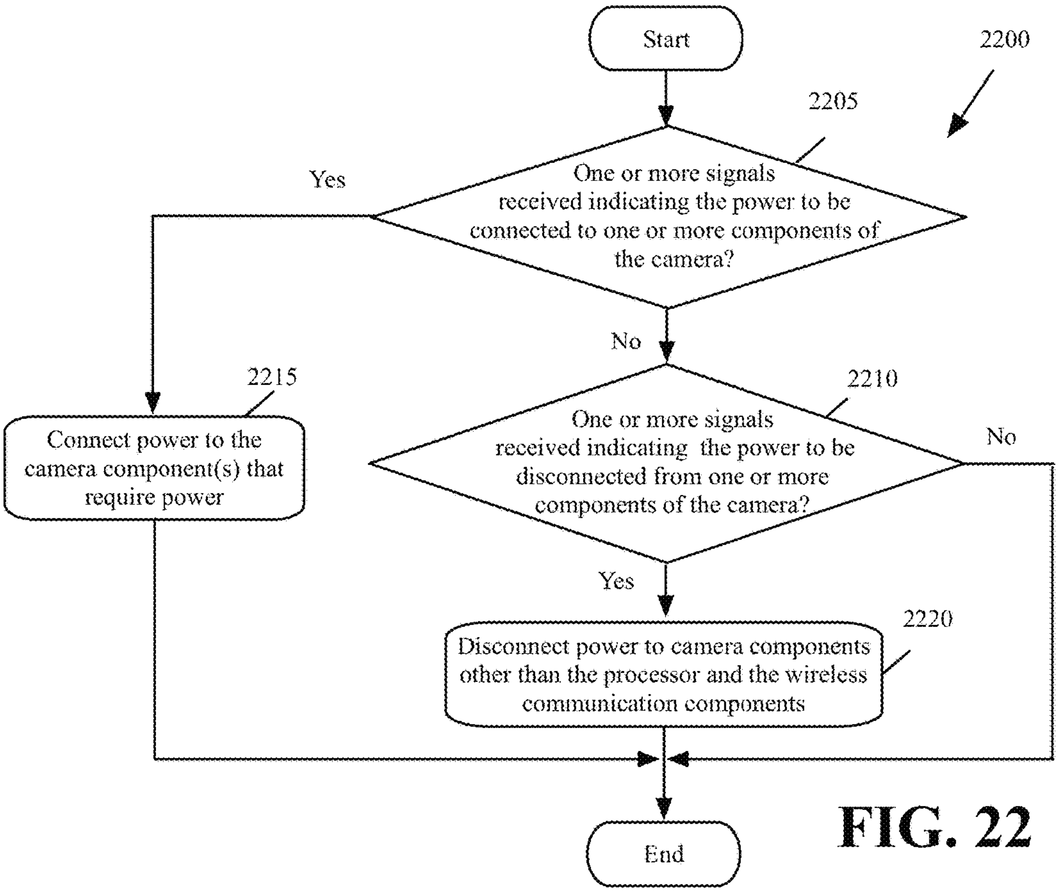
FIG. 22 is a flowchart illustrating an example process for controlling the power by a processor of a tamperproof camera, according to various aspects of the present disclosure.

FIG. 22 is a flowchart illustrating an example process 2200 for controlling the power by a processor of a tamperproof camera, according to various aspects of the present disclosure. The process 2200, in some embodiments, may be performed by a processor 205 (FIG. 21) of the tamperproof camera 100. The processor in the embodiment of FIG. 22 may receive power (as described above with reference to FIG. 21) as soon as the batteries are inserted in the battery compartment 160.

With reference to FIG. 22, a determination may be made (at block 2205) whether one or more signals are received indicating the power to be connected to one or more components of the camera. If yes, the power may be connected (at block 2215) to the component(s) of the camera that require power. For example, the processor(s) 205 of FIG. 21 may send one or more signals to the switch 2120 to close the switch and provide power to the other components of the camera. The process 2200 may then end.

When a determination is made (at block 2205) that one or more signals are not received indicating the power to be connected to one or more components of the camera, a determination may be made (at block 2210) whether one or more signals are received indicating the power to be disconnected from one or more components of the camera. If not, the process 2200 may end.

Otherwise, the power may be disconnected (at block 2220) from the camera's components other than the processor(s) and the wireless communication components. For example, the processor(s) 205 of FIG. 21 may send one or more signals to the switch 2120 to open the switch to turn the power off to camera's components other than the processor(s) 205 and at least one of the wireless transceivers 260. The process 2200 may then end.

In some embodiments, the processor(s) 205 (FIG. 2) of the camera 100 do not automatically receive power after the batteries are inserted in the battery compartment 160 (FIG. 1B). In some of these embodiments, an RFID tag may be used to turn the power on to the processor(s) 205 and one or more of the wireless transceivers 260. The processor(s) 205 may then receive signal(s) from authorized external devices to selectively turn the power on/off to/from the other components of the camera.

Figure 23:
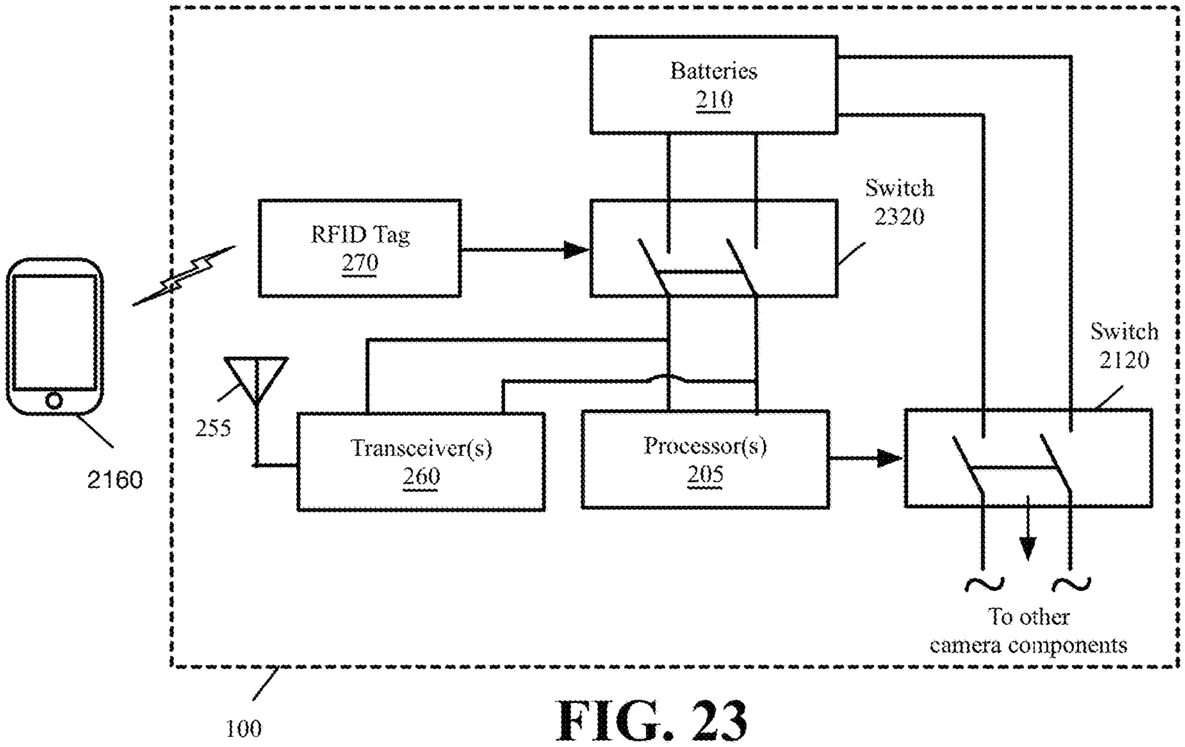
FIG. 23 is a functional block diagram illustrating an embodiment of a system where an RFID tag is used to connect power to the processor of a tamperproof camera, according to various aspects of the present disclosure.

FIG. 23 is a functional block diagram illustrating an embodiment of a system where an RFID tag is used to connect power to the processor of a tamperproof camera, according to various aspects of the present disclosure. The portion of the tamperproof camera 100 shown in FIG. 23 includes the processor(s) 205, the rechargeable batteries 210, the antenna(s) 255, the transceiver(s) 260, the switches 2120 and 2320, and the RFID tag 270.

The RFID tag 270 may be a passive RFID tag that does not receive power from the camera's batteries. The RFID tag 270 may be energized when it receives a radio frequency (RF) carrier wave from an external device, such as the electronic device 2160.

The RFID tag 270 may receive one or more signals from the external device 2160 to turn on the power to the processor(s) 205 and one or more of the wireless transceivers 260. The RFID tag 270 may absorb energy from the carrier wave of the signals received from the external device 2160 and may close the switch 2320.

The switch 2320 may be a relay that controls transfer of power to the processor(s) 205 and the transceiver(s) 260. The processor(s) 205 may then receive one or more signals from an authorized external device 2160 to turn the power to the other camera's components (not shown) on/or off. In response, the processor(s) 205 may turn the power to the other components of the camera on or off, as described above with reference to FIG. 21. The RFID tag 270 may be configured to only close the switch 2320 but not open the switch. An external device may, therefore, not be able to turn off the camera's power without communicating with, and being authorized by, the processor(s) 205.

Some embodiments may provide a physical power switch that is configured to turn on, but not turn off, the camera's power. For example, and without limitations, the physical power switch may be a push button that may turn on the power when the switch is pressed. The physical power switch may be configured not to turn the power off if the push button is released or pushed again.

Figure 24:
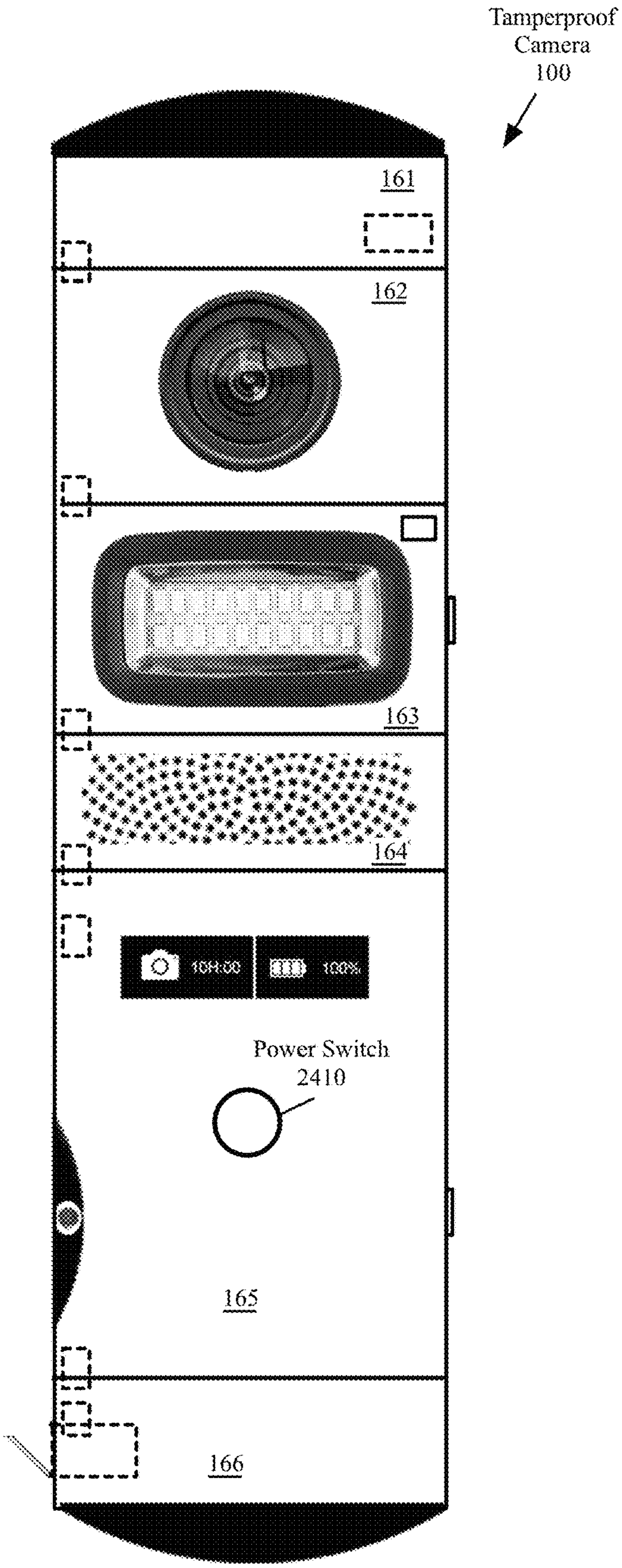
FIG. 24 is a schematic front elevation view of a tamperproof camera that includes a physical power switch, according to various aspects of the present disclosure.

FIG. 24 is a schematic front elevation view of a tamperproof camera that includes a physical power switch, according to various aspects of the present disclosure. With reference to FIG. 24, the physical power switch 2410 is a push button that is configured to turn the camera's power on when the power switch 2410 is pushed. Other components of the camera 100 of FIG. 24 may be similar to the camera 100 of FIG. 1A-1D, 9A-9D, or 18A-18B.

The physical power switch 2410 may be configured to only turn the power on but not off. For example, after the power switch 2410 is pushed, releasing the switch and/or pushing it again may not turn the power off. The power switch 2410, therefore, allows any personnel to turn the power on. Turning off the power, however, may require an authorized external device to send signals to the processor(s) of the camera to turn the power off.

Figure 25A:
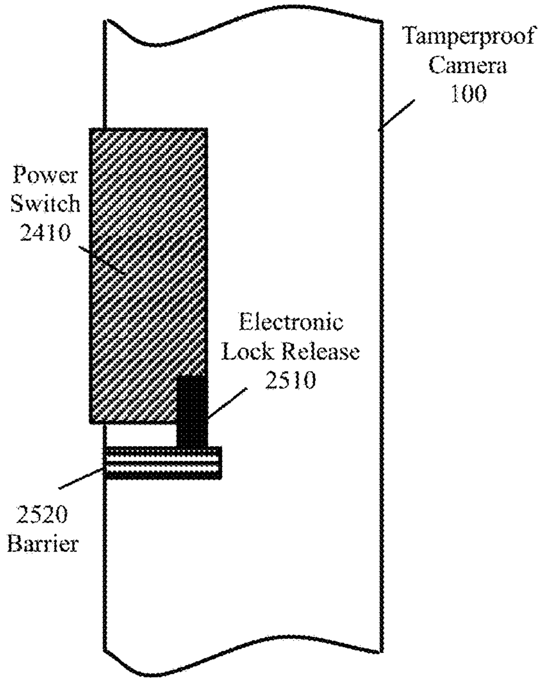
FIGS. 25A-25B are schematic side elevation views of the physical power switch of FIG. 24, according to various aspects of the present disclosure.
Figure 25B:
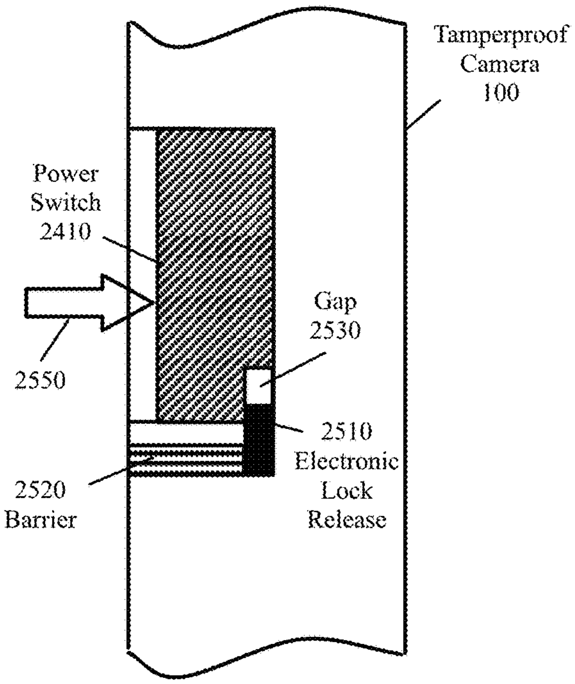

FIGS. 25A-25B are schematic side elevation view of the physical power switch of FIG. 24, according to various aspects of the present disclosure. In the side view of FIG. 25A, the power switch 2410 is not pressed. The electronic lock release 2510 may be a spring loaded lock that is pressing against the barrier 2520, which prevents the electronic lock release 2510 to go down in the depicted orientation.

In FIG. 25B, the power switch 2410 is pressed. As shown, the power switch 2410 may be pushed inside the body of the camera 100 until the electronic lock release 2510 moves past the barrier 2520. Once the spring loaded electronic lock release 2510 moves past the barrier 2520, the spring loaded electronic lock release 2510 may move down and the barrier 2520 may prevent the electronic lock release 2510 and the power switch 2410 to return to the position of FIG. 25A. The power switch 2410, in FIG. 25 may close a relay (not shown) that may turn the camera's power on.

The electronic lock release 2510 may be configured to receive one or more signals from the processor(s) 205 of the camera 100 and move back into the gap 2530. The power switch 2410 may then return to the position of FIG. 25A, which may result in the relay (not shown) to be opened and the camera's power to be turned off.

Figure 26:
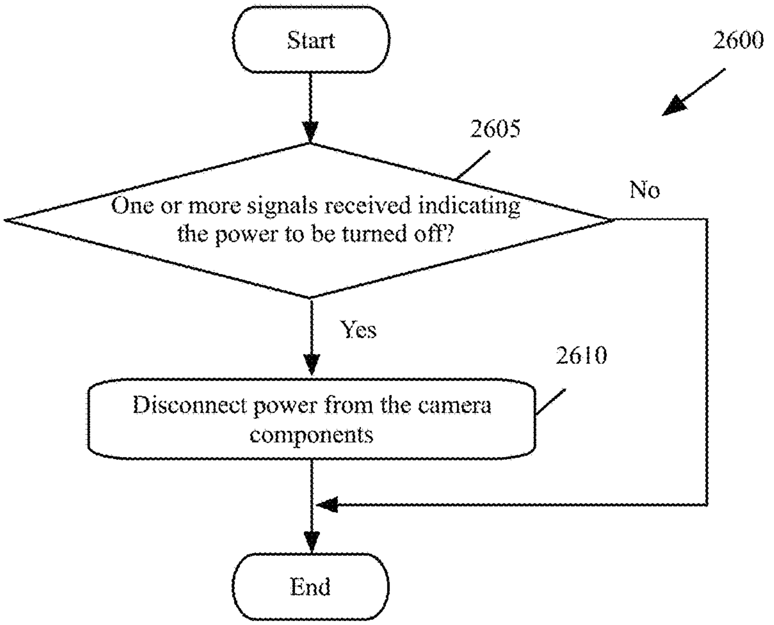
FIG. 26 is a flowchart illustrating an example process for turning off the tamperproof camera's power by a processor of the camera, according to various aspects of the present disclosure.

FIG. 26 is a flowchart illustrating an example process 2600 for turning off the tamperproof camera's power by a processor of the camera, according to various aspects of the present disclosure. The process 2600, in some embodiments, may be performed by a processor of the tamperproof camera 100 of FIGS. 23 and 24. The processor in the embodiment of FIG. 26 may receive power (as described above with reference to FIGS. 23 and 24).

With reference to FIG. 26, a determination may be made (at block 2605) whether one or more signals are received indicating the power to the camera may be turned off. If not, the process 2600 may end. Otherwise, the power may be disconnected from the camera components (at block 2610). For example, the processor(s) 205 of the camera 100 may send one or more signals to the switch 2120 of FIG. 23 to close the switch. As another example, the processor(s) 205 of the camera 100 of FIG. 24 may send one or more signals to the electronic lock release 2510 of FIG. 25B to return into the gap 2530 to move the power switch to the position of FIG. 25A to turn the power to the camera off. The process 2600 may then end.

C. Locking and Unlocking of the Battery and Memory Card Compartments

The battery compartment and/or the memory card compartment of the tamperproof camera, in some embodiments, may be locked in order to prevent unauthorized persons to turn the camera off during an assignment. The battery compartment and/or the memory card compartment, in these embodiments, may be unlocked after receiving one or more signals from an authorized external electronic device.

Figure 27:
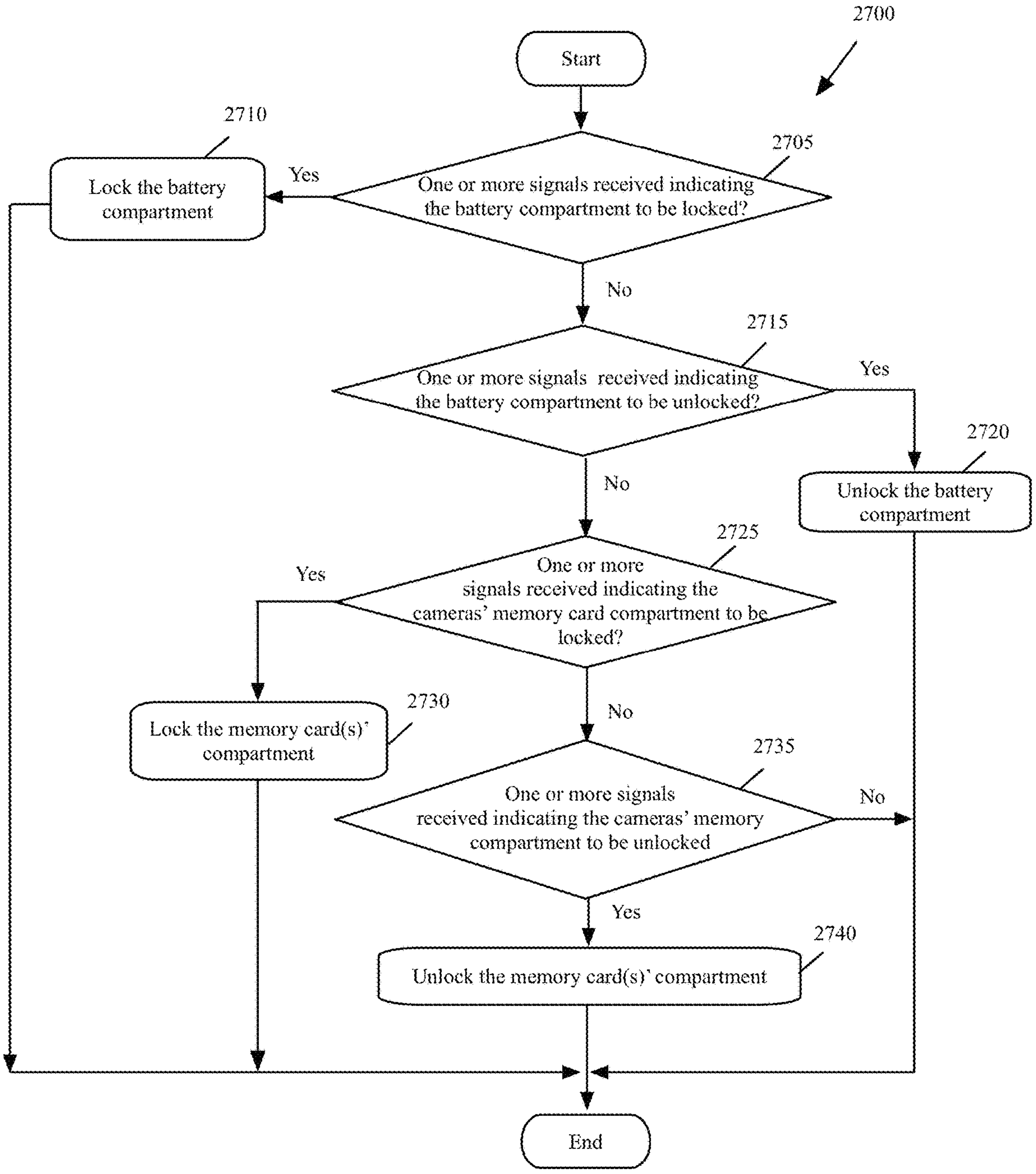
FIG. 27 is a flowchart illustrating an example process for locking and unlocking the battery and/or memory compartments of a tamperproof camera, according to various aspects of the present disclosure.

FIG. 27 is a flowchart illustrating an example process 2700 for locking and unlocking the battery and/or memory compartments of a tamperproof camera, according to various aspects of the present disclosure. The process 2700, in some embodiments, may be performed by a processor of the tamperproof camera 100 (FIGS. 1A-1D).

With reference to FIG. 27, a determination may be made (at block 2705) whether one or more signals are received that indicate the battery compartment is to be locked. For example, the processor(s) of the camera may receive one or more signals from an electronic device 290 or a server 295 of FIG. 2 through the network(s) 285 to lock the battery compartment 160 of FIG. 1B.

When a determination is made (at block 2705) that the battery compartment is to be locked, the battery compartment may be locked (at block 2710). For example, the processor(s) 205 may send one or more signals to a remote activated lock such as the remote activated locks 1000 (FIG. 10) or 1001 (FIG. 11) to lock an interlocking pin associated with the battery compartment door 169 (FIG. 1B). The process 2700 may then end.

When a determination is made (at block 2705) that the battery compartment is not to be locked, a determination may be made (at block 2715) whether one or more signals are received that indicate the battery compartment is to be unlocked. If yes, the battery compartment may be unlocked (at block 2720). For example, the processor(s) 205 may send one or more signals to a remote activated lock such as the remote activated locks 1000 (FIG. 10) or 1001 (FIG. 11) to unlock an interlocking pin associated with the battery compartment door 169 (FIG. 1B). The process 2700—may then end.

When a determination is made (at block 2715) that the battery compartment is not to be unlocked, a determination may be made (at block 2725) whether one or more signals are received that indicate the memory card compartment is to be locked. For example, the processor(s) of the camera may receive one or more signals from an electronic device 290 or a server 295 of FIG. 2 through the network(s) 285 to lock the memory card compartment 160 of FIG. 1B.

When a determination is made (at block 2725) that the memory card compartment is to be locked, the memory card compartment may be locked (at block 2730). For example, the processor(s) 205 may send one or more signals to a remote activate lock such as the remote activated locks 1000 (FIG. 10) or 1001 (FIG. 11) to lock an interlocking pin associated with the memory card compartment door 169 (FIG. 1B). The process 2700 may then end.

When a determination is made (at block 2725) that the memory card compartment is not to be locked, a determination may be made (at block 2735) whether one or more signals are received that indicate the memory card compartment is to be unlocked. If not, the process 2700 may end. Otherwise, the memory card compartment may be unlocked (at block 2740). For example, the processor(s) 205 may send one or more signals to a remote activate lock such as the remote activated locks 1000 (FIG. 10) or 1001 (FIG. 11) to unlock an interlocking pin associated with the memory card compartment door 169 (FIG. 1B). The process 2700 may then end.

The tamperproof cameras of the present embodiment may provide several features to preserve the battery charge during an assignment. For example, the tamperproof cameras may not include a display to show the video captured by the camera. The processor(s) 205 of tamperproof cameras may check the amount of battery charge left and may lower the flashlight's intensity, and/or turn off some of the light sources 111, when the battery charge is below a threshold. The tamperproof cameras may include ports (not shown) for attaching an external battery pack. The batteries of the tamperproof cameras may be chargeable and may be charged using portable chargers.

In addition, some of the present embodiments provide additional security measures when a camera's battery charge goes below a threshold during an assignment such that the battery may run out of charge before the end of an assignment. These embodiments may allow supervisory personnel to remotely unlock the battery compartment for a time period to allow the personnel at an assignment site to replace the batteries during the time period.

Figure 28:
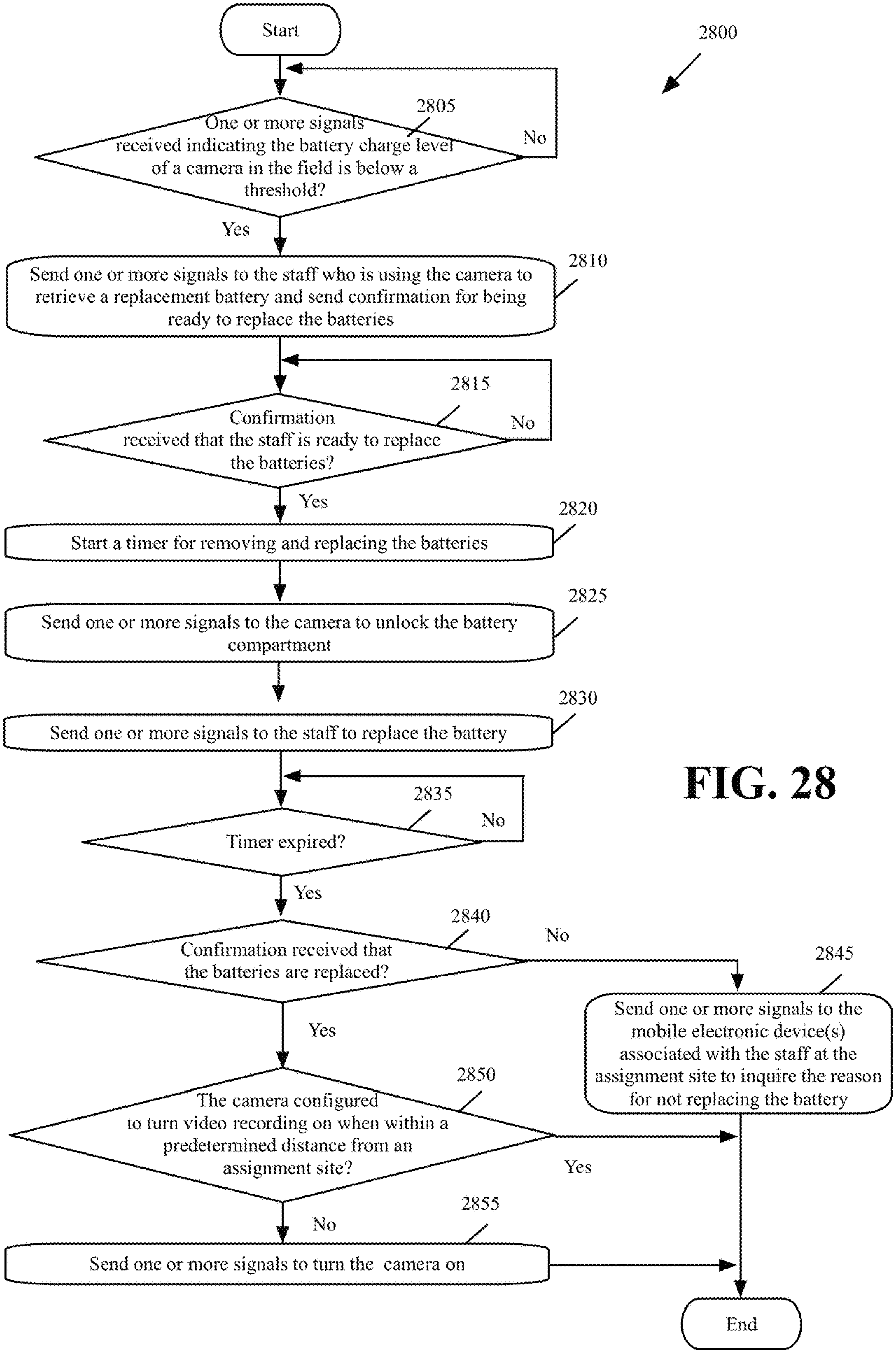
FIG. 28 is a flowchart illustrating an example process for unlocking the battery compartment of a tamperproof camera to allow battery replacement, according to various aspects of the present disclosure.

FIG. 28 is a flowchart illustrating an example process 2800 for unlocking the battery compartment of a tamperproof camera to allow battery replacement, according to various aspects of the present disclosure. The process 2800, in some embodiments, may be performed by a processor of a server 1970 or a processor of an administrator electronic device 1980 of FIG. 19.

With reference to FIG. 28, a determination may be made (at block 2805) whether one or more signals are received that indicate the battery charge level of a camera in the field is below a threshold. For example, the processors(s) 205 of the camera, in some embodiments, may receive the charge level from the batteries and may send the charge level to the server(s) 1970 and/or the administrator electronic device(s) 1980.

When the charge level is not below a threshold, the process 2800 may return back to block 2805, which was described above. Otherwise, one or more signals may be sent (at block 2810) to the staff who is using the camera to retrieve a replacement battery and send confirmation for being ready to replace the battery. In some embodiments, the signal(s) may be sent to a mobile device associated with the staff. In some embodiments, the tamperproof camera 100 may include one or more speakers 190 and one or more microphones 610 (FIGS. 1A-1D and 6A-6B). In these embodiments, the speaker(s) and the microphones 610 may be used by supervisory personnel to speak with the staff at an assignment site. In these embodiments, the signal(s) to the staff may be sent to the camera. In other embodiments, the signals to the staff may be sent to the camera to activate the vibrating alarm 195.

Next, a determination may be made (at block 2815) whether a confirmation is received that the staff is ready to replace the battery/batteries. If not, the process 2800 may return back to block 2815, which was described above. Otherwise, a timer may be started (at block 2820) for changing the battery. For example, a without limitations, the staff may be provided 30 seconds, 1 minute, 2 minutes, etc., to remove and replace the batteries. Since the camera may not be able to record and send captured video and audio when the batteries are being replaced, the timer may be set to minimize the camera's downtime.

Next, one or more signals may be sent (at block 2825) to the camera to unlock the battery compartment. For example, one or more signals may be sent to the processor(s) 205 of the camera to unlock the battery compartment's door 169. In response, the processor may unlock the battery compartment, as described above with reference to process 2700 of FIG. 27.

Next, one or more signals may be sent (at block 2830) to the staff to replace the battery/batteries. As described above the signals may be sent to a mobile device associated with the staff and/or to the camera processor(s) 205 to play on the speaker(s) of the camera and/or to activate the vibrating alarm 295.

Next, a determination may be made (at block 2835) whether the timer has expired. If not, the process 2800 may return back to block 2835, which was described above. Otherwise, a determination may be made (at block 2840) whether a confirmation is received that the batteries are replaced.

The confirmation, in some embodiments, may be received from a mobile device associated with the staff at the assignment site. The confirmation, in some embodiments, may be received from the processor(s) of the camera after the batteries are replaced and the processor(s) of the camera receive power and send a confirmation that is power is restored.

When a determination is made (at block 2840) that a confirmation is not received that the batteries are replaced, one or more signals may be sent (at block 2845) to the mobile electronic device(s) associated with the staff at the assignment site to inquire the reason for not replacing the battery. The process 2800 may then end.

When a determination is made (at block 2840) that a confirmation is received that the batteries are replaced, a determination may be made (at block 2850) whether the camera is configured to turn video recording on when the camera is within a predetermined distance from an assignment site. As described below with reference to FIGS. 29A-29B, the camera, in some embodiments, may be configured to automatically start recording video when the camera is within a predetermined distance of an assignment site. If so, the camera may turn video recording on automatically and the process 2800 may end. Otherwise, one or more signals may be sent (at block 2855) to the camera to restart video recording. The process 2800 may then end.

D. Controlling Video Recording and Location Reporting at Assignment Sites

Figure 29A:
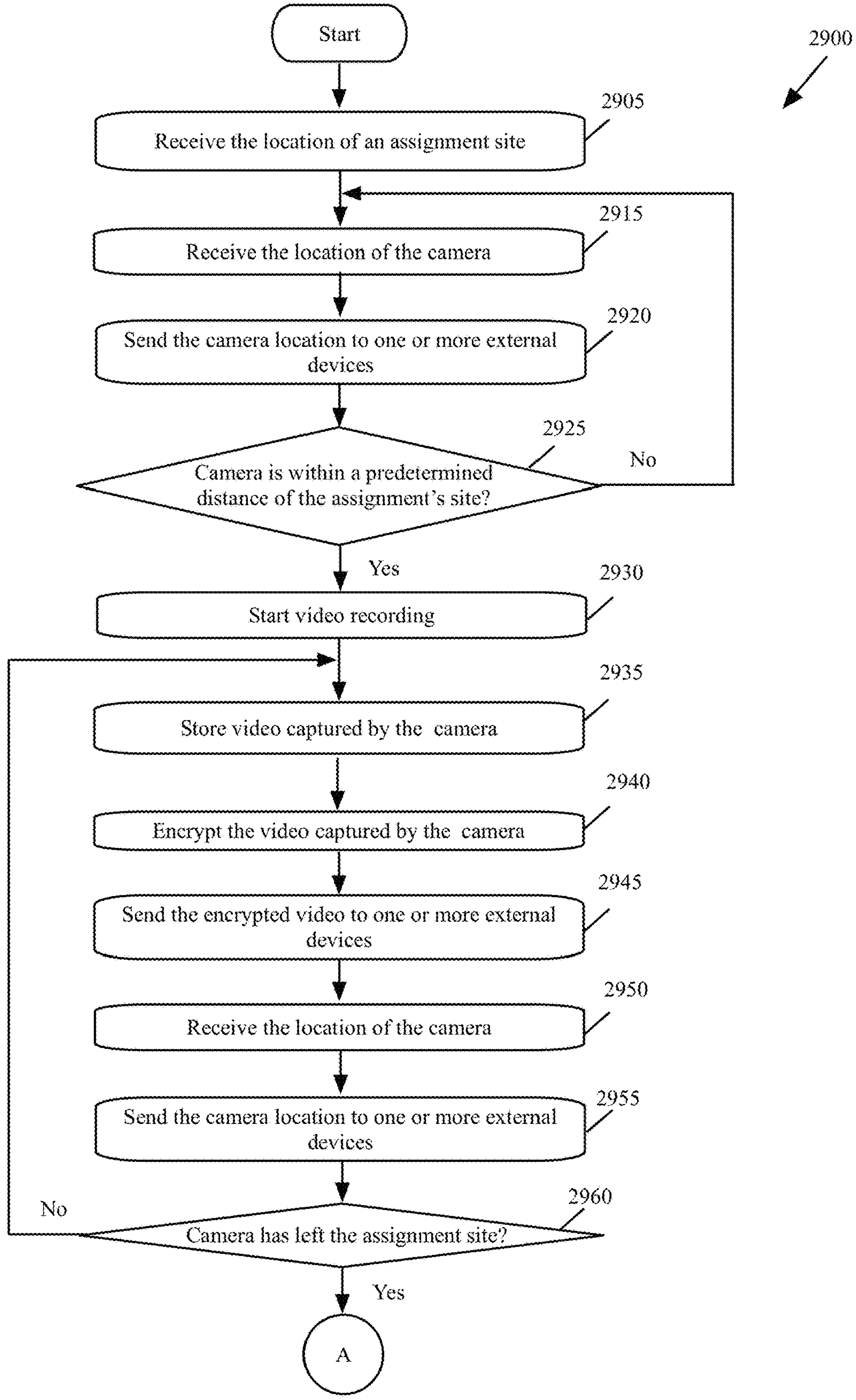
FIGS. 29A-29B show a flowchart illustrating an example process for controlling video recording of a tamperproof camera at an assignment site, according to various aspects of the present disclosure.
Figure 29B:
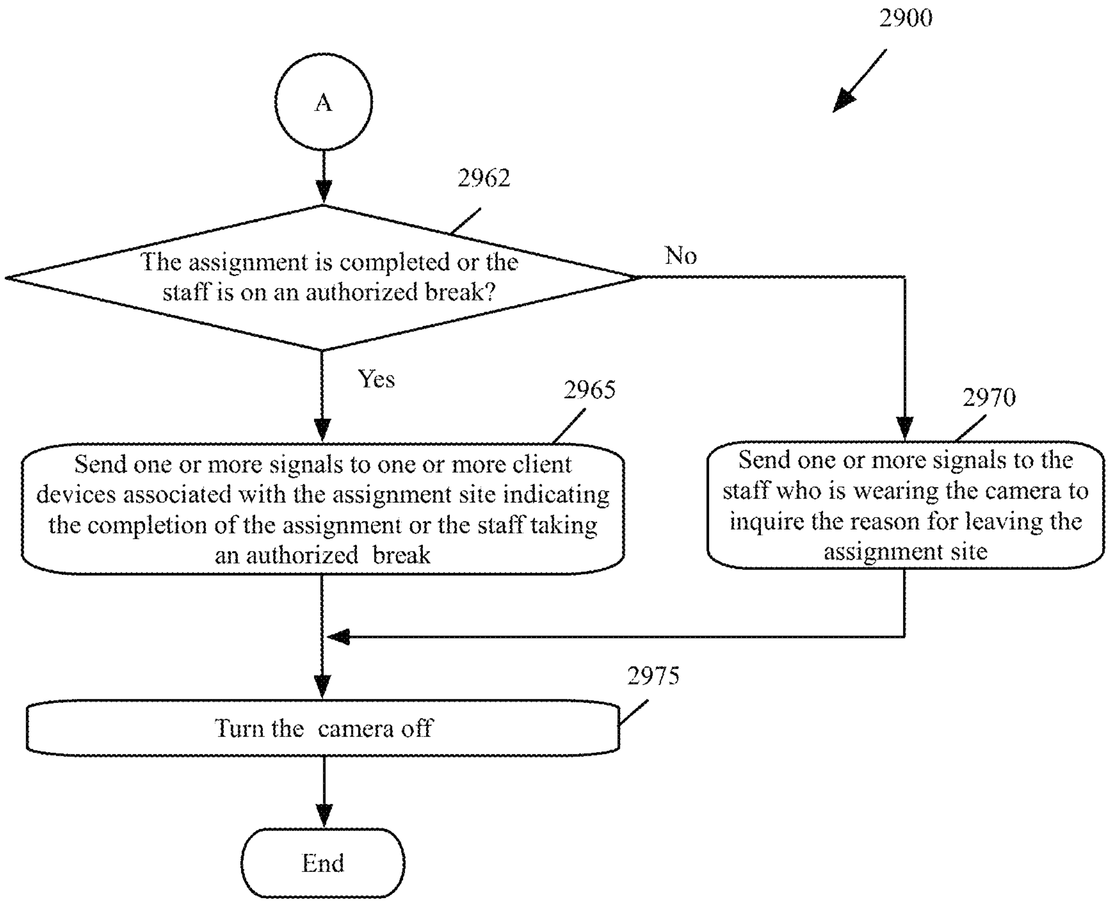

FIGS. 29A-29B show a flowchart illustrating an example process 2900 for controlling video recording of a tamperproof camera at an assignment site, according to various aspects of the present disclosure. The process 2900, in some embodiments, may be performed by a processor of the tamperproof camera 100 (FIGS. 1A-1D).

With reference to FIG. 29, the location of an assignment site may be received (at block 2905). For example, and without limitations, the location of one or more assignment sites may be sent to the processor(s) of the camera by the server(s) 1970 or the administrator electronic device(s) 1980 of FIG. 19 at the beginning of a work shift of a staff person and the camera may be handed to the person for the duration of the work shift.

Next, the location of the camera may be received (at block 2915). For example, the camera 100 may include a GPS receiver 250 and/or an IMU 245, which may measure parameters related to the camera's location, direction, orientation, etc., and may provide the measured parameters to the processor(s) 205 of the camera.

Next, the camera location may be sent (at block 2920) to one or more external devices. For example, the camera's location may be sent to the server(s) 1970 or the administrator electronic device(s) 1980. As described below, when the camera is within a geofence of an assignment site, the server(s) 1970 and/or the administrator electronic device(s) 1980 may provide location updates of the camera to one or more client devices of the persons associated with the assignment site (e.g., the owner(s), the renter(s), the persons who are living in, working at, managing, or otherwise associated with the assignment site).

Next, a determination may be made (at block 2925) whether the camera is within a predetermined distance of the assignment site. If not, the process 2900 may return back to block 2915, which was described above.

Otherwise, the video recording may be started (at block 2930). The term video recording, herein, refers to turn on the camera's video recorder and recording both audio and video. Next, the video captured by the camera may be stored (at block 2935). For example, the video captured by the camera may be stored in one or more memory cards located in the memory compartment 145.

Next, the video captured by the camera may be encrypted (at block 2940). Some embodiments may encrypt all media content captured by the camera as well as all messages, data, etc., that is communicated between the camera and any external devices. Next, the encrypted video may be sent (at block 2945) to one or more external electronic devices. For example, the encrypted video may be sent to one or more of the server(s) 1970 and/or one or more administrator electronic device(s) 1980. As described below, the server(s) 1970 and/or the administrator electronic device(s) 1980 may provide livestreaming of the video to one or more client devices of the persons associated with the assignment site.

Next, the location of the camera may be received (at block 2950). For example, the camera 100 may include a GPS receiver 250 and/or an IMU 245, which may measure parameters related to the camera's location, direction, orientation, etc., and may provide the measured parameters to the processor(s) 205 of the camera.

Next, the camera location may be sent (at block 2955) to one or more external devices. For example, the camera's location may be sent to the server(s) 1970 or the administrator electronic device(s) 1980. As described below, the server(s) 1970 and/or the administrator electronic device(s) 1980 may continue providing location updates of the camera to one or more client devices of the persons associated with the assignment site as long as the camera is within a geofence of the assignment site.

A determination may be made (at block 2960) whether the camera has left the assignment site. If not, the process 2900 may return back to block 2935, which was described above. Otherwise, a determination may be made (at block 2962) whether the assignment is completed. For example, in some embodiments, the staff using the camera at an assignment site may send one or more signals to the server(s) 1970 and/or to the administrator electronic device(s) 1980 indicating that the assignment is completed and/or the staff want to leave the assignment site for an authorized break.

When a determination is made (at block 2960) that the assignment is not completed and the staff is not on an authorized break, one or more signals may be sent (at block 2970) to the staff who is wearing the camera to inquire the reason for leaving the assignment site. The signal(s) may be sent to a mobile device associated with the staff and/or to the processor of the camera to play on the camera's speaker. The process 2900 may then proceed to block 2975, which is described below.

When a determination is made (at block 2960) that the assignment is completed, one or more signals may be sent (at block 2965) to one or more client devices associated with the assignment site indicating that the assignment is completed or the staff are taking an authorized break. The camera may then be turned off (at block 2975). The process 2900 may then end.

Some embodiments may define one or more geofences around an assignment site in order to determine whether the camera's location may be provided to client devices associated with the assignment site, whether video recording has to start or stop, and/or whether livestream video has to be provided to the client devices.

A geofence is a virtual perimeter that may be defined around a physical location. A geofence, for example, and without limitations, may be defined based on a radius around a point at an assignment site, may be defined based on a set of boundaries such as streets, freeways, etc., and/or may be defined based on an estimated time that may take for the camera to reach an assignment site. In some embodiments, one or more geofences may be defined for each assignment and may be sent by the server(s) 1970 and/or the administrator electronic device(s) 1980 to the processor(s) of a camera at the beginning of a work shift.

Figure 30:
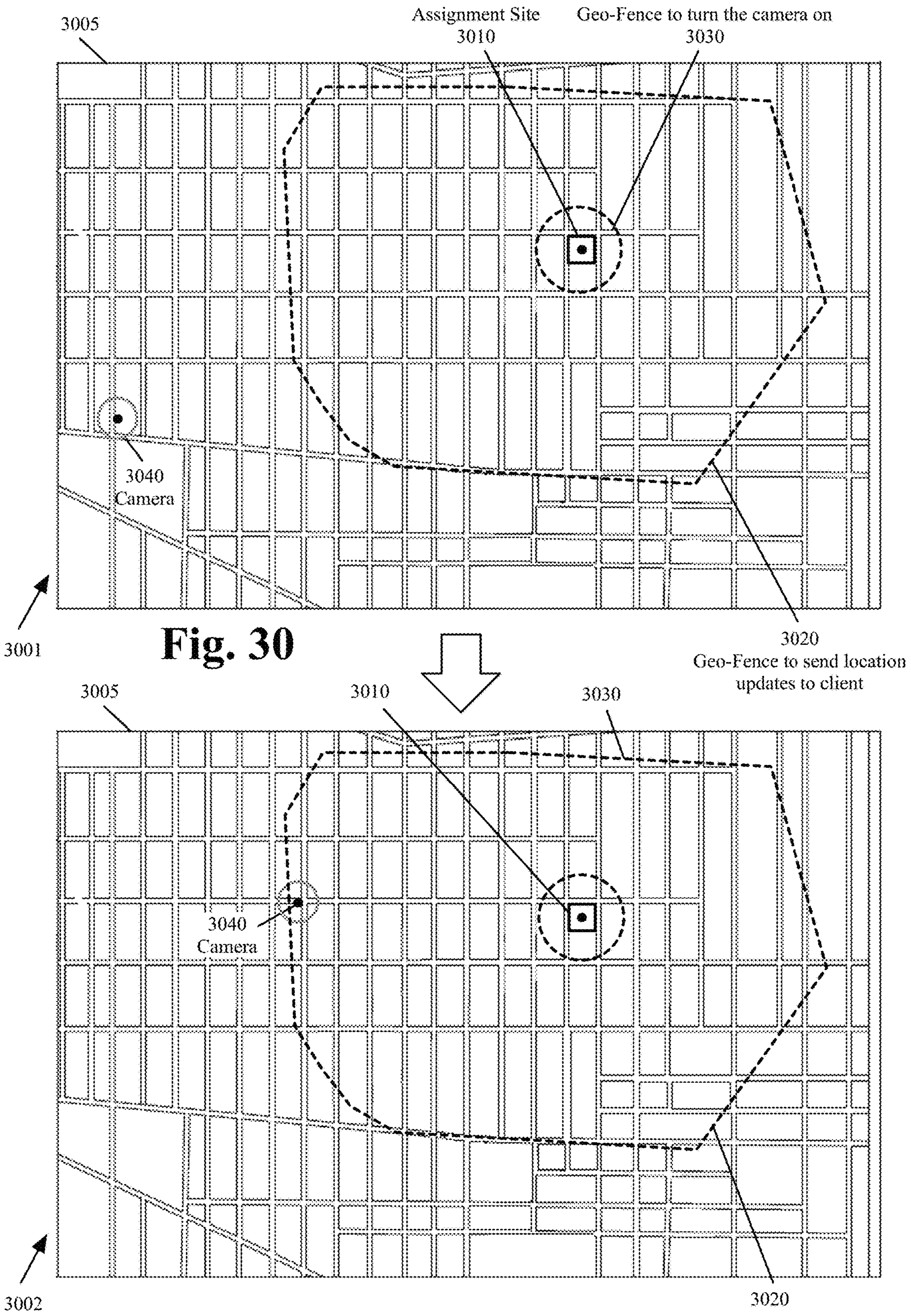
FIG. 30 is a schematic front view of an electronic device that may include an application program that provides a user interface for identifying the location/position of a camera, according to various aspects of the present disclosure.

FIG. 30 is a schematic front view of an electronic device that may include an application program that provides a user interface for identifying the location/position of a camera, according to various aspects of the present disclosure. With reference to FIG. 30, the user interface 3005 may be displayed on the display of an electronic device such as an administrator electronic device 1980 or a client device 1901-1903 of FIG. 19. The user interface 3005 may be provided, for example, and without limitations, by an application program that may be installed on the electronic device and/or after selecting a browser link to a website that may provide the location updates.

As shown, two geofences 3020 and 3030 may be defined around the assignment site 3010. The first geofence 3020 may be defined to determine whether the camera has reached within a vicinity of the assignment site 3010 in order to start providing the location of the camera to the client devices associated with the assignment site 3010. The geofence 3020 may be defined based on an estimated arrival time, may be defined based on a driving distance to the assignment site, may be defined based on the boundary of street, physical landmarks, etc., and/or may be defined as a radius around a point in the assignment site.

The second geofence 3030 may be defined to determine whether the camera has reached within a distance of the assignment site 3010 in order to start recording and sending video by the camera. The geofence 3030 may be defined as a distance around the boundaries of the assignment site, may be defined as a radius around a point in the assignment site, may be defined based on an estimated arrival time, may be defined based on a driving distance to the assignment site, and/or may be defined based on the boundary of street, physical landmarks, etc. In some embodiments, the two geofences 3020 and 3030 may have some overlap. In other embodiments, the two geofences 3020 and 3030 may be exactly the same. These embodiments may use only one geofence for both providing the camera's location and start the video recording.

FIG. 30, as shown, includes two operational stages 3001 and 3002. In stage 3001, the camera location 3040 is outside the geofence 3020. The camera's location may, therefore, be only provided to the electronic devices of the administrators electronic device(s) 1980 and/or to the server(s) 1970, but not to the client devices 1901-1903 associated with the assignment site 3010.

In stage 3002, the camera may cross the first geofence 3020. The administrators electronic device(s) 1980 and/or to the server(s) 1970 may send one or more signals to the client devices 1901-1903 indicating that the camera is within a distance and/or within an arrival period of the assignment site 3010. The client devices 1901-1903 may display the user interface in stage 3002, which provides the updated location 3040 of the camera.

Once the camera reaches the second geofence 3030, the camera may start recording, encrypting, and sending the video to the administrators electronic device(s) 1980 and/or to the server(s) 1970 as described above with reference to FIGS. 29A-29B. The administrators electronic device(s) 1980 and/or to the server(s) 1970 may send one or more signals to the client devices 1901-1903 indicating that the video recording has started and may provide a link to the client devices 1901-1903 to display livestreamed video.

Some embodiments may provide security to prevent unauthorized re-entry to the site of a previous assignment. In these embodiments, when the camera reaches within a geofence of a previous assignment site, the camera may automatically be turned on and the captured video may be sent to administrators electronic device(s) 1980 and/or to the server(s) 1970, for example, and without limitations, for monitoring by the supervisory personnel.

Figure 31:
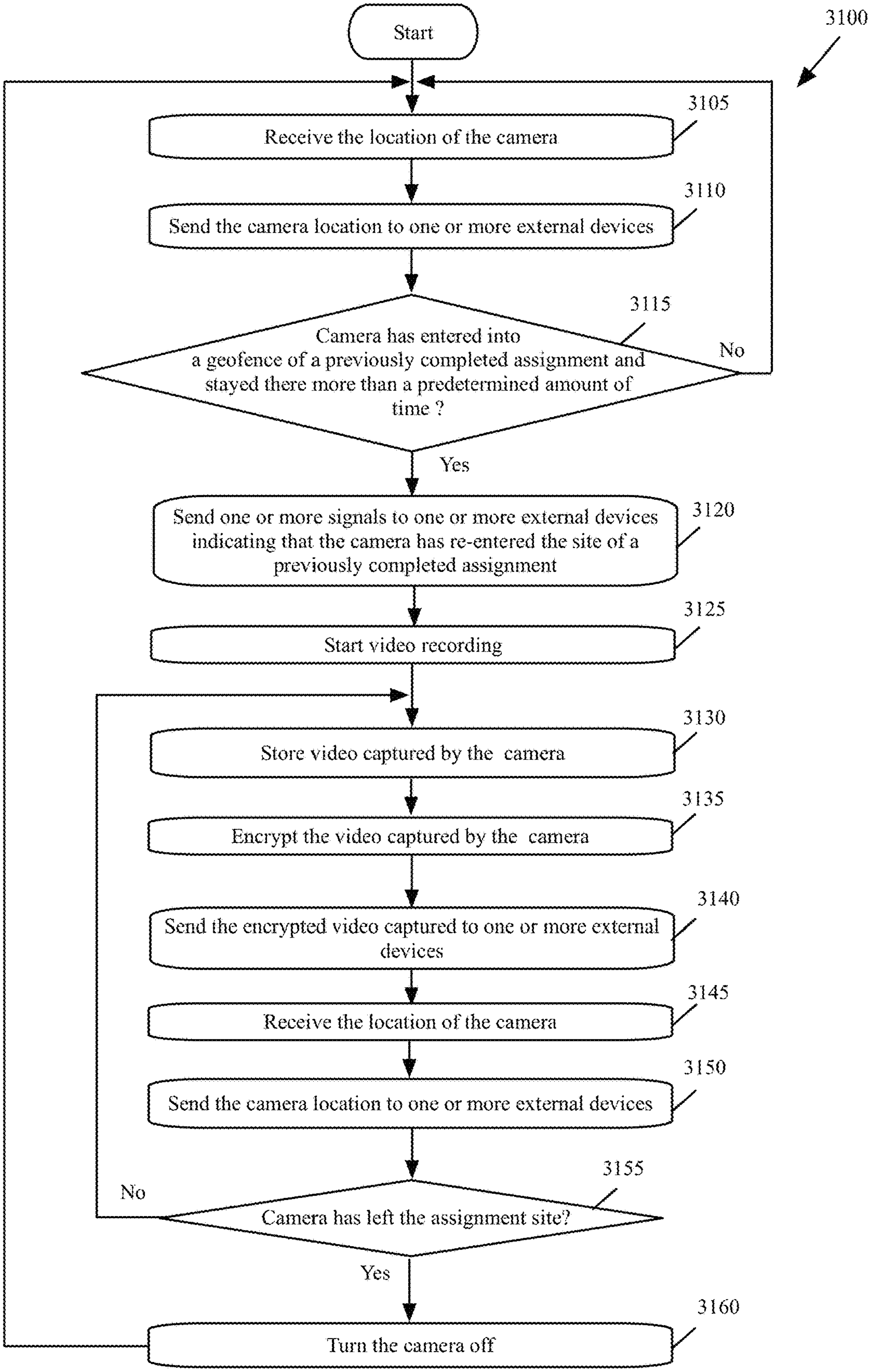
FIG. 31 is a flowchart illustrating an example process for turning video recording on when a tamperproof camera returns to the site of a previously completed assignment, according to various aspects of the present disclosure.

FIG. 31 is a flowchart illustrating an example process 3100 for turning video recording on when a tamperproof camera returns to the site of a previous assignment, according to various aspects of the present disclosure. The process 3100, in some embodiments, may be performed by a processor of the tamperproof camera 100 (FIGS. 1A-1D).

With reference to FIG. 31, the location of the camera may be received (at block 3105). For example, the camera 100 may include a GPS receiver 250 and/or an IMU 245, which may measure parameters related to the camera's location, direction, orientation, etc., and may provide the measured parameters to the processor(s) 205 of the camera.

Next, the camera location may be sent (at block 3110) to one or more external devices. For example, the camera's location may be sent to the server(s) 1970 or the administrator electronic device(s) 1980. Next, a determination may be made (at block 3115) whether the camera has entered into a geofence of a previously completed assignment site and has stayed within the geofence more than a predetermined time period. If not, the process 2900 may return back to block 3115, which was described above.

Otherwise, one or more signals may be sent (at block 3120) to one or more external devices indicating that the camera has re-entered the site of a previously completed assignment. For example, the processor(s) of the camera may store the location of previously completed assignments. The processor(s) may compare the current location of a camera with the boundaries of a geofence around each previously completed assignment site to determine whether the camera has re-entered the site of one of the previously completed assignments. The geofence may be the geofence 3020 (FIG. 30), the geofence 3030, or a different geofence defined around previously completed assignment sites.

The processor(s) may measure the time that the camera has remained within the geofence to determine whether the camera has remained within the geofence more than a threshold time period. The processor(s) may send signal(s) to the administrators electronic device(s) 1980 and/or to the server(s) 1970 indicating that the camera has re-entered a geofence around a previous assignment site and has stayed there more than a time period.

With further reference to FIG. 31, the video recording may be started (at block 3125). Next, the video captured by the camera may be stored (at block 3130). For example, the video captured by the camera may be stored in one or more memory cards located in the memory compartment 145.

Next, the video captured by the camera may be encrypted (at block 3135). Next, the encrypted video may be sent (at block 3140) to one or more external electronic devices. For example, the encrypted video may be sent to one or more of the server(s) 1970 and/or one or more administrator electronic device(s) 1980. Next, the location of the camera may be received (at block 3145).

The camera location may then be sent (at block 3150) to one or more external devices. For example, the camera's location may be sent to the server(s) 1970 or the administrator electronic device(s) 1980. A determination may be made (at block 3155) whether the camera has left the assignment site. If not, the process 3100 may return back to block 3130, which was described above. Otherwise, the camera may be turned off (at block 3160). The process 3100 may then end. The video captured while the camera has been within the geofence may be used to determine whether the staff had re-entered the physical assignment site, has met with a person at the assignment site, etc. The staff who has entered the previous assignment site may be contacted live to inquire the reason for re-entering the geofence.

Figure 32A:
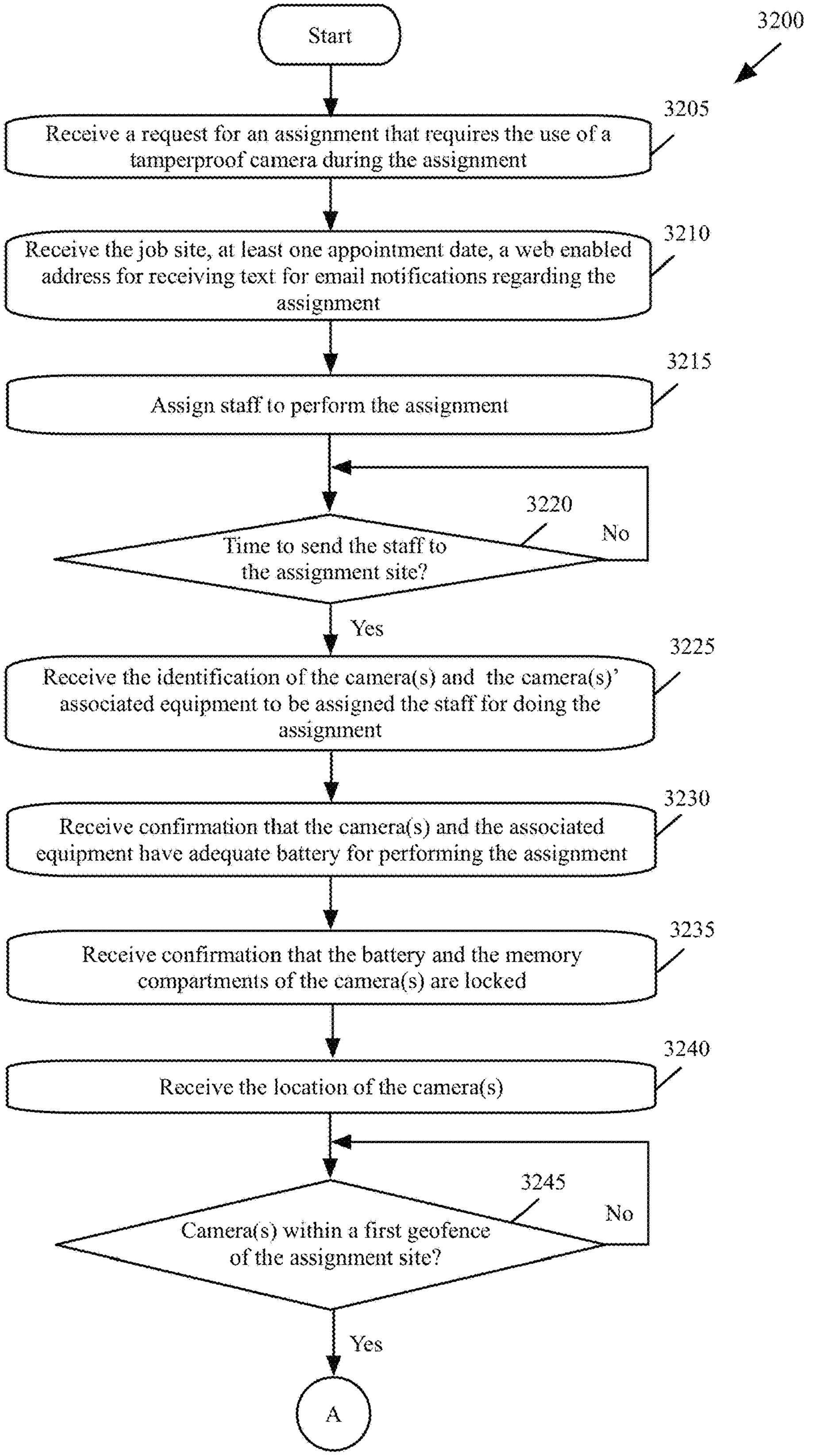
FIGS. 32A-32C show a flowchart illustrating an example process for controlling the assignments performed by tamperproof cameras, according to various aspects of the present disclosure.
Figure 32B:
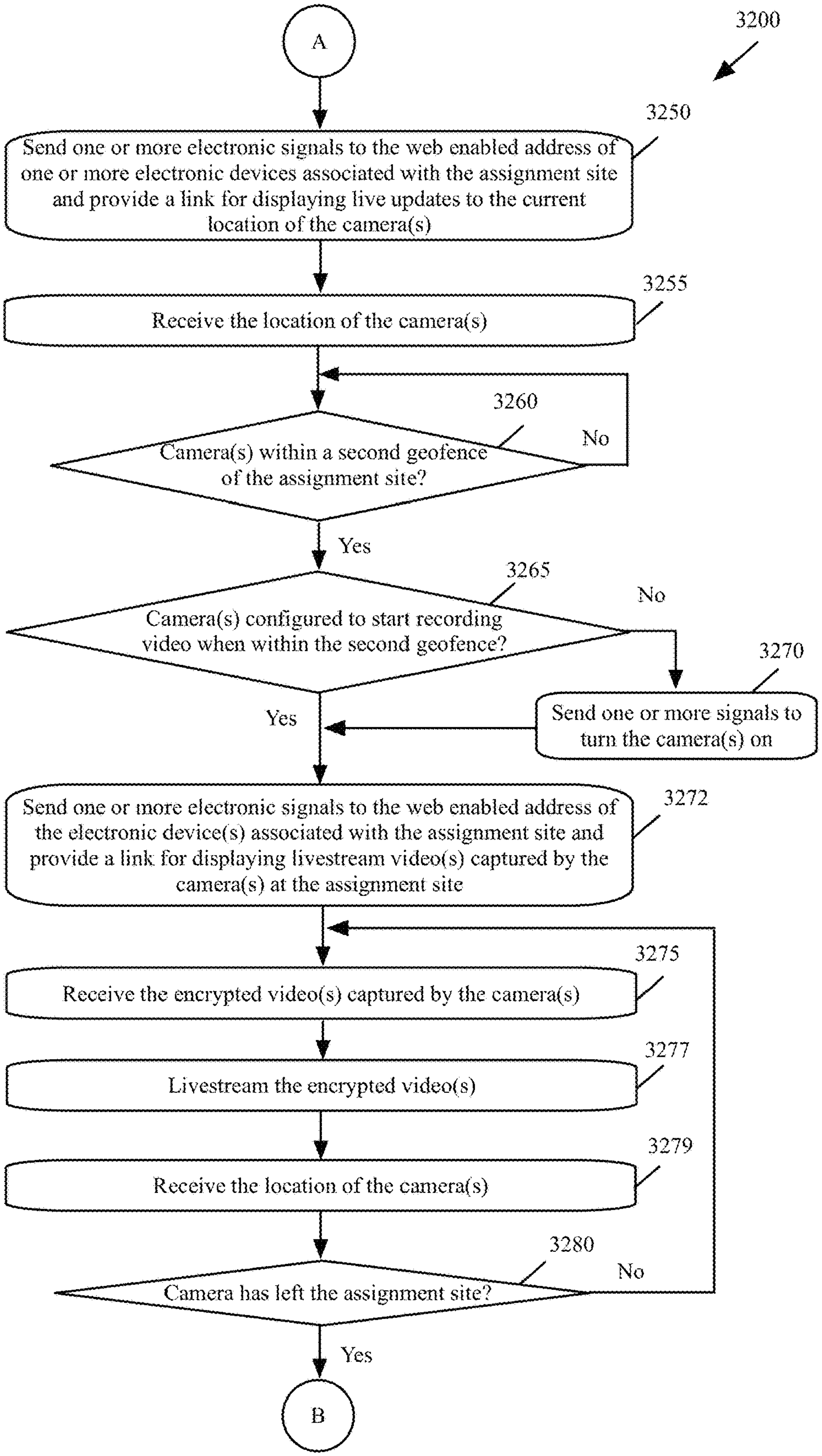
Figure 32C:
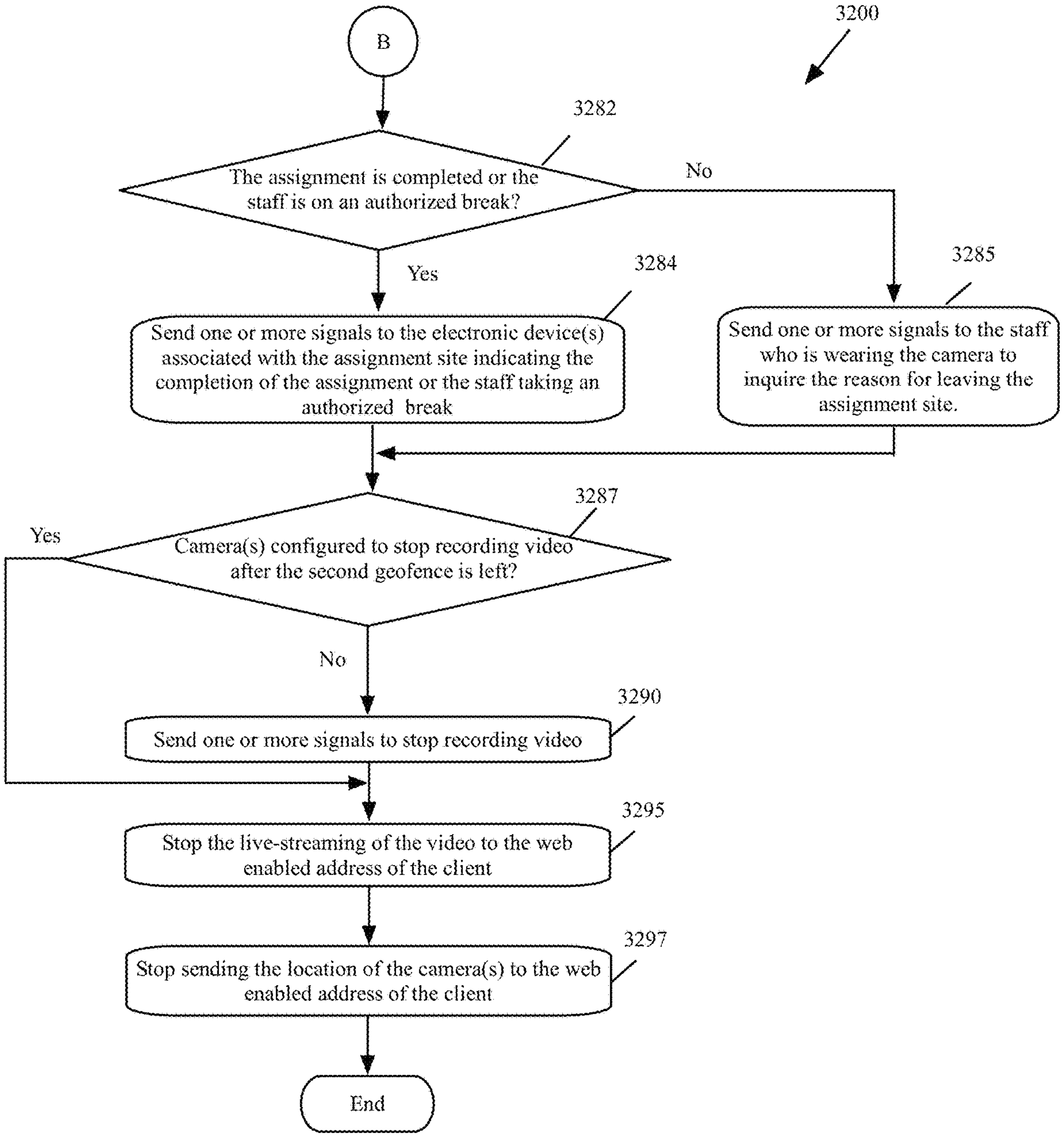

FIGS. 32A-32C show a flowchart illustrating an example process 3200 for controlling the assignments performed by tamperproof cameras, according to various aspects of the present disclosure. The process 3200, in some embodiments, may be performed by a processor of a server 1970 or a processor of an administrator electronic device 1980 of FIG. 19.

With reference to FIGS. 32A-32C, a request for an assignment that requires the use of a tamperproof camera during the assignment may be received (at block 3205). For example, one of the electronic devices 1901-1903 of FIG. 19 that is associated with an assignment site may request a task to be performed at the assignment site 1900. The job site, at least one appointment date, a web enabled address for receiving text for email notifications regarding the assignment may be received (at block 3210). Next, one or more staff persons may be assigned (at block 3215) to perform the assignment.

A determination may be made (at block 3220) whether it is time to send the staff to the assignment site. If not, the process 3200 may return back to block 3220, which was described above. Otherwise, the identification of the camera(s) and the camera(s)' associated equipment (e.g., harnesses, portable chargers, etc.) may be received (at block 3225) to be assigned to the staff for doing the assignment. For example, the server(s) 1970 and/or the electronic device(s) 1980 may include a list of available camera to be assigned to staff for each work shift and may assign the cameras to the staff for performing the assignments during the work shift.

Next, a confirmation may be received (at block 3230) that the camera(s) and the associated equipment have adequate battery for performing the assignment. For example, the battery charge level of each camera may be received from the processor(s) of the camera. A determination may then be made whether the camera's batteries have adequate charge for the assignment. If not, the battery/batteries may be replaced as described above with reference to process 2800 of FIG. 28, except that there is no need for a timer since the camera is not at an assignment site.

Next, a confirmation may be received (at block 3235) that the battery and the memory compartments of the camera(s) are locked. Next, the location of the camera(s) may be received (at block 3240). A determination may then be made (at block 3245) whether the camera(s) are/is within a first geofence of the assignment site. For example, a determination may be made whether the camera is within the geofence 3020 of FIG. 30. If not, the process 3200 may return to block 3245, which was described above.

Otherwise, one or more electronic signals may be sent (at block 3250) to the web enabled address of one or more electronic devices associated with the assignment site (e.g., and without limitations, the electronic devices 1901-1903 (FIG. 19) of the owner, the renter, the property manager, the custodian, etc., of the assignment site) and provide a link for displaying live updates to the current location of the camera(s). For example, the link may provide a user interface such as the user interface 3005 of FIG. 30B. The location of the camera(s) may be received at block 3255.

A determination may then be made (at block 3260) whether the camera(s) are/is within a second geofence of the assignment site. For example, a determination may be made whether the camera is within the geofence 3030 of FIG. 30. If not, the process 3200 may return to block 3260, which was described above.

A determination may then be made (at block 3265) whether the camera(s) are/is configured to start recording video when within the second geofence. If yes, the process 3200 may proceed to block 3272, which is described below. Otherwise, one or more signals may be sent (at block 3270) to turn the camera(s) on.

One or more electronic signals may be sent (at block 3272) to the web enabled address of the electronic device(s) associated with the assignment site and provide a link for displaying livestream video(s) captured by the camera(s) at the assignment site. The encrypted video(s) captured by the camera(s) may be received (at block 3275). The encrypted video(s) may be livestreamed (at block 3277).

The location of the camera(s) may be received (at block 3279). A determination may be made (at block 3280) whether the camera has left the assignment site. If not, the process 3200 may return back to block 3275, which was described above. Otherwise, a determination may be made (at block 3282) whether the assignment is completed. For example, in some embodiments, the staff using the camera at an assignment site may send one or more signals to the server(s) 1970 and/or the administrator electronic device(s) 1980 indicating that the assignment is completed and/or the staff want to leave the assignment site for a break.

When a determination is made (at block 3282) that the assignment is not completed and the staff is not on an authorized break, one or more signals may be sent (at block 3285) to the staff who is wearing the camera to inquire the reason for leaving the assignment site. The signal(s) may be sent to a mobile device associated with the staff and/or to the processor of the camera to play on the camera's speaker. The process 3200 may then proceed to block 3287, which is described below.

When a determination is made (at block 3282) that the assignment is completed, one or more signals may be sent (at block 3284) to the electronic device(s) associated with the assignment site indicating the completion of the assignment or the staff taking an authorized break.

Next, a determination may be made (at block 3287) whether the camera(s) is/are configured to turn off when the second geofence is left. If yes, the process 3200 may proceed to block 3295, which is described below. Otherwise, one or more signals may be sent (at block 3290) to stop recording video.

Livestreaming of the video to the web enabled address of the client may be stopped (at block 3295). Sending of the location of the camera(s) to the web enabled address of the client may be stopped (at block 3297). The process 3200 may then end.

III. Mounting Fixtures for the Tamperproof Camera

Figure 33A:
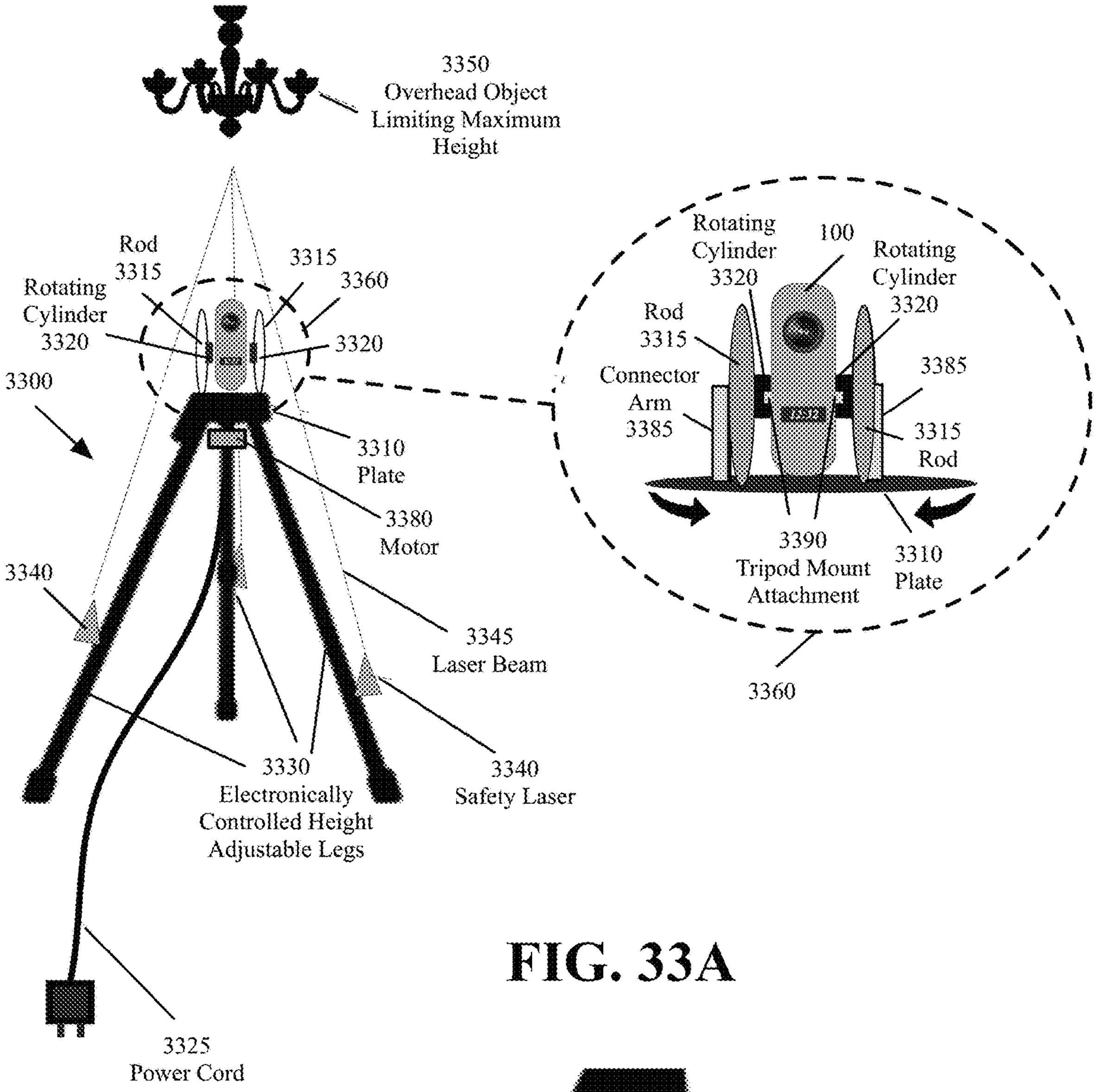
FIG. 33A illustrates an example tripod, according to various aspects of the present disclosure.

The tamperproof camera in some embodiments may be carried to an assignment site and may be mounted on a tripod or on a wall mount fixture instead of being installed on a harness worn by a person. FIG. 33A illustrates an example tripod, according to various aspects of the present disclosure. With reference to FIG. 33A, the tripod 3300 may include a plurality of height adjustable legs 3330, one or more safety lasers 3340, and/or a tripod mount. The tripod mount may include a plate 3310 (e.g., in the shape of a disk, in the shape of a polygon, in an arbitrary shape, etc.), one or more rods 3315, one or more rotating components 3320 (e.g., in the shape of cylinders), one or more connector arms 3385, and/or a power cord 3325.

As shown in the expanded view 3360, the tamperproof camera 100 may be attached to the tripod mount's plate 3310 and to one or more rotating cylinders 3320 (two rotating cylinders 3320 are shown in FIG. 33A). The rods 3315 may be attached to the camera 100 by the corresponding cylinder 3320. The rods 3315 may be attached to the plate 3310 by the corresponding connector arms 3385. The plate 3310 may be spined, panned, and/or tilted. Each rod 3315 may be connected to the plate 3315 by a connector arm. The camera 100, in some embodiments, may include one or more tripod mount attachments 3390 that be inserted into corresponding slots on the rotating cylinders 3320 of a tripod mount. The tripod mount attachments 3390 may communicatively couple the processor(s) of the camera to the motor 3380 and/or a processor of the tripod mount.

In addition to, or in lieu of, the tripod mount attachment(s) 3390, the camera 100, in some embodiments, may include one or more slots (not shown) to receive corresponding camera attachments of a tripod mount. In other words, the male/female connector(s) may be on either or both of the camera 100 and the tripod mount, and the corresponding female/male may be on either or both of the tripod mount and the camera 100.

It should be noted that the pan and tilt control of the present embodiments, such as, for example, and without limitations, the pan/tilt control of FIGS. 1C-1D, 9C-9D, 14A-14B, 15, 18A-18B, 33A may be controlled by the processor(s) 205 of the camera 100. The processor(s) of the camera, in some embodiments, may be communicatively coupled to, and control, one or more motors that move or rotate different components of the pan/tilt system in different directions. In these embodiments, the motor(s) move or rotate the pan/tilt components in response to signals received from the processor(s) of the camera. In other embodiments, the pan/tilt control may include a separate processor that is communicatively coupled to the processor(s) of the camera. In these embodiments, the processor(s) of the camera send(s) signals to the processor of the pan/tilt control. In response to receiving the signals from the processor(s) of the camera, the processor of the pan/tilt control sends signals to the motor(s) to move or rotate the pan/tilt control components.

Figure 33B:
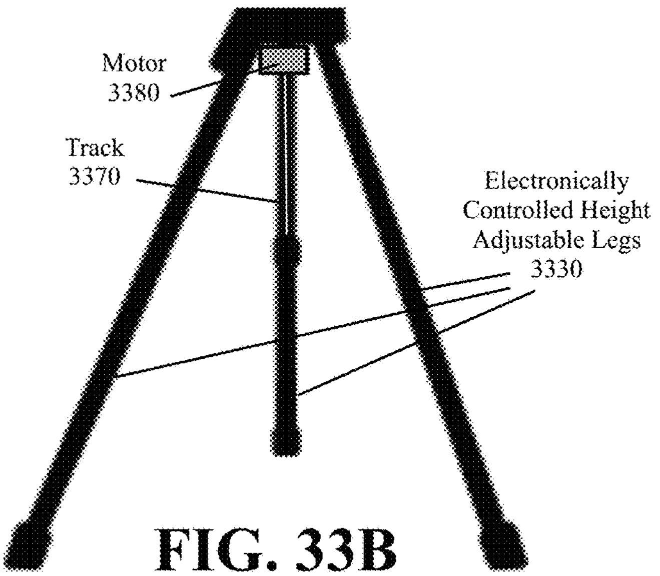
FIG. 33B illustrates a perspective view of a portion of the tripod of FIG. 33A, according to various aspects of the present disclosure.

With further reference to FIG. 33A, the height adjustable legs 3300 may be electronically controlled in some embodiments. FIG. 33B illustrates a perspective view of a portion of the tripod of FIG. 33A, according to various aspects of the present disclosure. With reference to FIG. 33B, the electronically height adjustable legs may include tracks 3370 (the track for only one of the legs 3330 is shown in the perspective view of FIG. 33B).

Different embodiments may adjust the tracks 3370 differently. For example, the tracks may include wheels and a breaking mechanism, may be gap powered, may include a pressurized system, may include a pully system, and/or may include a water level increase or decrease system.

The tripod mount may include a motor 3380 that may be used to rotate, pan, and/or tilt the plate 3310 and/or to rotate the rotating cylinders. The motor 3380 may be used to move different components of the legs 3330 (e.g., the wheels, the pulleys, etc.). Some embodiments may include different motors for the tripod mount and the adjustable legs.

The tamperproof camera may be operated in areas that have a low ceiling or areas with overhead objects 3350 that may limit the maximum available height. With reference to FIG. 33A, the tripod 3300, in some embodiments, may include one or more safety lasers 3340 to prevent the tripod legs 3330 from being extended to a point that the camera may hit the ceiling or may hit an overhead object 3350. In these embodiments, the safety laser(s) 3340 may be directed to point to different directions. A beam of light 3345 may be projected from each safety laser(s) in different directions and may be used to measure the distance to overhead objects. The distance may then be used to limit the height of the legs 3330 to prevent the camera from hitting the overhead objects.

The tripod mount, in some embodiments, may include one or more rechargeable batteries. The tripod mount may include a detachable power cord that may be used to charge the batteries and/or to power different components of the tripod mount without a battery.

In some embodiments, the tripod mount may be electronically coupled to the tamperproof camera once the camera is connected on the tripod mount. The movements of different components of the tripod mount and/or the movement of the adjustable legs may then be controlled by signals sent from the processor(s) of the camera. For example, a remote electronic device such as, for example, and without limitations, the administrative device(s) 1980 (FIG. 19), the server(s) 1970, the client devices 1901-1903 may send signals to the processor(s) of the camera to rotate, pan, or tilt the plate 3310, to rotate the cylinders 3320, to adjust the legs 3330, and/or to point the safety laser(s) 3340 in different directions.

Figure 34A:
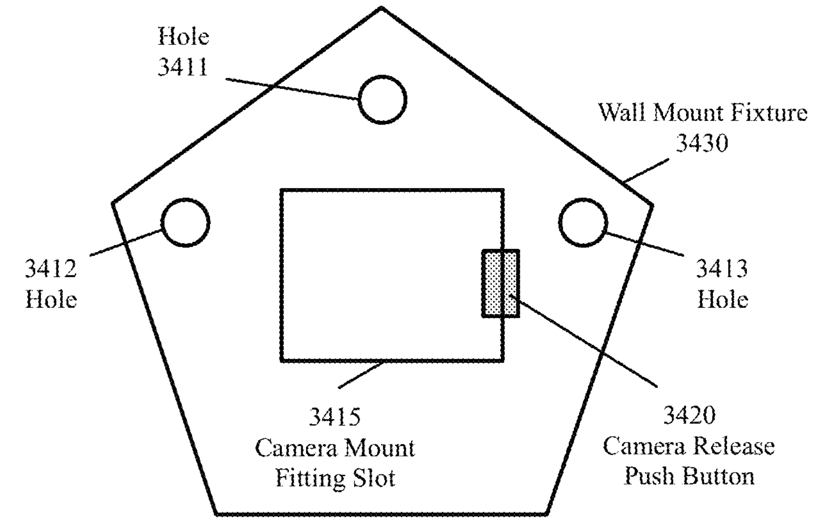
FIG. 34A is front elevation view.
Figure 34B:
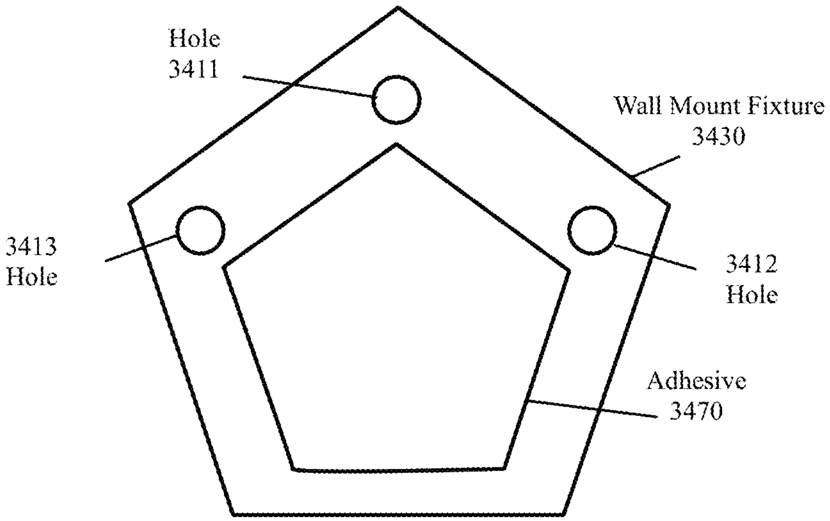
FIG. 34B is a back elevation view.
Figure 34C:
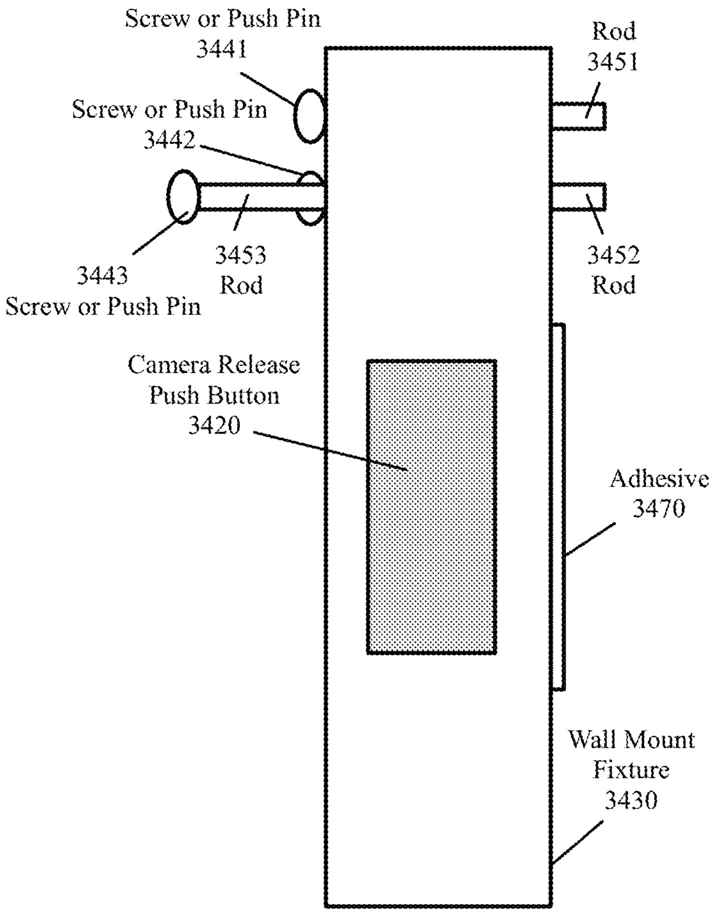
FIG. 34C is a side elevation view.
Figure 34D:
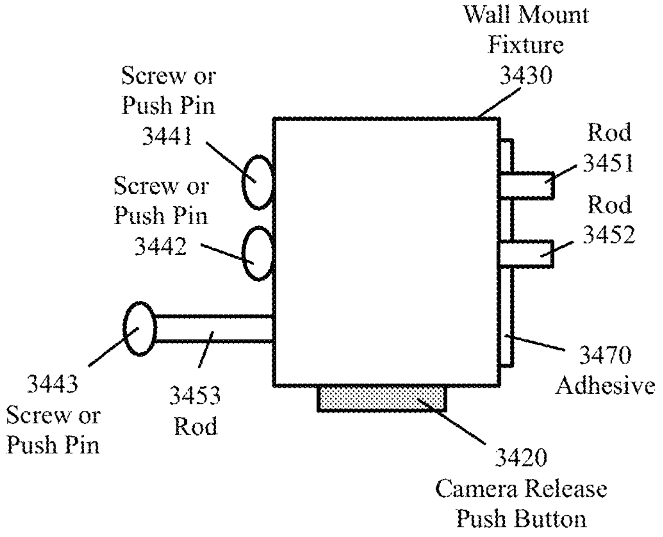
FIG. 34D is a top view of a camera wall mount fixture, according to various aspects of the present disclosure.

The tamperproof camera, in some embodiments, may be moved to assignment sites and may be mounted on a wall mount fixture. FIG. 34A is front elevation view, FIG. 34B is a back elevation view, FIG. 34C is a side elevation view, and FIG. 34D is a top view of a camera wall mount fixture, according to various aspects of the present disclosure. With reference to FIGS. 34A and 34B, the wall mount fixture 3430 may include one or more holes (or slots) for inserting fasteners through the wall mount fixture 3430.

The fasteners may be, for example, and without limitations, screws, push pins, nails, pins, tacks, bolts, etc. FIGS. 34C and 34D illustrate several example fasteners 3441-3443. The fasteners 3441-3443 may be used to temporarily or permanently attach the wall mount fixture 3430 to a wall or any other surface such as a pole, a rod, etc. In the example of FIGS. 34C and 34D, the fastener 3443 is partially pulled out of its corresponding slot (as shown by the rod 3453) and the fasteners 3441 and 3442 and the corresponding rods 3451 and 3452 are fully inserted in their slots. The number and the arrangement of the fasteners 3441-3443 may be different in different embodiments.

The wall mount fixture 3430 may include a camera mount fitting slot 3415 (FIG. 34A) and a camera release push button 3420 (FIGS. 34A, and 34C-34D). A camera inserted in the fitting slot 3415 may remain in the slot until the release button 3420 is pushed.

In addition to, or in lieu of, the fasteners 3441-3443, the wall mount fixture 3430 may include an adhesive 3470 to attach the wall mount fixture 3430 to a wall or any other surface. The adhesive may include a peel off layer that may be removed to expose the adhesive to connect the wall mount fixture 3430 to a surface. The adhesive in different embodiments may be permanent or removable.

Figure 35:
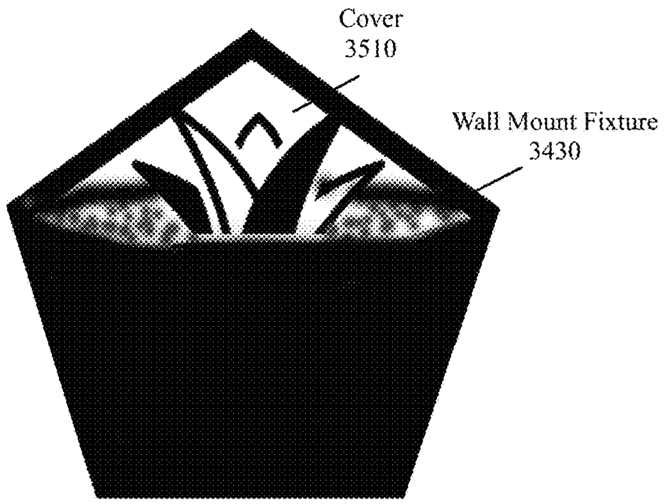
FIG. 35 illustrates a front elevation view of a wall mount that includes a cover, according to various aspects of the present disclosure.

In the embodiments that the wall mount fixture 3430 may be permanently attached to a wall or a surface may include a cover for aesthetic purposes. FIG. 35 illustrates a front elevation view of a wall mount that includes a cover, according to various aspects of the present disclosure. With reference to FIG. 35, the cover 3510 may be attached to the wall mount fixture 3430 when a camera is not attached to the wall mount fixture 3430.

Figure 36:
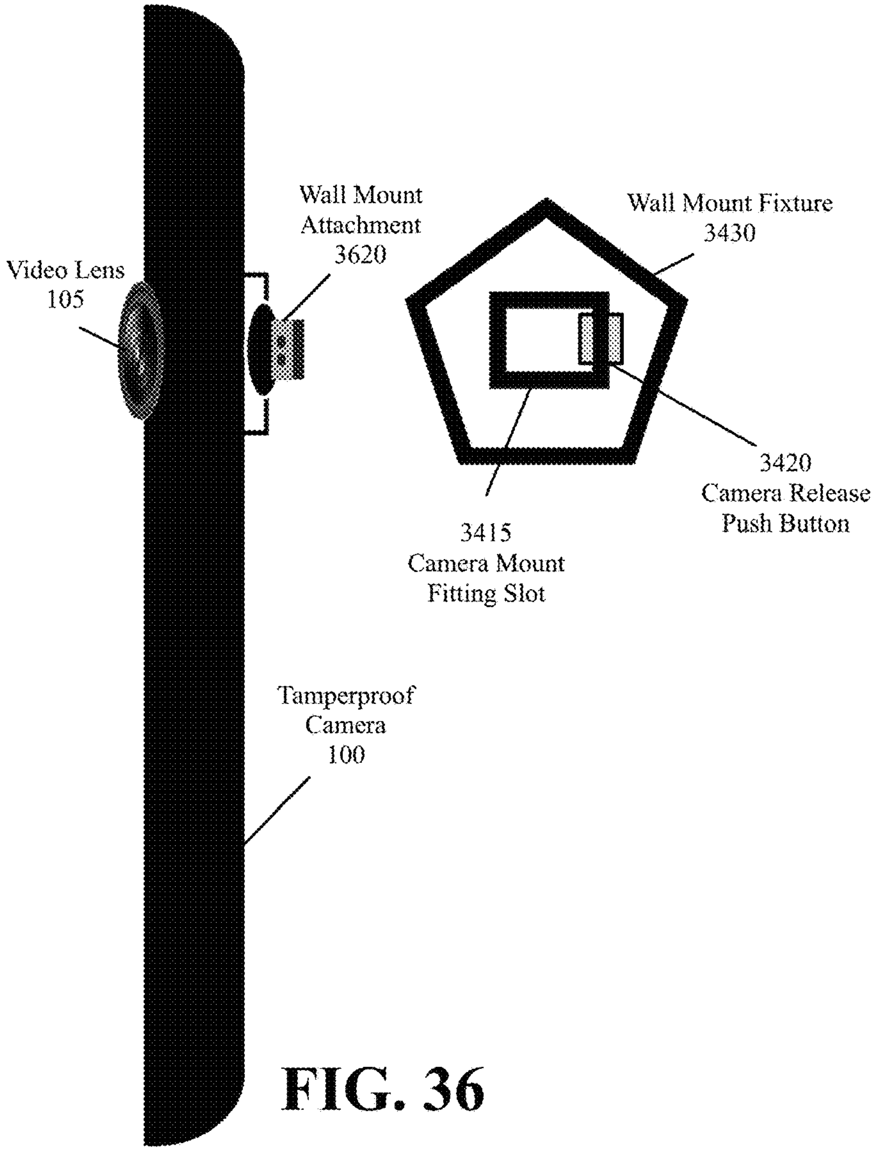
FIG. 36 illustrates a camera with a wall mount attachment for attaching the camera to a wall mount fixture, according to various aspects of the present embodiments.

The tamperproof camera, in some embodiments, may include a wall mount attachment to connect the camera to a wall mount fixture. FIG. 36 illustrates a camera with a wall mount attachment for attaching the camera to a wall mount fixture, according to various aspects of the present embodiments. With reference to FIG. 36, the camera 100 may be similar to the camera 100 of FIGS. 1A-1D, 9A-9D, 18A-18D, and 24, except the camera 100 of FIG. 36 includes a wall mount attachment 3620 instead of a harness attachment 120. The wall mount attachment 3620 may fit into the camera mount fitting slot 3415. The camera may be released when the camera release push button 3420 is pressed.

Figure 37:
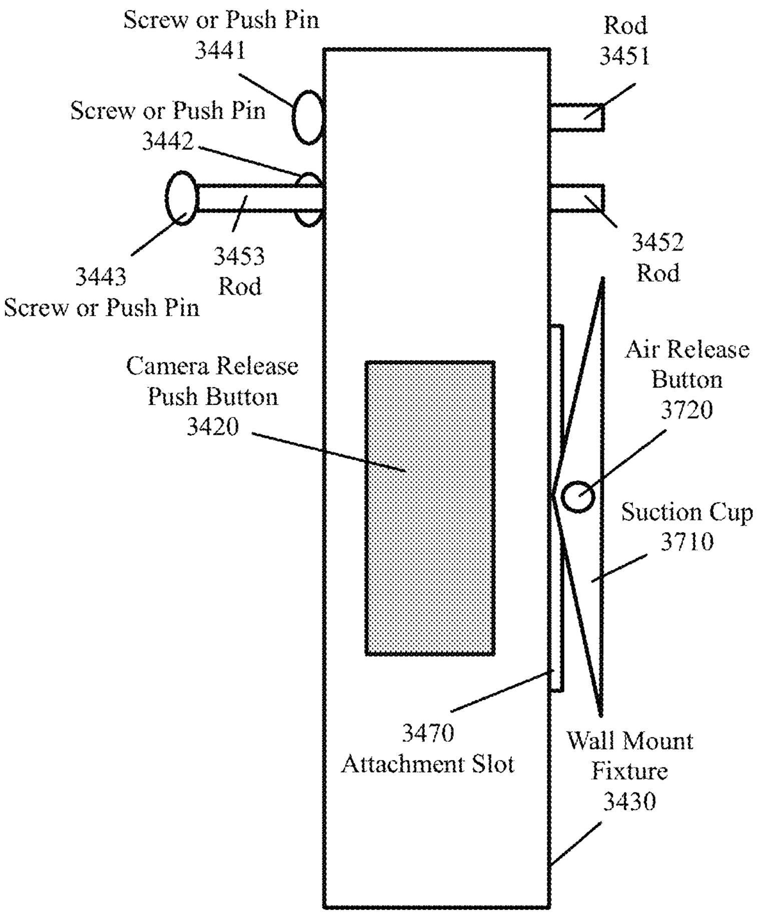
FIG. 37 is a side elevation view of a wall mount fixture that includes one or more suction cups, according to various aspects of the present embodiments.

The wall mount fixture, in some embodiments, may include a suction cup for attaching the wall mount to a wall or another surface. FIG. 37 is a side elevation view of a wall mount fixture that includes one or more suction cups, according to various aspects of the present embodiments. With reference to FIG. 37, the wall mount fixture 3430 may include one or more suction cups 3710 (only one suction cup is shown in FIG. 37). The suction cup 3710, in some embodiments, may include an air release button 3720 that may be pushed to release the air inside the suction cup 3720 and strengthen the grip of the suction cup on the surface to which the suction cup 3710 is attached. Some embodiments may include an attachment slot 3470 to allow attaching and detaching of suction cups, magnets, adhesives, etc.

Figure 38:
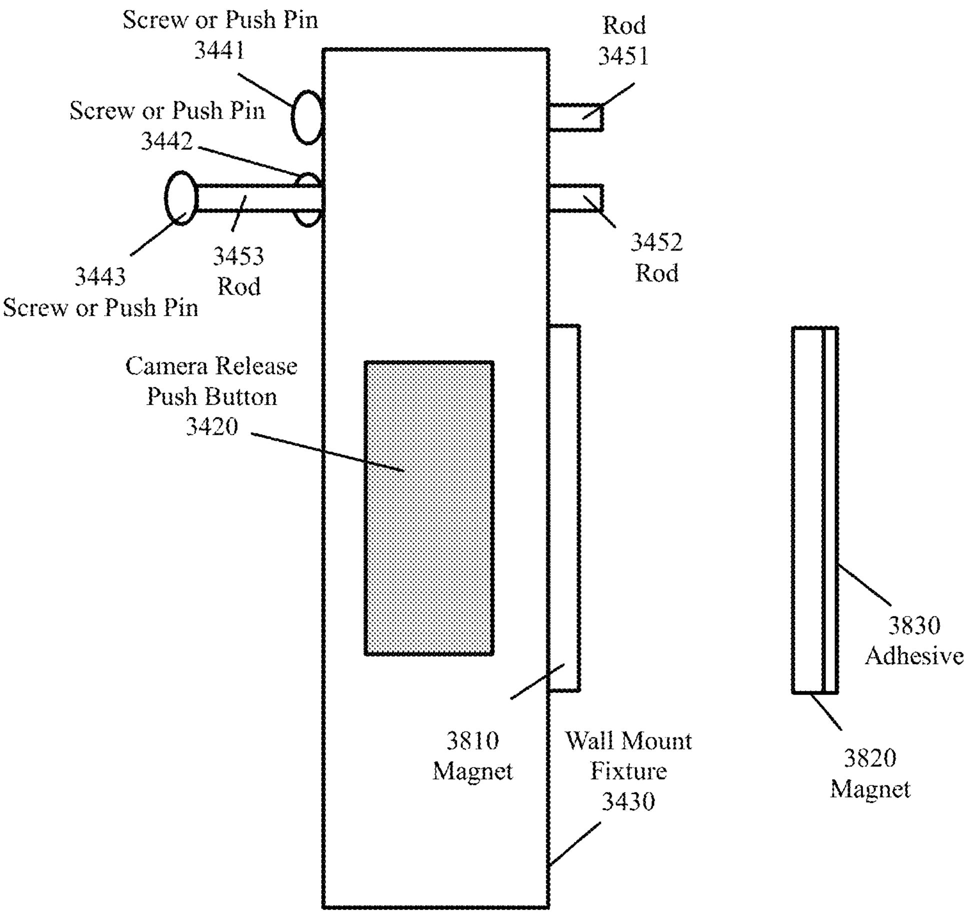
FIG. 38 is a side elevation view of a wall mount fixture that includes one or more magnets, according to various aspects of the present embodiments.

The wall mount fixture, in some embodiments, may include a magnet that may be attached to the walls or studs within the walls. FIG. 38 is a side elevation view of a wall mount fixture that includes one or more magnets, according to various aspects of the present embodiments. With reference to FIG. 38, the wall mount fixture 3430 may include one or more magnets 3810 (only one magnet is shown in FIG. 38). The magnet 3810 may be attached to a metallic surface or to studs within walls. The magnet 3810 may be attached to another magnet 3820. For example, the magnet 3820 may be attached to a wall by the adhesive 3830 and the magnet 3810 of the wall mount fixture may be attached to the magnet 3820.

In a first aspect, a video camera is provided. The video camera comprising: a video lens; an antenna; a wireless transceiver communicatively coupled to the antenna; a processor communicatively coupled to the wireless transceiver; a battery compartment comprising a door, the battery compartment configured to hold one or more batteries for providing power to the video lens, the wireless transceiver, and the processor; and an electronic lock communicatively coupled to the processor. The electronic lock configured to: lock the battery compartment's door in response to receiving one or more signals to lock the battery compartment's door; and unlock the battery compartment's door in response to receiving one or more signals to unlock the battery compartment's door. The processor configured to: receive one or more signals through the wireless transceiver to lock the battery compartment's door; and in response to receiving the signals to lock the battery compartment's door, send one or more signals to the electronic lock to lock the battery compartment's door; receive one or more signals through the wireless transceiver to unlock the battery compartment's door; and in response to receiving the signals to unlock the battery compartment's door, send one or more signals to the electronic lock to unlock the battery compartment's door.

In an embodiment of the first aspect, the electronic lock is a first electronic lock, the video camera further comprising: a memory card compartment comprising a door, the memory card compartment configured to hold one or more memory cards for storing videos captured by the video lens; and a second electronic lock communicatively coupled to the processor. The second electronic lock configured to: lock the memory card compartment's door in response to receiving one or more signals to lock the memory card compartment's door; and unlock the memory card compartment's door in response to receiving one or more signals to unlock the memory card compartment's door. The processor configured to: receive one or more signals through the wireless transceiver to lock the memory card compartment's door; and in response to receiving the signals to lock the memory card compartment's door, send one or more signals to the second electronic lock to lock the memory card compartment's door; receive one or more signals through the wireless transceiver to unlock the memory card compartment's door; and in response to receiving the signals to unlock the memory card compartment's door, send one or more signals to the second electronic lock to unlock the memory card compartment's door.

In another embodiment of the first aspect, the processor configured to receive encrypted signals through the wireless transceiver; decrypt the encrypted signals received; authenticate the signals as being received from an authorized external electronic device; respond to the received signals when the signals are authenticated; and ignore the received signals when the signals are not authenticated.

An embodiment of the first aspect further comprises: a global positioning system (GPS) receiver configured to receive a location of the video camera from one or more GPS satellites. The processor configured to: encrypt the location of the video camera; and send the encrypted location of video camera, through the wireless transceiver, to one or more electronic devices external to the camera.

Another embodiment of the first aspect further comprises a global positioning system (GPS) receiver configured to receive a location of the video camera from one or more GPS satellites. The processor configured to: receive a definition of a geofence around a job assignment site; determine whether the location of the video camera is within the geofence; and when the location of the video camera is within the geofence, turn on the video camera.

In another embodiment of the first aspect, the processor configured to: encrypt videos captured by the video lens; and send the encrypted videos through the wireless transceiver to one or more electronic devices.

An embodiment of the first aspect further comprises: a global positioning system (GPS) receiver configured to receive a location of the video camera from one or more GPS satellites. The processor configured to: determine whether the location of the video camera is within a geofence defined around a previous job assignment site; turn the video camera on when the location of the video camera is within the geofence and the video camera has remained within the geofence more than a threshold time period; encrypt video captured by the video lens; and send the encrypted video through the wireless transceiver to one or more electronic devices.

In another embodiment of the first aspect, the processor configured to: receive a charge level of the one or more batteries; determine that the charge level is below a threshold and the battery compartment's door is locked; receive one or more signals through the wireless transceiver to unlock the battery compartment; start a timer; send one or more signals to the electronic lock to unlock the battery compartment's door; determine whether one or more replacement batteries are installed in the battery compartment before the timer has expires; send one or more signals to the electronic lock to lock the battery compartment's door when the replacement batteries are installed in the battery compartment before the timer has expires; and send one or more signals through the wireless transceiver to one or more electronic devices indicating that the replacement batteries are not installed in the battery compartment before the timer expired when the replacement batteries are not installed in the battery compartment before the timer expires.

Another embodiment of the first aspect further comprises a switch configured to: turn power on to a plurality of electronic components of the camera other than the processor when the switch is in a first position; and turn power off to said plurality of electronic components of the camera when the switch is in a second position. The processor configured to: receive power from the one or more batteries after the one or more batteries are installed in the battery compartment; receive one or more signals through the wireless transceiver to turn on power to the plurality of electronic components of the video camera; send one or more signals to the switch to place the switch in the first position in response to receiving the signals to turn on power to the plurality of electronic components.

In another embodiment of the first aspect, the processor configured to: receive one or more signals through the wireless transceiver to turn off power to the plurality of electronic components of the video camera; and send one or more signals to the switch to place the switch in the second position in response to receiving the signals to turn off power to the plurality of electronic components.

In another embodiment of the first aspect, wherein the video camera does not include a display for displaying videos captured by the video lens.

Another embodiment of the first aspect further comprises a harness attachment comprising an electronic lock communicatively coupled to the processor. The electronic lock configured to receive one or more signals to lock or unlock the harness attachment to a harness; and lock or unlock the harness attachment to a harness in response to receiving the signals.

Another embodiment of the first aspect further comprises a harness attachment comprising pan and tilt control communicatively coupled to the processor. The pan and tilt control configured to receive one or more signals to pan or tilt the camera; and pan or tilt the camera with respect to the harness in response to receiving the signals.

Another embodiment of the first aspect further comprises a pan and tilt control attached to a housing of the camera and communicatively coupled to the processor. The pan and tilt control composing a spinning plate and a set of one or more rotating cylinders. The pan and tilt control configured to: receive one or more signals to pan the camera; and spin the plate to move the camera by in response to receiving the signals to pan the camera; and receive one or more signals to tilt the camera; and rotate the set of cylinders to tilt the camera in response to receiving the signals to tilt the camera.

Another embodiment of the first aspect further comprises a tripod attachment configured to: attach the camera to a spinning plate of a tripod mount; and communicatively couple the processor of the camera to a motor of the tripod mount that controls the spinning plate.

Another embodiment of the first aspect further comprises or more tripod attachments, each tripod attachment configured to attach the camera to a rotating rod of a tripod mount.

In another embodiment of the first aspect, the tripod attachment of the camera further configured to communicatively couple the processor of the camera to a set of one or more motors that adjust a height of one or more legs of a tripod.

Another embodiment of the first aspect further comprises a wall mount attachment configured to attach the camera to a camera mount fitting slot of a wall mount fixture.

In another embodiment of the first aspect, the lens is a first lens, the video camera further comprising a plurality of video lenses comprising the first lens, each of the plurality of video lenses arranged to capture video from a different direction. The processor of the camera configured to: encrypt the videos captured by the plurality of cameras; and send the encrypted videos, through the wireless transceiver, to one or more electronic devices external to the camera.

In another embodiment of the first aspect, the lens is a first lens, the video camera further comprising a plurality of video lenses comprising the first lens, each of the plurality of video lenses arranged to capture video from a different direction. The processor of the camera configured to: combine the video captured by the plurality of cameras into one video; encrypt the combined video; and send the encrypted combined video, through the wireless transceiver, to one or more electronic devices external to the camera.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

The electronic devices such as the administrator electronic devices, the servers, the client devices, the camera, etc., described above may include memory. The memory 1250 in the above examples may be one or more units of similar or different memories. For example, the electronic devices' memory may include, without any limitations, random access memory (RAM), read-only-memory (ROM), read-only compact discs (CD-ROM), erasable programmable read-only memories (EPROMs), electrically erasable programmable read-only memories (EEPROMs), flash memory (e.g., secured digital (SD) cards, mini-SD cards, micro-SD cards, etc.), magnetic and/or solid state hard drives, ultra-density optical discs, any other optical or magnetic media, and floppy disks.

Electronic devices described above may include one or more processors. A processor may be a single-core processor or a multi-core processor in different embodiments. The electronic devices in some of the present embodiments may store computer program instructions in the memory, which may be a machine-readable or computer-readable medium (alternatively referred to as computer-readable storage medium, machine-readable medium, or machine-readable storage medium). The computer-readable medium may store a program that is executable by at least one processing unit and includes sets of instructions for performing various operations. Examples of programs or computer code include machine code, such as is produced by a compiler, and files including higher-level code that are executed by a computer, an electronic component, or a microprocessor using an interpreter. From these various memory units, the processing unit may retrieve instructions to execute and data to process in order to execute the processes of the present embodiments.

As used in this disclosure and any claims of this disclosure, the terms such as "processing unit," "processor," "controller," "microcontroller," "server", and "memory" all refer to electronic or other technological devices. These terms exclude people or groups of people. For the purposes of this disclosure, the terms display or displaying means displaying on an electronic device. As used in this disclosure and any claims of this disclosure, the terms "computer readable medium," "computer readable media," and "machine readable medium" are entirely restricted to tangible, physical objects that store information in a form that is readable by a processing unit. These terms exclude any wireless signals, wired download signals, and any other ephemeral or transitory signals.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A video camera, comprising:

a video lens;

an antenna;

a wireless transceiver communicatively coupled to the antenna;

a processor communicatively coupled to the wireless transceiver;

a battery compartment comprising a door, the battery compartment configured to hold one or more batteries for providing power to the video lens, the wireless transceiver, and the processor;

a first electronic lock communicatively coupled to the processor, the first electronic lock configured to:

lock the battery compartment's door in response to receiving one or more signals to lock the battery compartment's door; and unlock the battery compartment's door in response to receiving one or more signals to unlock the battery compartment's door;

a memory card compartment comprising a door, the memory card compartment configured to hold one or more memory cards for storing videos captured by the video lens; and a second electronic lock communicatively coupled to the processor, the second electronic lock configured to:

lock the memory card compartment's door in response to receiving one or more signals to lock the memory card compartment's door; and unlock the memory card compartment's door in response to receiving one or more signals to unlock the memory card compartment's door;

the processor configured to:

receive one or more signals through the wireless transceiver to lock the battery compartment's door; and in response to receiving the signals to lock the battery compartment's door, send one or more signals to the first electronic lock to lock the battery compartment's door;

receive one or more signals through the wireless transceiver to unlock the battery compartment's door; and in response to receiving the signals to unlock the battery compartment's door, send one or more signals to the first electronic lock to unlock the battery compartment's door.

2. The video camera of claim 1, the processor configured to:

receive one or more signals through the wireless transceiver to lock the memory card compartment's door; and in response to receiving the signals to lock the memory card compartment's door, send one or more signals to the second electronic lock to lock the memory card compartment's door;

receive one or more signals through the wireless transceiver to unlock the memory card compartment's door; and in response to receiving the signals to unlock the memory card compartment's door, send one or more signals to the second electronic lock to unlock the memory card compartment's door.

3. The video camera of claim 1, the processor configured to:

receive encrypted signals through the wireless transceiver;

decrypt the encrypted signals received;

authenticate the signals as being received from an authorized external electronic device;

respond to the received signals when the signals are authenticated; and ignore the received signals, when the signals are not authenticated.

4. The video camera of claim 1 further comprising:

a global positioning system (GPS) receiver configured to receive a location of the video camera from one or more GPS satellites;

the processor configured to:

encrypt the location of the video camera; and send the encrypted location of video camera, through the wireless transceiver, to one or more electronic devices external to the camera.

5. The video camera of claim 1 further comprising:

a global positioning system (GPS) receiver configured to receive a location of the video camera from one or more GPS satellites;

the processor configured to:

receive a definition of a geofence around a job assignment site;

determine whether the location of the video camera is within the geofence; and when the location of the video camera is within the geofence, turn on the video camera.

6. The video camera of claim 1, the processor configured to:

encrypt videos captured by the video lens; and send the encrypted videos through the wireless transceiver to one or more electronic devices.

7. The video camera of claim 1 further comprising:

a global positioning system (GPS) receiver configured to receive a location of the video camera from one or more GPS satellites;

the processor configured to:

determine whether the location of the video camera is within a geofence defined around a previous job assignment site;

turn the video camera on when the location of the video camera is within the geofence and the video camera has remained within the geofence more than a threshold time period;

encrypt video captured by the video lens; and send the encrypted video through the wireless transceiver to one or more electronic devices.

8. The video camera of claim 1, the processor configured to:

receive a charge level of the one or more batteries;

determine that the charge level is below a threshold and the battery compartment's door is locked;

receive one or more signals through the wireless transceiver to unlock the battery compartment;

start a timer;

send one or more signals to the electronic lock to unlock the battery compartment's door;

determine whether one or more replacement batteries are installed in the battery compartment before the timer has expires;

send one or more signals to the electronic lock to lock the battery compartment's door when the replacement batteries are installed in the battery compartment before the timer has expires; and send one or more signals through the wireless transceiver to one or more electronic devices indicating that the replacement batteries are not installed in the battery compartment before the timer expired when the replacement batteries are not installed in the battery compartment before the timer expires.

9. The video camera of claim 1 further comprising:

a switch configured to:

turn power on to a plurality of electronic components of the camera other than the processor when the switch is in a first position; and turn power off to said plurality of electronic components of the camera when the switch is in a second position;

the processor configured to:

receive power from the one or more batteries after the one or more batteries are installed in the battery compartment;

receive one or more signals through the wireless transceiver to turn on power to the plurality of electronic components of the video camera;

send one or more signals to the switch to place the switch in the first position in response to receiving the signals to turn on power to the plurality of electronic components.

10. The video camera of claim 9, the processor configured to:

receive one or more signals through the wireless transceiver to turn off power to the plurality of electronic components of the video camera; and send one or more signals to the switch to place the switch in the second position in response to receiving the signals to turn off power to the plurality of electronic components.

11. The video camera of claim 1, wherein the video camera does not include a display for displaying videos captured by the video lens.

12. The video camera of claim 1 further comprising:

a harness attachment comprising an electronic lock communicatively coupled to the processor;

the electronic lock configured to receive one or more signals to lock or unlock the harness attachment to a harness; and lock or unlock the harness attachment to a harness in response to receiving the signals.

13. The video camera of claim 1 further comprising:

a harness attachment comprising pan and tilt control communicatively coupled to the processor;

the pan and tilt control configured to receive one or more signals to pan or tilt the camera; and pan or tilt the camera with respect to the harness in response to receiving the signals.

14. The video camera of claim 1 further comprising:

a pan and tilt control attached to a housing of the camera and communicatively coupled to the processor;

the pan and tilt control composing a spinning plate and a set of one or more rotating cylinders;

the pan and tilt control configured to:

receive one or more signals to pan the camera; and spin the plate to move the camera by in response to receiving the signals to pan the camera; and receive one or more signals to tilt the camera; and rotate the set of cylinders to tilt the camera in response to receiving the signals to tilt the camera.

15. The video camera of claim 1 further comprising a tripod attachment configured to:

attach the camera to a spinning plate of a tripod mount; and communicatively couple the processor of the camera to a motor of the tripod mount that controls the spinning plate.

16. The video camera of claim 15 further comprising one or more tripod attachments, each tripod attachment configured to attach the camera to a rotating rod of a tripod mount.

17. The video camera of claim 15, the tripod attachment of the camera further configured to communicatively couple the processor of the camera to a set of one or more motors that adjust a height of one or more legs of a tripod.

18. The video camera of claim 1 further comprising a wall mount attachment configured to attach the camera to a camera mount fitting slot of a wall mount fixture.

19. The video camera of claim 1, wherein the lens is a first lens, the video camera further comprising a plurality of video lenses comprising the first lens, each of the plurality of video lenses arranged to capture video from a different direction;

the processor of the camera configured to:

encrypt the videos captured by the plurality of cameras; and send the encrypted captured video from the plurality of cameras, through the wireless transceiver, to one or more electronic devices external to the camera.

20. The video camera of claim 1, wherein the lens is a first lens, the video camera further comprising a plurality of video lenses comprising the first lens, each of the plurality of video lenses arranged to capture video from a different direction;

the processor of the camera configured to:

combine the video captured by the plurality of cameras into one video;

encrypt the combined video;

send the encrypted combined video, through the wireless transceiver, to one or more electronic devices external to the camera.

* * * * *